United States Patent [19]
Iwasa et al.

[11] Patent Number: 5,522,058
[45] Date of Patent: May 28, 1996

[54] DISTRIBUTED SHARED-MEMORY MULTIPROCESSOR SYSTEM WITH REDUCED TRAFFIC ON SHARED BUS

[75] Inventors: Shigeaki Iwasa, Kanagawa-ken; Takashi Omizo, Saitama-ken, both of Japan

[73] Assignee: Kabushiki Kaisha Toshiba, Kawasaki, Japan

[21] Appl. No.: 112,811

[22] Filed: Aug. 11, 1993

[30] Foreign Application Priority Data

Aug. 11, 1992 [JP] Japan .................................. 4-213133

[51] Int. Cl.$^6$ .................................................. G06F 12/08
[52] U.S. Cl. .................. 395/472; 395/448; 395/475; 395/470; 395/471; 364/DIG. 1; 364/229.2; 364/238.4; 364/243.1; 364/243.41
[58] Field of Search ........................ 364/200 MS File, 364/900 MS File; 395/400, 425, 403, 440, 446, 447, 448, 457, 460, 475, 480, 486, 497.01, 470, 471, 472

[56] References Cited

U.S. PATENT DOCUMENTS

| | | | |
|---|---|---|---|
| 3,723,976 | 3/1973 | Alvarez et al. | 340/172.5 |
| 3,735,360 | 5/1973 | Anderson et al. | 340/172.5 |
| 4,503,497 | 3/1985 | Krygowski et al. | 395/425 |
| 4,648,030 | 3/1987 | Bomba et al. | 395/425 |
| 5,045,996 | 9/1991 | Barth et al. | 395/425 |
| 5,136,700 | 8/1992 | Thacker | 395/400 |
| 5,226,144 | 7/1993 | Moriwaki et al. | 395/425 |
| 5,241,641 | 8/1993 | Iwasa et al. | 395/425 |
| 5,265,235 | 11/1993 | Sindlu et al. | 395/425 |
| 5,289,585 | 2/1994 | Kock et al. | 395/325 |
| 5,303,362 | 4/1994 | Butts, Jr. et al. | 395/425 |
| 5,313,609 | 5/1994 | Baylor et al. | 395/425 |

OTHER PUBLICATIONS

17th Internation Symposium on Computer Architecture, May 28–31, 1990, pp. 148–159, D. Lenoski, et al., "The Directory–Based Cache Coherence Protocol For The Dash Multiprocessor".

Proceeding of International Symposium on Computer Architecture (IEEE), Apr. 23–25, 1979, pp. 188–195, M. Maekawa, et al., "Experimental Polyprocessor System (EPOS) Architecture".

Primary Examiner—Eddie P. Chan
Assistant Examiner—Hiep T. Nguyen
Attorney, Agent, or Firm—Oblon, Spivak, McClelland, Maier & Neustadt

[57] ABSTRACT

A distributed shared-memory multiprocessor system capable of reducing a traffic on the shared bus, without imposing any constraint concerning the types of variables to be accessed in the parallel programs, such that a high system extensibility can be realized. The system is formed by a plurality of processor units coupled through a shared bus, where each processor unit comprises: a CPU; a main memory connected with the CPU through an internal bus, for storing a distributed part of data entries of a shared-memory of the system; a cache memory associated with the CPU and connected with the main memory through the internal bus, for caching selected data entries of the shared-memory; and a sharing management unit connected with the main memory and the cache memory through the internal bus, For interfacing the internal bus and the shared bus according to a sharing state for each data entry of the main memory and a cache state of each data entry of the cache memory.

2 Claims, 52 Drawing Sheets

FIG.6A

| CACHE STATE TAG 12 \ INSTRUCTION FROM CPU | Read | Write |
|---|---|---|
| M | HIT | HIT |
| O | HIT | CI/M |
| E | HIT | HIT/M |
| S | HIT | CI/M |
| I | CR/E(S) | CRI/M |

FIG.6B

| CACHE STATE TAG 12 \ COMMAND FROM INTERNAL BUS | CR | CRI | CI | WR |
|---|---|---|---|---|
| M | INTERVENTION/ O | INTERVENTION/I | ERROR | ERROR |
| O | INTERVENTION/ O | INTERVENTION/I | —/I | ERROR |
| E | —/S | —/I | ERROR | ERROR |
| S | — | —/I | —/I | — |
| I | — | — | — | — |

| CACHE STATE TAG 24 \ COMMAND FROM INTERNAL BUS | CR | CRI | CI | WR |
|---|---|---|---|---|
| M(P) | ERROR | ERROR | ERROR | −/I·P |
| O(G) | ERROR | ERROR | INV/M | −/I·G |
| E(P) | — | −/M | ERROR | −/I·P |
| S(G) | RS/E(S) | RM/M | INV/M | ERROR |
| I { P | −/E | −/M | ERROR | ERROR |
| I { G | RS/E(S) | RM/M | ERROR | ERROR |

MAIN MEMORY TAG 27

FIG.7B

| CACHE STATE TAG 24 \ COMMAND FROM SHARED BUS | | RS | RM | INV | WB |
|---|---|---|---|---|---|
| M (P) | | CR/O | CRI/I·G | ERROR | ERROR |
| O (G) | | CR/O | CRI/I·G | CI/I·G | ERROR |
| E (P) | | CR/O (S) | CRI/I·G | ERROR | ERROR |
| S (G) | | CR/S | CRI/I·G | CI/I·G | WR/S |
| I | P | CR/I·G | CRI/I·G | ERROR | ERROR |
| | G | CR/I·G | CRI/I·G | — | WR/I·G |

MAIN MEMORY TAG 27

FIG.8A

| CACHE STATE TAG 24 \ COMMAND FROM INTERNAL BUS | CR | CRI | CI | WR |
|---|---|---|---|---|
| M | ERROR | ERROR | ERROR | WB/I |
| O | ERROR | ERROR | INV/M | WB/I |
| E | RS/E(S) | RM/M | -/M | ERROR |
| S | RS/E(S) | RM/M | INV/M | ERROR |
| I | RS/E(S) | RM/M | ERROR | ERROR |

FIG.8B

| CACHE STATE TAG 24 \ COMMAND FROM SHARED BUS | RS | RM | INV | WB |
|---|---|---|---|---|
| M | CR/O | CRI/I | ERROR | ERROR |
| O | CR/O | CRI/I | CI/I | ERROR |
| E | -/S | CI/I | ERROR | ERROR |
| S | — | CI/I | CI/I | — |
| I | — | — | — | — |

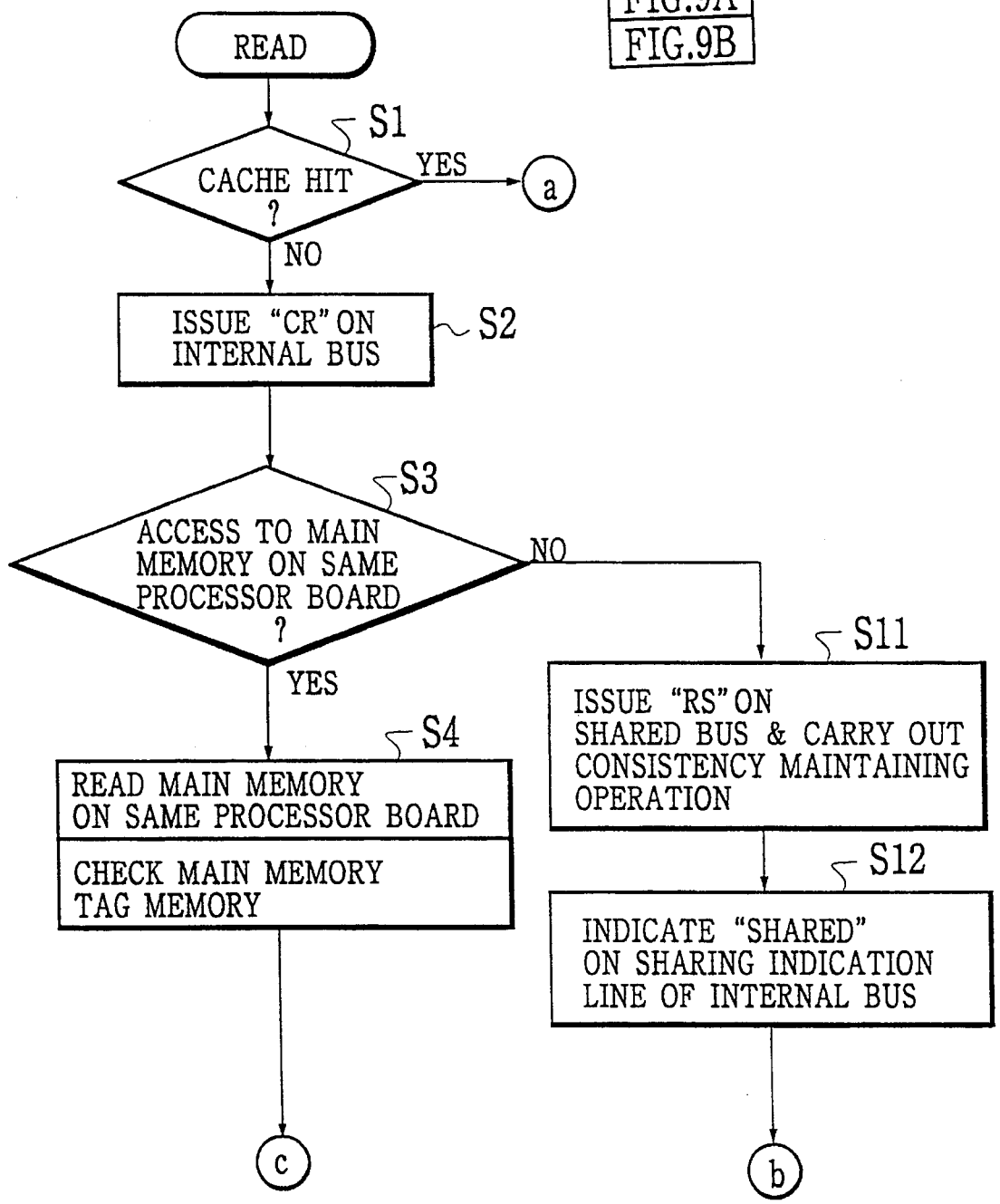

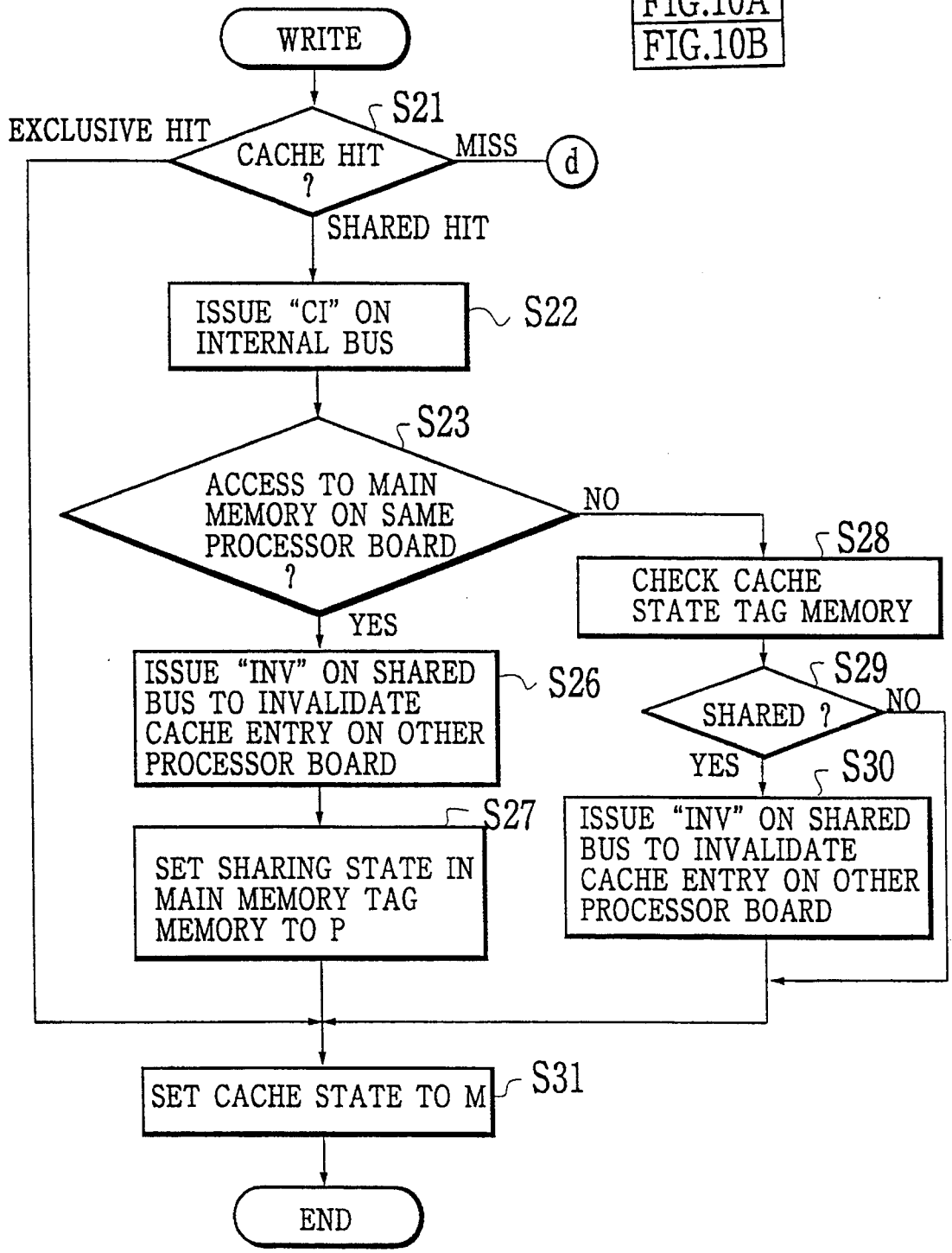

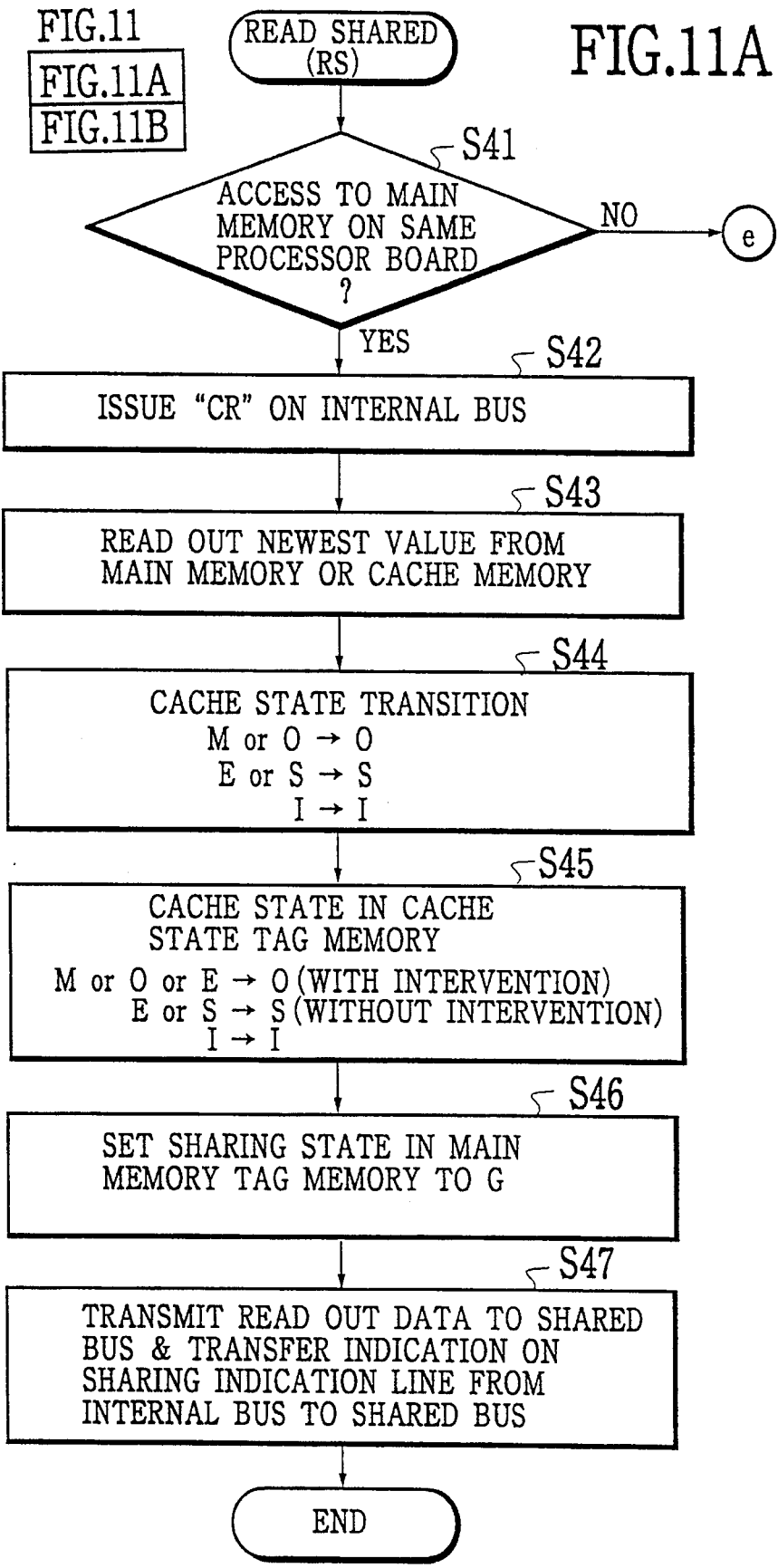

FIG.22A

| CACHE STATE TAG 12 \ INSTRUCTION FROM CPU | Read | Write |
|---|---|---|
| M | HIT | HIT |
| O | HIT | CI/M |
| E | HIT | HIT/M |
| S | HIT | CI/M |
| I | CR/E(S)(O) | CRI/M |

FIG.22B

| CACHE STATE TAG 12 \ COMMAND FROM INTERNAL BUS | CR | CRI | CI | WR |
|---|---|---|---|---|
| M | INTERVENTION/ O(S) | INTERVENTION/I | ERROR | ERROR |
| O | INTERVENTION/ O(S) | INTERVENTION/I | —/I | ERROR |
| E | —/S | —/I | ERROR | ERROR |
| S | — | —/I | —/I | — |
| I | — | — | — | — |

FIG.23

| FIG.23 |
|---|
| FIG.23A |
| FIG.23B |

FIG.23A

| COMMAND FROM INTERNAL BUS / CACHE STATE TAG 24 | CR | CRI | CI | WR |
|---|---|---|---|---|
| M (P) | ERROR | ERROR | ERROR | –/I·P |
| O (G) | ERROR | ERROR | INV/M | –/I·G |
| E (P) | — | –/M | ERROR | –/I·P |
| S (G) | RS/E(S) (O) | RM/M | INV/M | ERROR |
| I  P | –/E | –/M | ERROR | ERROR |
| I  G | RS/E(S) (O) | RM/M | ERROR | ERROR |

MAIN MEMORY TAG 27

FIG.23B

| COMMAND FROM SHARED BUS<br>CACHE STATE TAG 24 | RS | RM | INV | WB |
|---|---|---|---|---|
| M (P) | CR/O | CRI/I·G | ERROR | ERROR |
| O (G) | CR/O | CRI/I·G | CI/I·G | ERROR |
| E (P) | CR/O (S) | CRI/I·G | ERROR | ERROR |
| S (G) | CR/S | CRI/I·G | CI/I·G | WR/S |
| I { P | CR/I·G | CRI/I·G | ERROR | ERROR |
|     G | CR/I·G | CRI/I·G | — | WR/I·G |

MAIN MEMORY TAG 27

FIG.24A

| CACHE STATE TAG 24 \ COMMAND FROM INTERNAL BUS | CR | CRI | CI | WR |
|---|---|---|---|---|
| M | ERROR | ERROR | ERROR | WB/I |
| O | ERROR | ERROR | INV/M | WB/I |
| E | RS/E(S) | RM/M | —/M | ERROR |
| S | RS/E(S) | RM/M | INV/M | ERROR |
| I | RS/E(S) | RM/M | ERROR | ERROR |

FIG.24B

| CACHE STATE TAG 24 \ COMMAND FROM SHARED BUS | RS | RM | INV | WB |
|---|---|---|---|---|
| M | CR/O(S) | CRI/I | ERROR | ERROR |
| O | CR/O(S) | CRI/I | CI/I | ERROR |
| E | —/S | CI/I | ERROR | ERROR |
| S | — | CI/I | CI/I | — |
| I | — | — | — | — |

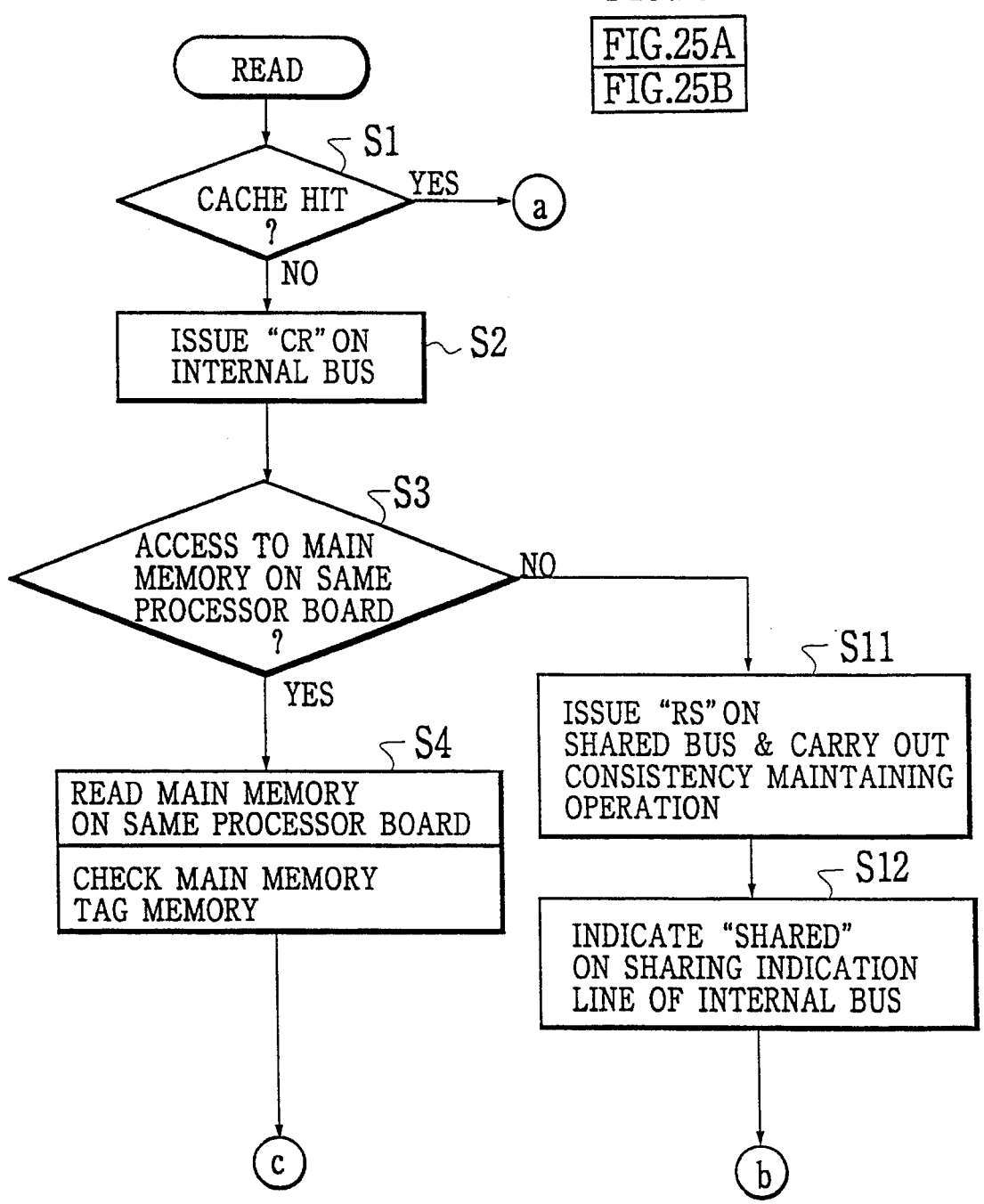

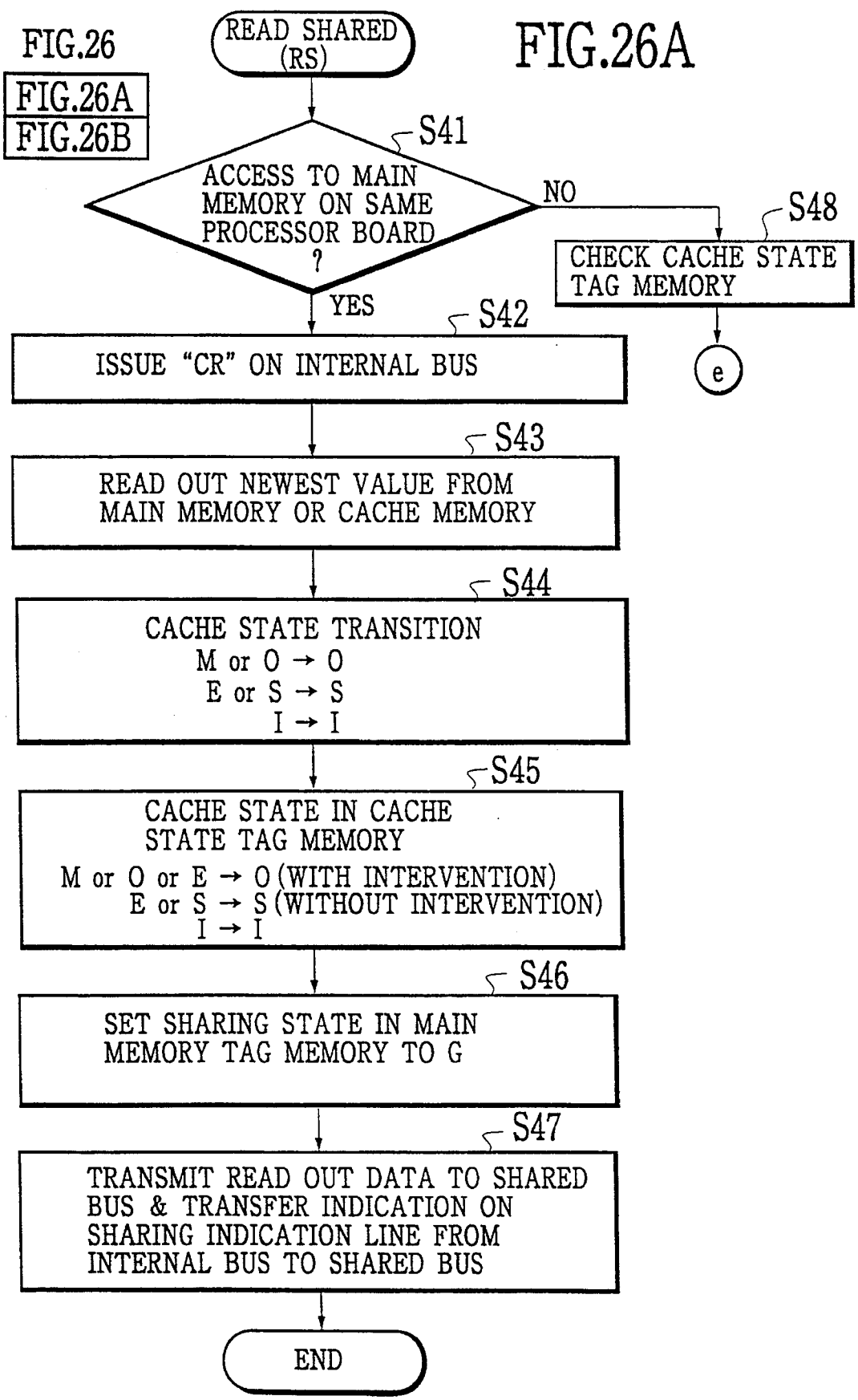

FIG.28A

| CACHE STATE TAG 24 \ COMMAND FROM INTERNAL BUS | | CR | CRI | CI | WR |
|---|---|---|---|---|---|
| M(P) | | ERROR | ERROR | ERROR | −/I·P |
| E | | −/E | −/M | ERROR | −/I·P |
| S | | RS/E(S) | RM/M | INV/M | ERROE |
| I | P | −/E | −/M | ERROR | ERROR |
| | G | RS/E(S) | RM/M | ERROR | ERROR |

FIG.28B

| CACHE STATE TAG 24 \ COMMAND FROM SHARED BUS | | RS | RM | INV | WB |
|---|---|---|---|---|---|
| M(P) | | CR/S | CRI/I·G | ERROR | ERROR |
| E | | CR/S | CRI/I·G | ERROR | ERROR |
| S | | CR/S | CRI/I·G | INV/I·G | ERROR |
| I | P | CR/I·G | CRI/I·G | ERROR | ERROR |
| | G | CRI/I·G (WR/I·G) | CRI/I·G (WR/I·G) | −/I·G | WR/I·P |

FIG.29A

| CACHE STATE TAG 24 \ COMMAND FROM INTERNAL BUS | CR | CRI | CI | WR |
|---|---|---|---|---|
| M | ERROR | ERROR | ERROR | WB/I |
| E | RS/E(S) | RM/M | —/M | ERROR |
| S | RS/E(S) | RM/M | INV/M | ERROR |
| I | RS/E(S) | RM/M | ERROR | ERROR |

FIG.29B

| CACHE STATE TAG 24 \ COMMAND FROM SHARED BUS | RS | RM | INV | WB |
|---|---|---|---|---|
| M | CR/S | CRI/I | ERROR | ERROR |
| E | —/S | CI/I | ERROR | ERROR |
| S | —/S | CI/I | CI/I | —/S |
| I | — | — | — | — |

| CACHE STATE TAG 24 \ COMMAND FROM INTERNAL BUS | | CR | CRI | CI | WR |
|---|---|---|---|---|---|
| M (P) | | ERROR | ERROR | ERROR | -/I·P |
| O (G) | | ERROR | ERROR | INV/M | -/I·G |
| E (P) | | -/E | -/M | ERROR | -/I·P |
| S | G | -/S·G | -/M | INV/M | ERROR |
|   | A | RS/S·A | RM/M | INV/M | ERROR |
| I | P | -/E | -/M | ERROR | ERROR |
|   | G | -/S·G | INV/M | ERROR | ERROR |
|   | A | RS/S·A | RM/M | ERROR | ERROR |

FIG.33B

| COMMAND FROM SHARED BUS / CACHE STATE TAG 24 | | RS | RM | INV | WB |
|---|---|---|---|---|---|
| M (P) | | CR/O | CRI/I·A | ERROR | ERROR |
| O (G) | | CR/O | CRI/I·A | CI/I·A | ERROR |
| E (P) | | CR/O (S·G) | CRI/I·A | ERROR | ERROR |
| S | G | CR/S·G | CRI/I·A | CI/I·A | WR/S·G |
| S | A | –/S·A | CI/I·A | CI/I·A | WR/S·G |
| I | P | CR/I·G | CRI/I·A | ERROR | ERROR |
| I | G | CR/I·G | CRI/I·A | –/I·A | WR/I·G |
| I | A | –/I·A | –/I·A | –/I·A | WR/I·G |

FIG.34A

| CACHE STATE TAG 24 \ COMMAND FROM INTERNAL BUS | CR | CRI | CI | WR |
|---|---|---|---|---|
| M | ERROR | ERROR | ERROR | WB/I |
| O | ERROR | ERROR | INV/M | WB/I |
| E | RS/E(S) | RM/M | —/M | ERROR |
| S | RS/E(S) | RM/M | INV/M | ERROR |
| I | RS/E(S) | RM/M | ERROR | ERROR |

FIG.34B

| CACHE STATE TAG 24 \ COMMAND FROM SHARED BUS | RS | RM | INV | WB |
|---|---|---|---|---|
| M | CR/O | CRI/I | ERROR | ERROR |
| O | CR/O | CRI/I | CI/I | ERROR |
| E | —/S | CI/I | ERROR | ERROR |
| S | —/S | CI/I | CI/I | —/S |
| I | — | — | — | — |

FIG.39A

| FIG.39 |
|---|
| FIG.39A |
| FIG.39B |

| CACHE STATE TAG 24 \ COMMAND FROM INTERNAL BUS | | CR | CRI | CI | WR |
|---|---|---|---|---|---|
| M (H) | | ERROR | ERROR | ERROR | –/I·H |
| O (H) | | ERROR | ERROR | INV/M | –/I·H |
| E (H) | | –/E | –/M | ERROR | –/I·H |
| S | H | –/S·H | INV/M | INV/M | ERROR |
|   | A | RS/S·A | RM/M | INV/M | ERROR |
| I | H | –/S·H | INV/M | ERROR | ERROR |
|   | A | RS/S·A | RM/M | ERROR | ERROR |

FIG.39B

| COMMAND FROM SHARED BUS / CACHE STATE TAG 24 | | RS | RM | INV | WB |
|---|---|---|---|---|---|
| M (H) | | CR/O | CRI/I·A | ERROR | ERROR |
| O (H) | | CR/O | CRI/I·A | CI/I·A | ERROR |
| E (H) | | CR/O (S·H) | CRI/I·A | ERROR | ERROR |
| S | H | CR/S·H | CRI/I·A | CI/I·A | ERROR |
| S | A | −/S·A | CI/I·A | CI/I·A | WR/S·H |
| I | H | CR/I·H | CRI/I·A | −/I·A | ERROR |
| I | A | −/I·A | −/I·A | −/I·A | WR/I·H |

FIG.40A

| CACHE STATE TAG 24 \ COMMAND FROM INTERNAL BUS | CR | CRI | CI | WR |
|---|---|---|---|---|
| M | ERROR | ERROR | ERROR | WB/I |
| O | ERROR | ERROR | INV/M | WB/I |
| E | RS/E(S) | RM/M | —/M | ERROR |
| S | RS/E(S) | RM/M | INV/M | ERROR |
| I | RS/E(S) | RM/M | ERROR | ERROR |

FIG.40B

| CACHE STATE TAG 24 \ COMMAND FROM SHARED BUS | RS | RM | INV | WB |
|---|---|---|---|---|
| M | CR/O | CRI/I | ERROR | ERROR |
| O | CR/O | CRI/I | CI/I | ERROR |
| E | —/S | CI/I | ERROR | ERROR |
| S | —/S | CI/I | CI/I | —/S |
| I | — | — | — | — |

DISTRIBUTED SHARED-MEMORY MULTIPROCESSOR SYSTEM WITH REDUCED TRAFFIC ON SHARED BUS

BACKGROUND OF THE INVENTION

1. Field of the Invention

The present invention relates to a tightly coupled multiprocessor system in which a plurality of processors (CPUs) are interconnected through a shared bus.

2. Description of the Background Art

A conventional shared-memory multiprocessor system has a general configuration as shown in FIG. 1, in which a plurality of processors (processor-1 to processor-n) 1000-1 to 1000-n, each of which having a CPU and a cache memory, and a plurality of shared memories (memory-1 to memory-m) 1001-1 to 1001-m are interconnected through a shared bus 1002 or a connection path using switches, such that each of the shared memories 1001-1 to 1001-m can be accessed from any one of the processors 1000-1 to 1000-n equally. Consequently, the parallel programs executed on such a shared-memory multiprocessor can make memory accesses without distinguishing each of the shared memories 1001-1 to 1001-m, and the variables shared by a certain process and the other process can be accessed from that certain process regardless of whether that other process is executed over a plurality of processors or not.

Now, the execution of the parallel programs not only requires accesses to the shared variables, and in fact a majority of the memory accesses required in the execution of the parallel programs are those for the local variables of each program, so that the memory access performance for the local variables has the dominant influence on the overall performance of the multiprocessor system.

In the shared-memory multiprocessor system having a configuration of FIG. 1, even for an access to a local variable not shared among the processors, when a cache miss occurred, a memory access command is transmitted to the shared bus 1002 just as in a case of an access to a shared variable, so as to refill the cache memory by making access to the shared memories. This scheme is advantageous in that there is no need to pay attention to whether the variable is shared among the processors or not, so that the constraints to be imposed at a time of programming the parallel programs can be reduced. However, in this scheme, it is impossible to improve the memory access performance for the local variables.

In order to obtain a high system performance for a tightly coupled multiprocessor system, it is important to reduce the traffic on the shared bus so that an increased number of processors can be coupled together by the shared bus, but in the shared-memory multiprocessor system having a configuration of FIG. 1, the shared bus must be used even for the accesses to the local variables, so that it is practically impossible to couple many processors together in this system, i.e., the extensibility of the system is severely limited.

Now, in recent years, due to the significant progress made in the semiconductor LSI technology, it has become possible for a general purpose computer to be implemented by integrating not just a central processing unit (CPU) but also peripheral devices such as a cache memory and a memory management unit (MMU) on a single chip called a microprocessor. In such a microprocessor, the integration level of 4 or 16 Mbits per chip has been realized for a DRAM to be used for a main memory, and the researches aimed at even higher integration level are in progress. On the benefit of such technological advances, a small scale computer called a work station can be implemented entirely on a single processor board including control units for the peripheral devices such as disk devices and LAN data lines. In such a work station, the high performance level can be realized by tightly coupling the memory and the CPU, to such an extent that the processing performance of the CPU itself can be made comparable to that of the current generation of the general purpose computer. As such, by utilizing the present day technology, it is possible to practically implement the CPU and the memory of a processor on the same processor board.

An alternative conventionally proposed shared-memory multiprocessor system called a distributed shared-memory multiprocessor system has a general configuration as shown in FIG. 2, in which shared memories are distributed over a plurality of processor boards as main memories of the CPUs on the processor boards. Namely, in this configuration of FIG. 2, each one of the processors 1010-1 to 1010-n has a CPU, a cache memory, a main memory, and a bus driving buffer, all of which are implemented on a single processor board, and is coupled with the other processors by a shared bus 1012 via the bus driving buffer provided on each processor board.

In this configuration of FIG. 2, the local variables to be used by the CPU on each processor board are allocated to the main memory of the same processor board, such that the memory accesses to the local variables can be realized without using the shared bus 1012. The shared variables are allocated to the main memory of one of the processor board whose CPUs are sharing these shared variables, such that the memory accesses to the shared variables can be achieved through the shared bus 1012.

However, the already existing parallel programs are programmed without distinguishing the shared variables and the local variables, so that a clear distinction between the shared variables and the local variables required by this distributed shared-memory multiprocessor system of FIG. 2 imposes a considerable constraint on the programming of new parallel programs. In addition, in order to realize this distributed shared-memory multiprocessor system of FIG. 2, the CPU and the memory must be implemented on the same processor board in a form of a microprocessor, but most of the already existing microprocessors do not possess any means for making accesses by distinguishing the local variables and the shared variables.

On the other hand, as far as the memories are concerned, it is impossible to maintain the consistency among the memories unless the execution of the access to the cache memory of the processor on the other processor board by using the shared bus is notified to the other processors whenever it is impossible to deny the possibility that it is the access to the shared variable, so that there arises a need to transmit every memory access command to the shared bus in practice unless it is possible to make a clear distinction between the shared variables and the local variables.

Thus, it is impossible to reduce the traffic on the shared bus in this distributed shared-memory multiprocessor system of FIG. 2, and consequently there remains the problem concerning the severely limited extensibility of the system.

SUMMARY OF THE INVENTION

It is therefore an object of the present invention to provide a distributed shared-memory multiprocessor system capable of reducing a traffic on the shared bus, without imposing any constraints on the types of variables that can be accessed in the parallel programs, so that a high system extensibility can be realized.

According to one aspect of the present invention there is provided a distributed shared-memory multiprocessor system formed by a plurality of processor units coupled through a shared bus, each processor unit comprising: a central processing unit (CPU); a main memory connected with the CPU through an internal bus, for storing a distributed part of data entries of a shared-memory of the system; a cache memory associated with the CPU and connected with the main memory through the internal bus, for caching selected data entries of the shared-memory; and a sharing management unit connected with the main memory and the cache memory through the internal bus, for interfacing the internal bus and the shared bus, including: main memory tag means for storing a sharing state for each data entry of the main memory indicative of whether said each data entry of the main memory on said each processor unit is shared by a cache memory on another processor unit; command means for issuing an invalidation command on the shared bus in response to an execution of a store instruction with respect to a particular data entry in the main memory by the CPU when the sharing state for said particular data entry in the main memory tag means indicates that said particular data entry is shared by said cache memory on another processor unit, the invalidation command commanding said another processor unit to invalidate said particular data entry in said cache memory on another processor unit; cache tag means for storing addresses of the selected data entries stored in the cache memory; and control means for invalidating a certain data entry in the cache memory when the invalidation command for said certain data entry is received from the shared bus and an address of said certain data entry is stored in the cache tag means.

According to another aspect of the present invention there is provided a distributed shared-memory multiprocessor system formed by a plurality of processor units coupled through a shared bus, each processor unit comprising: a central processing unit (CPU); a main memory connected with the CPU through an internal bus, for storing a distributed part of data entries of a shared-memory of the system; a cache memory associated with the CPU and connected with the main memory through the internal bus, for caching selected data entries of the shared-memory; and a sharing management unit connected with the main memory and the cache memory through the internal bus, for interfacing the internal bus and the shared bus, including: cache state tag means for storing a cache state of each data entry of the cache memory indicative of whether said each data entry of the cache memory has been updated in the cache memory of said each processor unit and not written back to the shared-memory; intervention means for intervening during an access to a certain data entry in a main memory in a different processor unit, in response to a read command received from said different processor unit through the shared bus, when a cache state of said certain data entry in the Cache state tag means indicates that said certain data entry has been updated in the cache memory of said each processor unit and not written back to the shared-memory; and control means for controlling a cache state for said certain data entry in the cache state tag means to make a state transition from one cache state with an ownership for said certain data entry indicating a presence of a duty to write back a newest value of said certain data entry from the cache memory to the main memory to another cache state without an ownership for said certain data entry indicating an absence of a duty to write back a newest value of said particular data entry from the cache memory to the main memory when the intervention means intervenes during the access to said certain data entry in said main memory of said different processor unit, and a cache state for a particular data entry other than said certain data entry in the cache state tag means to make a state transition from one cache state without an ownership for said particular data entry indicating an absence of a duty to write back a newest value of said certain data entry from the cache memory to the main memory, to another cache state with an ownership for said particular data entry indicating a presence of a duty to write back a newest value of said particular data entry from the cache memory to the main memory, when an access to said particular data entry from said each processor unit is intervened by an intervention means in another processor unit.

According to another aspect of the present invention there is provided a distributed shared-memory multiprocessor system formed by a plurality of processor units coupled through a shared bus, each processor unit comprising: a central processing unit (CPU); a main memory connected with the CPU through an internal bus, for storing a distributed part of data entries of a shared-memory of the system; a cache memory associated with the CPU and connected with the main memory through the internal bus, for caching selected data entries of the shared-memory; and a sharing management unit connected with the main memory and the cache memory through the internal bus, for interfacing the internal bus and the shared bus, including: main memory tag means for storing a sharing state for each data entry of the main memory indicative of whether said each data entry of the main memory on said each processor unit is shared by a cache memory on another processor unit; cache state tag means for storing a cache state of each data entry of the cache memory indicative of whether said each data entry of the cache memory has been updated in the cache memory on said each processor unit and not written back to the shared-memory; command means for issuing a read command on the shared bus in response to an execution of a load/store instruction with respect to a particular data entry in the main memory by the CPU, when the sharing state for said particular data entry in the main memory tag means indicates that said particular data entry is shared by said cache memory on another processor unit, the read command commanding said another processor unit to read out said particular data entry in said cache memory on another processor unit to the shared bus; and intervention means for intervening an access to a certain data entry in a main memory on different processor unit, in response to the read command received from said different processor unit through the shared bus, when the cache state of said certain data entry in the cache state tag means indicates that said certain data entry has been updated in the cache memory on said each processor unit and not written back to the shared-memory.

According to another aspect of the present invention there is provided a distributed shared-memory multiprocessor system formed by a plurality of processor units coupled through a shared bus, each processor unit comprising: a central processing unit (CPU); a main memory connected with the CPU through an internal bus, for storing a distributed part of data entries of a shared-memory of the system; a cache memory associated with the CPU and connected with the main memory through the internal bus, for caching selected data entries of the shared-memory; and a sharing management unit connected with the main memory and the cache memory through the internal bus, for interfacing the internal bus and the shared bus, including: cache state tag means for storing a cache state of each data entry of the cache memory indicative of whether said each data entry of the cache memory has been updated in the cache memory on said each processor unit and not written back to the shared-memory; and intervention means for intervening an access to a certain data entry in a main memory on different processor unit, in response to an access request received from said different processor unit through the shared bus, when the cache state of said certain data entry in the cache state tag means indicates that said certain data entry has been updated in the cache memory on said each processor unit and not written back to the shared-memory.

Other features and advantages of the present invention will become apparent from the following description taken in conjunction with the accompanying drawings.

BRIEF DESCRIPTION OF THE DRAWINGS

FIGS. 6A and 6B are tables summarizing the state transitions of the cache states in the cache state tag unit of the cache memory of FIG. 4.

FIGS. 7A and 7B are tables summarizing the state transitions of the cache states in the cache state tag memory of the sharing management unit of FIG. 5, for an access to a main memory on the same processor board.

FIGS. 8A and 8B are tables summarizing the state transitions of the cache states in the cache state tag memory of the sharing management unit of FIG. 5, for an access to a main memory on the other processor board.

FIG. 9A–9B are a flow chart for the operation of the distributed shared-memory multiprocessor system of FIG. 3 in response to the read command.

FIG. 10A–10B are a flow chart for the operation of the distributed shared-memory multiprocessor system of FIG. 3 in response to the write command.

FIG. 11A–11B are a flow chart for the operation of the distributed shared-memory multiprocessor system of FIG. 3 in response to the read shared (RS) command on the shared bus.

FIGS. 22A and 22B are tables summarizing the state transitions of the cache states in the cache state tag unit of the cache memory in the second embodiment of a distributed shared-memory multiprocessor system according to the present invention.

FIGS. 23A and 23B are tables summarizing the state transitions of the cache states in the cache state tag memory of the sharing management unit in the second embodiment of a distributed shared-memory multiprocessor system according to the present invention, for an access to a main memory on the same processor board.

FIGS. 24A and 24B are tables summarizing the state transitions of the cache states in the cache state tag memory of the sharing management unit in the second embodiment of a distributed shared-memory multiprocessor system according to the present invention, for an access to a main memory on the other processor board.

FIGS. 25A–25B are a flow chart for the operation of the second embodiment of a distributed shared-memory multiprocessor system according to the present invention, in response to the read command.

FIGS. 26A–26B are a flow chart for the operation of the third embodiment of a distributed shared-memory multiprocessor system according to the present invention, in response to the read shared (RS) command on the shared bus.

FIGS. 28A and 28B are tables summarizing the state transitions of the cache states in the cache state tag memory of the sharing management unit in the third embodiment of a distributed shared-memory multiprocessor system according to the present invention, for an access to a main memory on the same processor board.

FIGS. 29A and 29B are tables summarizing the state transitions of the cache states in the cache state tag memory of the sharing management unit in the third embodiment of a distributed shared-memory multiprocessor system according to the present invention, for an access to a main memory on the other processor board.

FIGS. 33A and 33B are tables summarizing the state transitions of the cache states in the cache state tag memory of the sharing management unit in the fourth embodiment of a distributed shared-memory multiprocessor system according to the present invention, for an access to a main memory on the same processor board.

FIGS. 34A and 34B are tables summarizing the state transitions of the cache states in the cache state tag memory of the sharing management unit in the fourth embodiment of a distributed shared-memory multiprocessor system according to the present invention, for an access to a main memory on the other processor board.

FIGS. 39A and 39B are tables summarizing the state transitions of the cache states in the cache state tag memory of the sharing management unit in the fifth embodiment of a distributed shared-memory multiprocessor system according to the present invention, for an access to a main memory on the same processor board.

FIGS. 40A and 40B are tables summarizing the state transitions of the cache states in the cache state tag memory of the sharing management unit in the fifth embodiment of a distributed shared-memory multiprocessor system according to the present invention, for an access to a main memory on the other processor board.

DETAILED DESCRIPTION OF THE PREFERRED EMBODIMENTS

Figure 1:
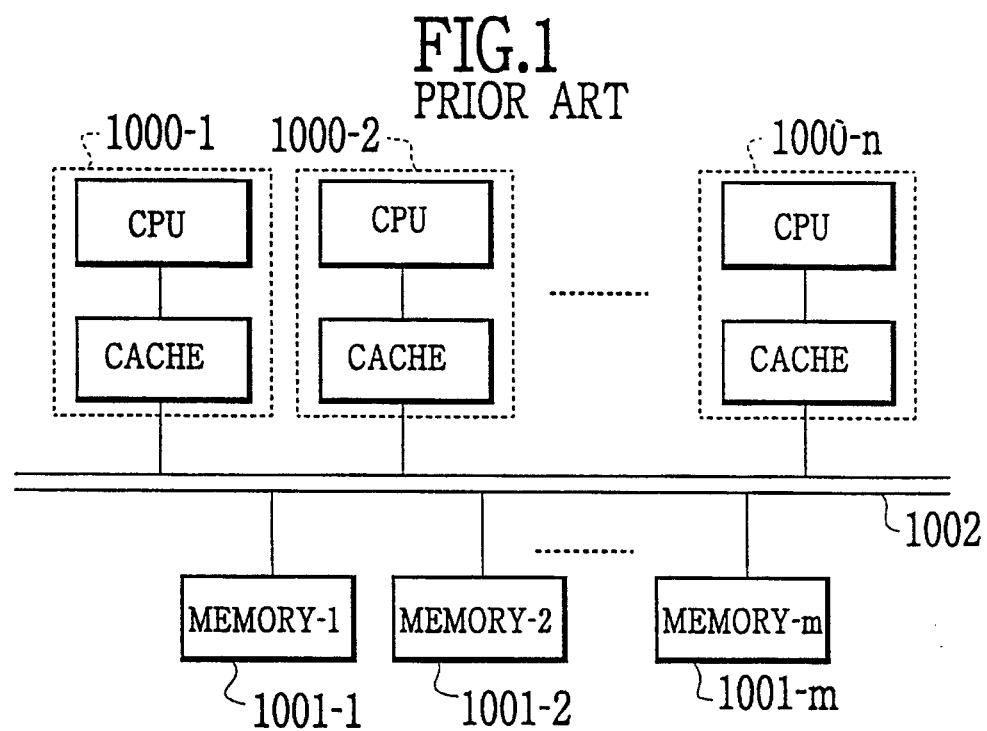
FIG. 1 is a schematic block diagram of a conventional shared-memory multiprocessor system.
Figure 2:
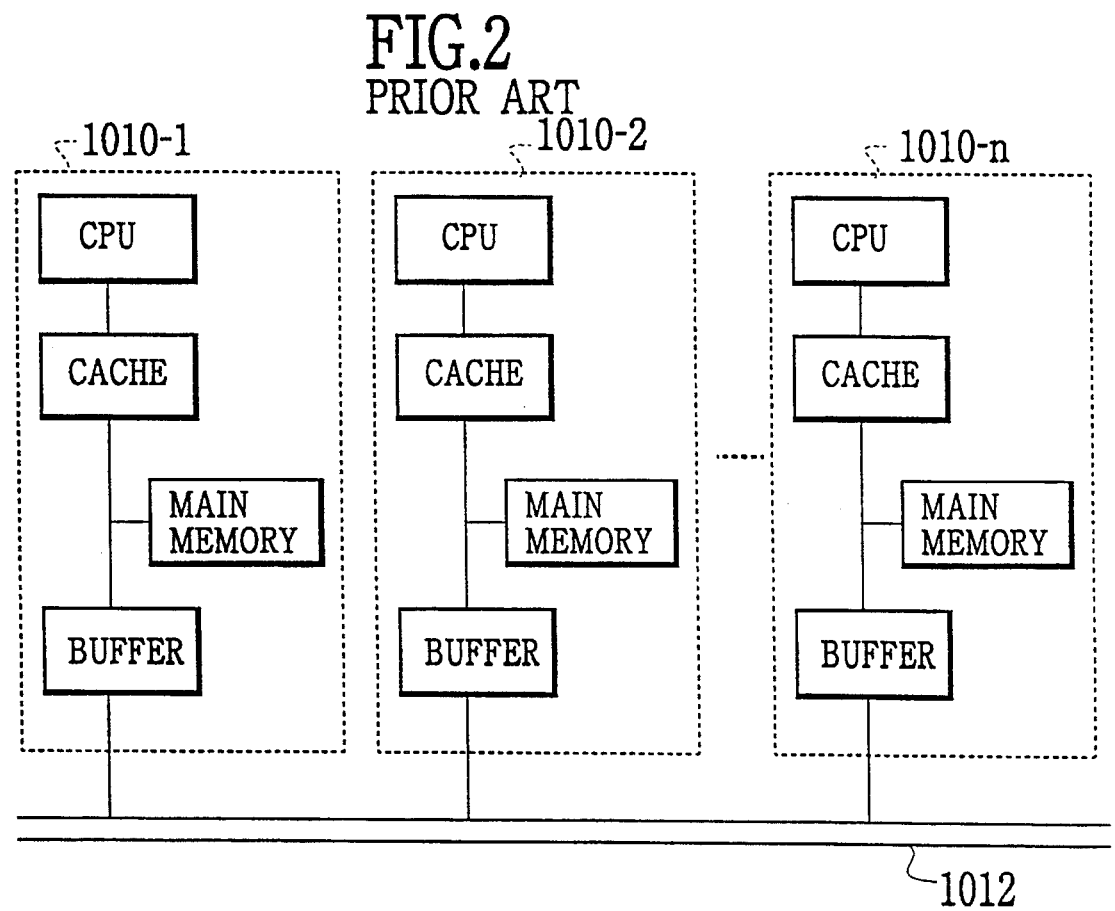
FIG. 2 is a schematic block diagram of a conventional distributed shared-memory multiprocessor system.

First, the general features of the distributed shared-memory multiprocessor system according to the present invention will be outlined.

In short, the present invention is concerned with a distributed shared-memory multiprocessor system in which a plurality of processor boards are coupled together by a shared bus, where each processor board has a CPU, a cache memory, a main memory functioning as a distributed part of the shared-memory of the system, and a sharing management unit functioning as a shared bus interface. The CPU, cache memory, main memory and sharing management unit which are interconnected by an internal bus.

In this distributed shared-memory multiprocessor system of the present invention, the most characteristic feature is the sharing management unit which has the functions of: storing a sharing state for each memory entry indicative of whether or not each cache line of the main memory on a first processor board is shared by the cache memory on a second processor board, and judging whether or not the requested address being accessed by the first CPU on the first processor board is shared by the cache memory of the second processor board at a time of the memory access by the first processor, the second processor board having a second processor; monitoring the traffic on the shared bus, and appropriately changing the stored sharing state of each memory entry influenced by the operation by the traffic; storing the cache state of each cache line of the cache memory on the first processor board, and judging whether the consistency maintaining operation is necessary for the cache memory on the first processor board in response to the memory access request on the shared bus at a time of the memory access by the second processor; and monitoring the traffic on the internal bus, and appropriately changing the stored cache state of each cache line of the cache memory on the first processor board.

In such a distributed shared-memory multiprocessor system of the present invention, the memory access request from the first CPU is transmitted to the internal bus, and when the address to be accessed is in the main memory of the first processor board, the memory access is carried out within the first processor board.

At this point, when the sharing management unit judges that the address to be accessed requested by the first CPU is not shared by the cache memory of the second processor board, the memory access can be completed entirely within the first processor board, without using the shared bus at all, so that traffic on the shared bus can be reduced in such a case, while at the same time, the shared bus can be utilized for other requests made from the second processor.

On the other hand, when the sharing management unit judges that the address to be accessed requested by the first CPU is shared by the cache memory of the second processor board, the shared bus is also used to carry out the consistency maintaining operation with the cache memory on the second processor board which is sharing the address to be accessed.

In a case where the address to be accessed is in the main memory of the second processor board, the memory access is carried out by using the shared bus. In this case, the sharing management unit on the second processor board recognizes the memory access request on the shared bus, and returns the appropriate memory entry by making an appropriate access within the second processor board. At this point, the sharing state of the accessed memory entry is changed from an unshared state to a shared state in the sharing management unit on the second processor board.

When the memory access request is transmitted from one processor board onto the shared bus, each of the other processor boards checks whether or not the address to be accessed is present in the cache memory of its own processor board. When the address to be accessed is found to be present in the cache memory on a certain processor board, the sharing management unit of that certain processor board notifies the one processor board from which the memory access requested originated that the address to be accessed is shared. When no notification of the sharing of the address to be accessed in the cache memory is received from any of the processor boards of the system, the sharing management unit of that one processor board from which the memory access requested originated judges that the address to be accessed is unshared, so that the memory access is subsequently carried out without using the shared bus at all as already mentioned above.

The sharing management unit of each processor board also estimates the state of the cache memory on its own processor board, Judges the necessity of consistency maintaining operations when the requested address to be accessed on the shared bus has been updated in the cache memory of its own processor board or when the requested memory access is for a write operation with respect to the shared variable, and controls the cache memory on its own processor board to carry out the necessary consistency maintaining operations through the internal bus.

The memory access request transmitted onto the internal bus at the beginning is carried out by ascertaining whether or not the address to be accessed is shared by the cache memory on the other processor board, and according to this information, determining the sharing state of each cache line of the cache memory, while changing the cache state of each cache line of the cache memory as appropriate by monitoring the traffic on the internal bus and estimating the cache state transition. As a result, the sharing management unit can judge the necessity of the consistency maintaining operation in response to the traffic on the shared bus, without consulting the cache memory every time, so that the internal bus can be utilized for the operation by the CPU, and an unnecessary interference of the CPU operation due to the shared memory entry access can be eliminated.

More specifically, at a time of write operation with respect to the main memory on a first processor board, when the address to be accessed is shared by the cache memory on a second processor board, the sharing management unit on the first processor board issues the invalation command on the shared bus to invalidating that address in the cache memory of the second processor board, and the sharing management unit on the second processor board monitoring the traffic on the shared bus carries out the invalidation of that address in the cache memory on that other processor board according to this invalidation command on the shared bus, such that the consistency among the memories can be maintained without unnecessarily increasing the traffic on the shared bus.

On the other hand, at a time of read operation with respect to the main memory on a first processor board, when the address to be accessed is shared by the cache memory on a second processor board, the sharing management unit on the second processor board issues the read command for reading that address from the cache memory on that other processor board to the shared bus, and when the cache state of that address to be accessed in the cache memory on the second processor board is dirty (i.e., has been updated but not written back to the main memory) in addition, the sharing management unit on the second processor board monitoring the traffic on the shared bus intervenes during the read operation with respect to the main memory and transmits the updated cache entry in the cache memory of the second processor board to the first processor board, such that the consistency among the memories can be maintained without unnecessarily increasing the traffic on the shared bus.

Figure 3:
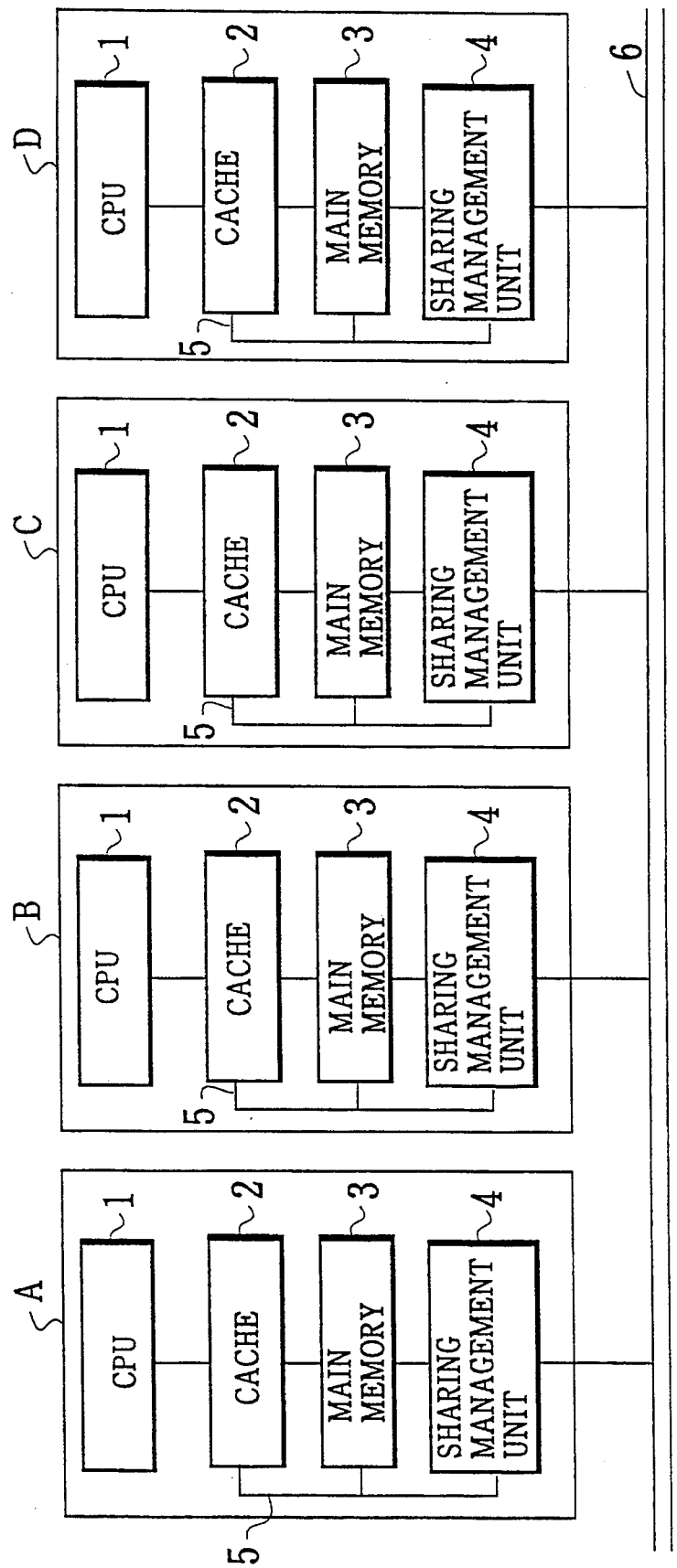
FIG. 3 is a schematic block diagram off a first embodiment of a distributed shared-memory multiprocessor system according to the present invention.

Referring now to FIG. 3, a first embodiment of a distributed shared-memory multiprocessor system according to the present invention will be described in detail.

As shown in FIG. 3, the distributed shared-memory multiprocessor system of this first embodiment generally comprises a plurality of processors A, B, C, and D, where each processor comprises a CPU 1, a cache memory 2, a main memory 3, and a sharing management unit 4, all of which are implemented on a single processor board and interconnected by an internal bus 5. The plurality of processors A, B, C, and D are coupled by a shared bus 6 which is provided on a back plane and connected with the sharing management unit 4 of each processor such that the CPU 1 of each processor can make accesses to the memories on any one of the other processors through the sharing management units 4 and the shared bus 6.

The CPU 1 of each processor has at least one load instruction and at least one store instruction requesting read and write commands with respect to the memories, and executes the program according to the instruction sequence of the program.

Figure 4:
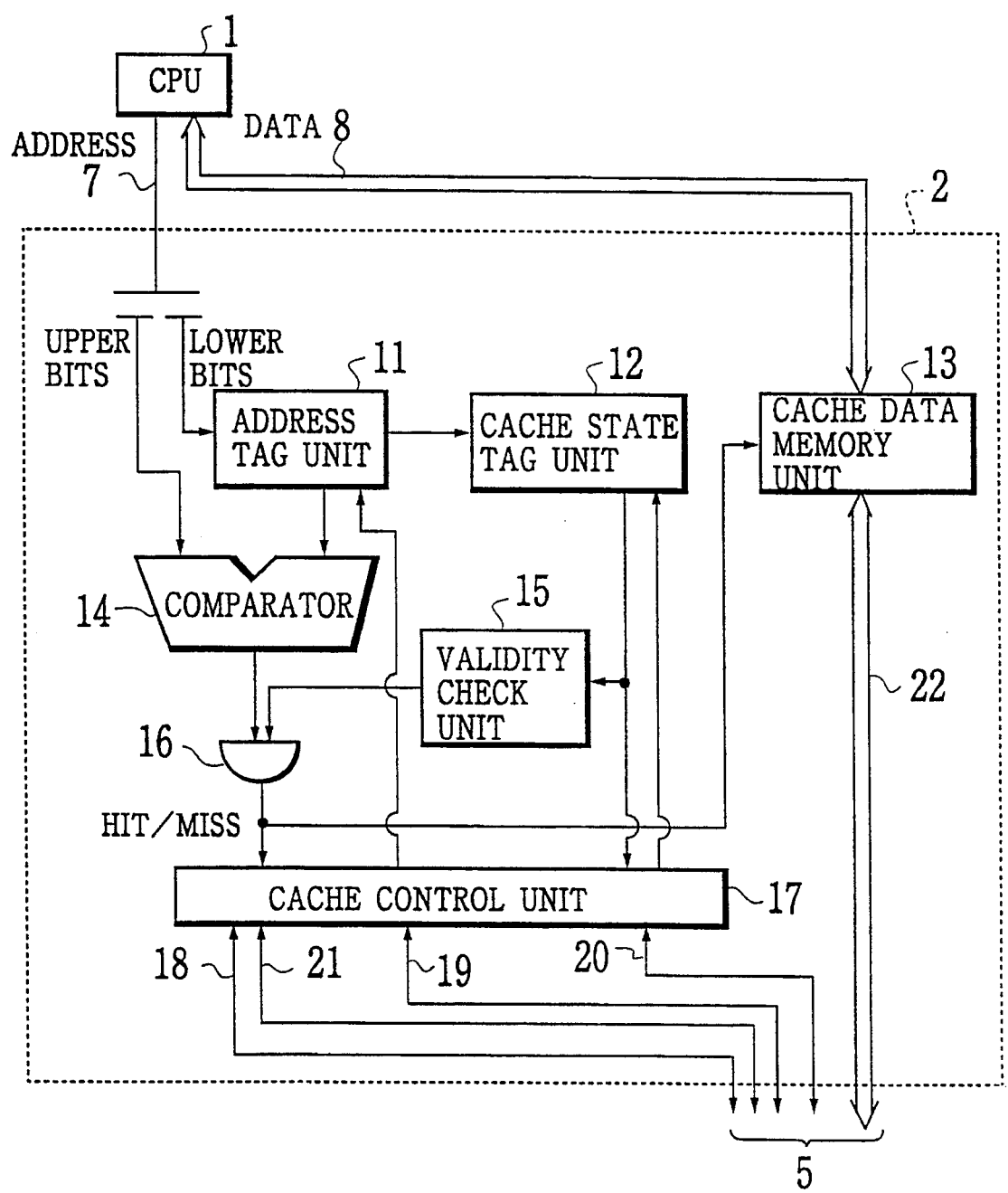
FIG. 4 is a block diagram of a detailed configuration for a cache memory in the distributed shared-memory multiprocessor system of FIG. 3.

The cache memory 2 of each processor has a detailed configuration as shown in FIG. 4, which comprises: a cache data memory unit 13 for storing cache data which are copies of a part of the entire addresses encompassed by the main memories 3 of all of the processors collectively functioning as a shared-memory of the system, and which are read out to the CPU 1 through a data line 8 in a case of cache hit; an address tag unit 11 for storing the addresses on the main memories 3 of the cache data stored in the cache data memory unit 13; a cache state tag unit 12 for storing cache states of the cache data stored in the cache data memory unit 13; a comparator 14 for comparing the upper bits of the address specified by the CPU 1 through an address line 7 and the upper bits of the address stored in the address tag unit 11 which is selected by the lower bits of the address specified by the CPU 1; a validity check unit 15 for checking the validity of the cache data according to the cache state tag unit 12; an AND gate 16 for obtaining a cache hit/miss signal to control the data read out from the cache data memory unit 13, by taking a logical AND of the outputs of the comparator 14 and the validity check unit 15; and a cache control unit 17 to control the address tag unit 11 and the cache state tag unit 12 according to the cache hit/miss signal from the AND gate 16 and the cache state tag unit 12, to realize the consistent cache operation.

In the following, the cache data memory unit 13 of the cache memory 2 is assumed to have a capacity of 1 Mbytes for the sake of definiteness, although the capacity of the cache memory 2 is immaterial to the essence of the present invention.

In this cache memory 2, the management of the address and the state of the cache entry in the cache memory 2 is carried out in units of blocks called cache lines, each of which has a size larger than the data length of the data handled by the CPU 1. In the following, each cache line is assumed to have a size of 64 bytes for the sake of definiteness, although the size of this cache line is also immaterial to the essence of the present invention. In the cache memory 2 of this first embodiment, altogether 16 Klines of the cache lines are managed.

The cache state stored in the cache state tag unit 12 includes a sharing state (shared/unshared) indicating whether the cache data is shared with the other CPU or not, an update state (dirty/clean) indicating whether the cache cache data has been updated to a newest value by the rewriting by the CPU 1, a validity state (valid/invalid) indicating whether the cache data is valid or not, etc. which are similar to the cache states utilized in a usual cache memory for the purpose of maintaining the consistency in the shared-memory.

This cache memory 2 adopts the copy-back scheme with an invalidation type cache coherence protocol. The further details concerning the cache memory operation and the cache coherence protocol for the cache memory of this type can be found in Japanese Patent Application Laid Open No. 2-253356 (1990) and J. Archibald and J. L. Baer, "Cache Coherence Protocols: Evaluation Using a Multiprocessor Simulation Model", ACM Transaction on Computer Systems, Vol. 4, No. 4, pp. 273–298, November 1986.

The main memories 3 are distributed over the plurality of processor boards of the system, with mutually different addresses allocated to each main memory 3. In other words, the access to which main memory 3 on which processor board can be determined uniquely by the address to be accessed.

In the following, the main memory 3 on each processor board is assumed to have a capacity of 64 Mbytes for the sake of definiteness, although the capacity of the main memory 3 is immaterial to the essence of the present invention. In particular, the main memories 3 on the different processor boards may have different capacities in practice.

The internal bus 5 is utilized at times of cache miss and consistency maintaining operation, and includes a sharing indication line 18 for transmitting a signal indicative of whether the address to be accessed is shared by the cache memory on the other processor board or not, a command line 19 for transmitting various command signals to be described below, an address line 20 for transmitting address signals, and an intervention indication line 21 for transmitting a signal indicative of the intervention to be described below, which are connected with the cache control unit 17 of the cache memory 2, as well as a data line 22 for transmitting data signals which is connected with the cache data memory unit 13 of the cache memory 2, as shown in FIG. 4. Here, the sharing indication line 18 is activated by the sharing management unit 4 on the same processor board when it judges that the specified cache line is shared. Also, the data line 22 transmits the data signal in units of cache lines mentioned above.

In addition, the command line 19 of the internal bus 5 transmits the following command signals.

[CR:] (Coherent Read)

A coherent read command is for a shared read on the internal bus 5, which is generated at a time of the read miss by the CPU 1 for commanding the read out of the data while maintaining the consistency.

[CRI:] (Coherent Read and Invalidate)

A coherent read and invalidate command is for an exclusive read on the internal bus 5, which is generated at a time of the write miss by the CPU 1 for commanding the read out of the data while invalidating the cache line of the same address on the cache memory on the other processor board.

[CI:] (Coherent Invalidate)

A coherent invalidate command is for an invalidation request on the internal bus 5, which is generated at a time of the shared write hit by the CPU 1 for commanding the invalidation of the cache line of the same address on the cache memory on the other processor board. This coherent invalidate command is also generated at a time of transmitting the coherent invalidate command from the other processor to the cache memory 2 through the sharing management unit 4 for commanding the invalidation of the corresponding cache entry in the cache memory 2. This coherent invalidate command is not accompanied by the data transmission.

[WR:] (Normal Write)

A normal write command is for a write back on the internal bus 5, which is generated at a time of the cache replacement, provided that the cache line of the replacement target is in the dirty state, for commanding the writing of the data at the cache line of the replacement target.

The shared bus 6 is utilized at a time of consistency maintaining operation, and includes a sharing indication line, a command line, an address line, an intervention indication line, and a data line, similar to those provided in the internal bus 5. Here, the sharing indication line is activated by the sharing management unit 4 on each processor board when it judges that the specified cache line is stored in the cache memory 2 of the same processor board, such that the specified cache line can be judged as being shared when the sharing indication line is activated by the sharing management unit 4 on any one processor board. Such a connection logic can be easily realized by the wired-or connection of the logical circuits with open collector type outputs. Also, the data line 21 transmits the data signal in units of cache lines mentioned above.

In addition, the command line of the shared bus 6 transmits the following command signals.

[RS:] (Read Shared)

A read shared command is for a shared read on the shared bus 6 which commands the read out of the data while maintaining the consistency.

[RM:] (Read Modified)

A read modified command is for an exclusive read on the shared bus 6 which commands the read out of the data while maintaining the consistency and invalidating the corresponding cache entry on the cache memory on the other processor board.

[INV:] (INValidate)

An invalidate command is for an invalidation request on the shared bus 6 which commands the invalidation of the corresponding cache entry on the cache memory on the other processor board.

[WB:] (Write Back)

A write back command is for a write back on the shared bus 6 over the processor boards, in which the data read out to the other processor board and rewritten therein is written back to the main memory of the original processor board.

Figure 5:
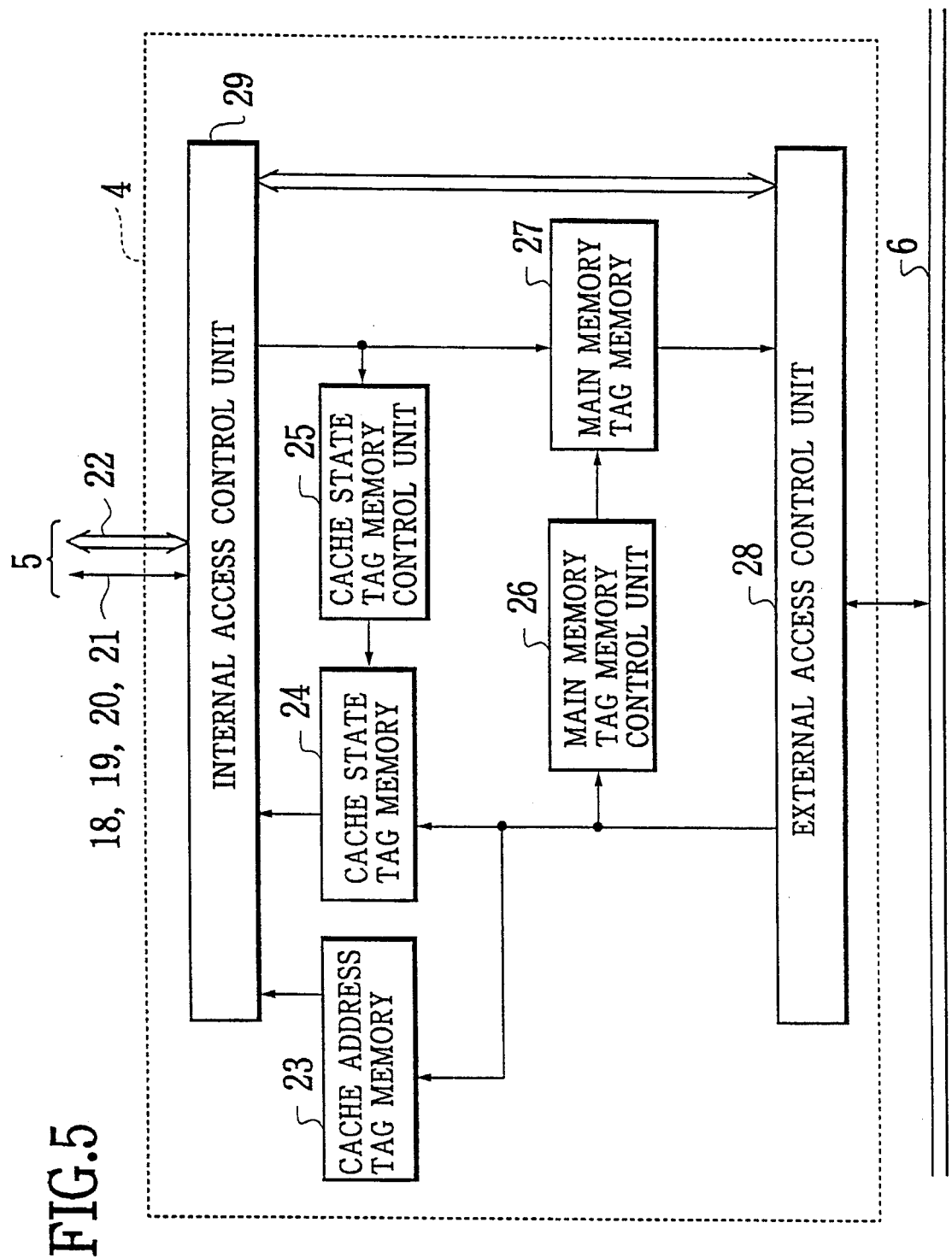
FIG. 5 is a block diagram of a detailed configuration for a sharing management in the distributed shared-memory multiprocessor system of FIG. 3.

The sharing management unit 4 of each processor has a detailed configuration as shown in FIG. 5, which includes: a main memory tag memory 27 having a memory capacity of 1 bit per each line of the main memory 3, for storing whether each line of the main memory 3 is present on the cache memory 2 on the other processor board or not; a cache address tag memory 23 having the same memory capacity as the address tag memory 11 of the cache memory 2 for storing the addresses estimated to be stored in the address tag memory 11; and a cache state tag memory 24 having the same memory capacity as the cache state tag unit 12 of the cache memory 2, for storing the estimated cache state of the cache memory 2 in order to indicate the state of the address requested by the access on the shared bus 6 in the cache memory 2 of the same processor board.

The sharing management unit 4 further includes: an internal access control unit 29 for controlling accesses on the internal bus 5; an external access control unit 28 for controlling accesses on the shared bus 6; a main memory tag memory control unit 26 for controlling the read out and the updating of the main memory tag memory 27; and a cache state tag memory control unit 25 for controlling the read out and the updating of the cache state tag memory 24.

In this first embodiment, the main memory tag memory 27 has a capacity of 1 Mbit, where each bit takes a value of 1 when the corresponding cache line of the main memory 3 on the same processor board is present on the cache memory 2 on the other processor board (state G: global), and a value 0 when either only the cache memory 2 on the same processor board has its copy or no copy is present on the cache memory 2 of any processor board (state P: private).

Thus, the state of the main memory tag memory 27 makes the following transition according to the control by the main memory tag memory control unit 26.

(1) The initial state is P.

(2) The state transition to the state G occurs when there is a memory access request in a form of either RS or RM command with respect to the corresponding cache line entry from the other CPU 1 through the shared bus 6.

(3) The state transition to the state P occurs when either INV or RM command is issued with respect to the corresponding cache line entry from its own CPU 1 to the shared bus 6.

The cache address tag memory 23 and the cache state tag memory 24 manage the address on the main memory 3 and the state in the system of each cache line on the cache memory 2, for altogether 16 Klines of the cache lines, just as in the cache memory 2. Here, the state of the cache line falls into one of the following five states.

[M] Exclusive dirty: No copy of this cache line is present on the other cache memory 2, and the data of this cache line have been changed, so that there is a need for the write back to the main memory 3.

[O] Shared dirty: A copy of this cache line may be present on the other cache memory 2, and the data of this cache line have been changed, so that there is a need for the write back to the main memory 3.

[E] Exclusive clean: No copy of this cache line is present on the other cache memory 2, and the data of this cache line have not been changed, so that there is no need for the write back to the main memory 3.

[S] Shared clean: A copy of this cache line may be present on the other cache memory 2, and the data of this cache line have not been changed, so that there is no need for the write back to the main memory 3.

[I] Invalid: This cache line is invalid.

Note here that the cache line is valid in the first four states. Also, in the above, the dirty state is a state in which the cache line has been updated, but the updated data of the cache line have not been written back in the main memory 3 yet, i.e., the state imposed with a duty to write back to the main memory 3, whereas the clean state is a state without such a duty. In a case the cache line is shared, only one cache memory among the cache memories sharing that cache line is required to be imposed with the duty to write back, so that the cache memory which requested to share the dirty cache line is going to be set to the shared clean state S.

Thus, the state of the cache state tag unit 12 of the cache memory 2 makes the following transitions under the control by the cache control unit 17, according to the instructions from the CPU 1 and the commands issued to the internal bus 5 from the sharing management unit 4, as summarized in the tables of FIGS. 6A and 6B.

(1) The initial state is I.

(2) The state transition to the state S occurs either when its own CPU 1 carries out the data read in the state I and the sharing indication line of the internal bus 5 indicates the sharing with the other CPU 1, or when the other CPU 1 carries out the shared read through the shared bus 6 in the state E.

(3) The state transition to the state E occurs when its own CPU 1 carries out the data read in the state I and the sharing indication line of the internal bus 5 indicates the unsharing with the other CPU 1.

(4) The state transition to the state M occurs when its own CPU 1 carries out the data write.

(5) The state transition to the state O occurs when the other CPU 1 carries out the shared read through the shared bus 6 in the M state.

(6) The state transition to the state I occurs when the other CPU 1 carries out the exclusive read or the invalidation request through the shared bus 6.

There is also the state transition from the state I in a case the cache memory replacement is carried out in the state E or S.

On the other hand, the state of the cache state tag memory 24 of the sharing management unit 4 makes the following transitions under the control by the control by the cache state tag memory control unit 25, according to the commands issued to the internal bus 5 from the cache control unit 17 while controlling the state transition of the cache state tag unit 12 as described above and summarized in the table of FIGS. 6A and 6B, and the commands issued to the shared bus 6 from the sharing management units 4 on the other processor boards.

First, for the access to the main memory 3 on the same processor board, the following transitions are made as summarized in the tables of FIGS. 7A and 7B.

(1) The initial state is I.

(2) The state transition to the state S occurs when the main memory tag memory 27 is in the state G while cache state tag memory 24 is in the state I and its own CPU 1 carries out the shared read through the internal bus 5 and the sharing indication line of the shared bus 6 is activated, or when the other CPU 1 carries out the shared read through the shared bus 6 in the state E and there is no intervention from the cache memory 2 on its own processor board.

Here, the intervention is an operation in a case of reading the value from the main memory 3 while there exists the newest value in the cache memory 2 which has not been written back to the main memory 3, in which the cache memory 2 drives the intervention indication line to interrupt the read out from the main memory 3 in response to the command for read out and transmits the newest value to the main memory 3. This intervention is carried out through the internal bus 5 when the main memory 3 to be read and the cache memory 2 having the latest value are on the same processor board, whereas it is carried out through the shared bus 6 when they are on the different processor boards.

(3) The state transition to the state E occurs when its own CPU I carries out the shared read through the internal bus 5 in the state I and the sharing indication line of the shared bus 6 is not activated. Here, there are cases in which the state transition from the state S to the state E occurs even when the cache state tag memory 27 of the sharing management unit 4 is in the state S, as the cache state tag unit 12 of the cache memory 2 could have already made the transition to the state I due to the cache replacement.

(4) The state transition to the state M occurs when its own CPU 1 carries out the exclusive read or the invalidation request, such that the cache memory 2 on the other processor board has been invalidated.

(5) The state transition to the state O occurs when the other CPU 1 carries out the shared read through the shared bus 6 in the state M. Here, the state transition to the state O also occurs when the other CPU 1 carries out the shared read through the shared bus 6 in the state E and there is an intervention from the cache memory 2 (such that the transition to the state M had actually been made), because even when the cache state tag memory 24 of the sharing management unit 4 is in the state E, the cache state tag unit 12 of the cache memory 2 could have already made the transition to the state M due to the write hit.

(6) The state transition to the state I occurs when the other CPU 1 carries out the exclusive read or the invalidation request through the shared bus 6, as well as when the replace operation is carried out.

Next, for the access to the main memory 3 on the other processor board, the following transitions are made as summarized in the tables of FIGS. 8A and 8B.

(1) The initial state is I.

(2) The state transition to the state S occurs when its own CPU 1 carries out the shared read through the internal bus 5 in the state I and the sharing indication line of the shared bus 6 is activated, or when the other CPU 1 carries out the shared read through the shared bus 6 in the state E. Here, there are cases in which the state transition from the state E to the state S occurs just like the transition from the state I, because even when the cache state tag memory 27 of the sharing management unit 4 is in the state E, the cache state tag unit 12 of the cache memory 2 could have already made the transition to the state I due to the cache replacement.

(3) The state transition to the state E occurs when its own CPU 1 carries out the shared read through the internal bus 5 in the state I and the sharing indication line of the shared bus 6 is not activated. Here, there are cases in which the state transition from the state S to the state E occurs just like the transition from the state I, because even when the cache state tag memory 27 of the sharing management unit 4 is in the state S, the cache state tag unit 12 of the cache memory 2 could have already made the transition to the state I due to the cache replacement.

(4) The state transition to the state M occurs when its own CPU 1 carries out the exclusive read or the invalidation request, such that the cache memory 2 on the other processor board has been invalidated.

(5) The state transition to the state O occurs when the other CPU 1 carries out the shared read through the shared bus 6 in the state M.

(6) The state transition to the state I occurs when the other CPU 1 carries out the exclusive read or the invalidation request through the shared bus 6, as well as when the replace operation is carried out.

As the state transitions and the commands are controlled in the cache memory 2 and the sharing management unit 4 as described above, the contents of the cache state tag unit 12 of the cache memory 2 and the cache state tag memory 24 of the sharing management unit 4 coincide with each other except for some exceptional cases, and even in these exceptional cases, the error can be avoided by controlling them as described above. The prevention of the errors by means of the activation of the sharing indication line will be described in detail below.

Now, the operation of this distributed shared-memory multiprocessor system of the first embodiment will be described in detail with references to FIG. 9 to FIG. 13.

First, the operation of the cache control unit 17 and the sharing management unit 4 in response to tile read command is carried out according to the flow chart of FIG. 9, as follows.

In this case, when the CPU 1 has executed the load instruction requesting the read command, if it is a cache hit at the step S1, the read command can be completed by reading the data from the cache memory 2 on the same processor board, so that the process ends promptly.

On the other hand, in a case it is a cache miss at the step S1, next at the step S2, the CR (coherent read) command for the shared read is issued on the internal bus 5, and whether the address to be accessed is of the main memory 3 on the same processor board or not is determined at the step S3.

In a case it is an access to the main memory 3 on the same processor board at the step S3, next at the step S4, the main memory 3 on the same processor board is accessed and the data are read out from the appropriate address, while the internal access control unit 22 of the sharing management unit 4 on the same processor board recognizes the memory access request on the internal bus 5 and checks the main memory tag memory 27 to judge whether the cache line requested by the memory access request is shared with the cache memory 2 on the other processor board or not at the next step S5.

When the cache line to be accessed is not shared at the step S5, the data read out from the main memory 3 by the memory access request is loaded into the cache memory 2 on the same processor board at the step S6, and the sharing indication line of the internal bus 5 is controlled to indicate "unshared" at the step S7. In this case, the operation of the sharing management unit 4 is terminated at the step S5 as the shared read on the internal bus can be completed by simply accessing the main memory 3 on the same processor board.

This corresponds to a case of the access to the local variables allocated to the main memory on the same processor board, which predominates the accesses required in the execution of the program. Here, the access is made without using the shared bus, so that the traffic on the shared bus can be reduced. In addition, the shared bus 6 can be utilized for handling the memory access request from the other processors, so that the interference among the processors can be reduced as well.

On the other hand, when the cache line to be accessed is shared at the step S5, next at the step S8, the read shared (RS) command for the shared read is issued on the shared bus 6 through the external access control unit 28 of the sharing management unit 4 on the same processor board in order to carry out the following consistency maintaining operation. Namely, if there is a newest value of the address to be accessed in the cache memory 2 on the other processor board which shares this address, the sharing management unit 4 on that other processor board intervenes the read operation with respect to the main memory 3 and supplies the newest value read out from the cache memory 2 on that other processor board. Otherwise, the main memory 3 is accessed to read the data from the appropriate address and the data read out from the main memory 3 is loaded into the cache memory 2 on the same processor board.

Then, next at the step S9, whether there has been any intervention in the consistency maintaining operation or not is determined. In a case there has been the intervention at the step S9, the intervention indication line of the internal bus 5 is activated at the step S10, the cache state of this cache entry is set to the state O at the step S11, and the process terminates.

Otherwise, at the step S12, the sharing state in the main memory tag memory 27 on the same processor board is changed according to the indication on the sharing indication line of the shared bus 6 so as to detect the release of the sharing between the present access and the previous access. Then, the indication on the sharing indication line of the shared bus 6 is transferred to the sharing indication line of the internal bus 5 at the step S13.

In a case it is an access to the main memory 3 on the other processor board at the step S3, next at the step S14, the sharing management unit 4 on the same processor board issues the read shared (RS) command for the shared read on the shared bus 6 and carries out the consistency maintaining operation similar to that described above. At this point, the sharing management unit 4 on that other processor board which has the main memory 3 to be accessed responds to this shared read, and sets the sharing state in the main memory tag memory 27 to the state G to indicate the start of the sharing. Then, the indication on the sharing indication line of the internal bus 5 is set to be "shared", regardless of the indication of the sharing indication line of the shared bus 6, at the step S15.

The cache line read out in such a manner is stored in the cache memory 2, and depending on the indication on the sharing indication line of the internal bus 5 at the step S16, the cache state of the cache line is set to the state E at the step S17 in a case the indication is "unshared", or else the cache state of the cache line is set to the state S at the step S18 in a case the indication is "shared", and the process terminates.

Here, the attention should be paid to the difference between the steps S13 and S15, which corresponds to the aforementioned prevention of the errors by means of the activation of the sharing indication line. Namely, when the main memory on the other processor board is accessed while the sharing indication line of the sharing bus indicates "unshared", the cache state in the cache state tag memory 24 of the sharing management unit 4 is set to the state E, but in this case the sharing management unit 4 sets the indication of the sharing indication line of the internal bus 5 to be "shared" even when the sharing indication line state is set to the state S.

This provision is adopted because if the cache state is set to be the state E, the CPU 1 makes the state transition to the state M without issuing the invalidation request even when the write operation is carried out with respect to this memory entry, so that the cache state tag memory 24 of the sharing management unit 4 would fail to recognize this rewriting of the memory entry, and consequently it becomes impossible to respond correctly to the subsequent read request on the shared bus 6. To cope with this difficulty, in the above described provision, the state of the cache memory 2 and the cache state in the cache state tag memory 24 are made to be not identical.

Here, it is to be noted that when the cache state is the state S, the invalidation request is issued at a time of the write operation by the cache memory 2, so that the sharing management unit 4 can recognize the rewriting. In this case, the fact that the cache state In the cache state tag memory 24 is the state E implies that there is no need for the invalidation request on the internal bus 5 to transfer to the shared bus 6, so that the traffic on the shared bus 6 is not increased.

Figure 10B:
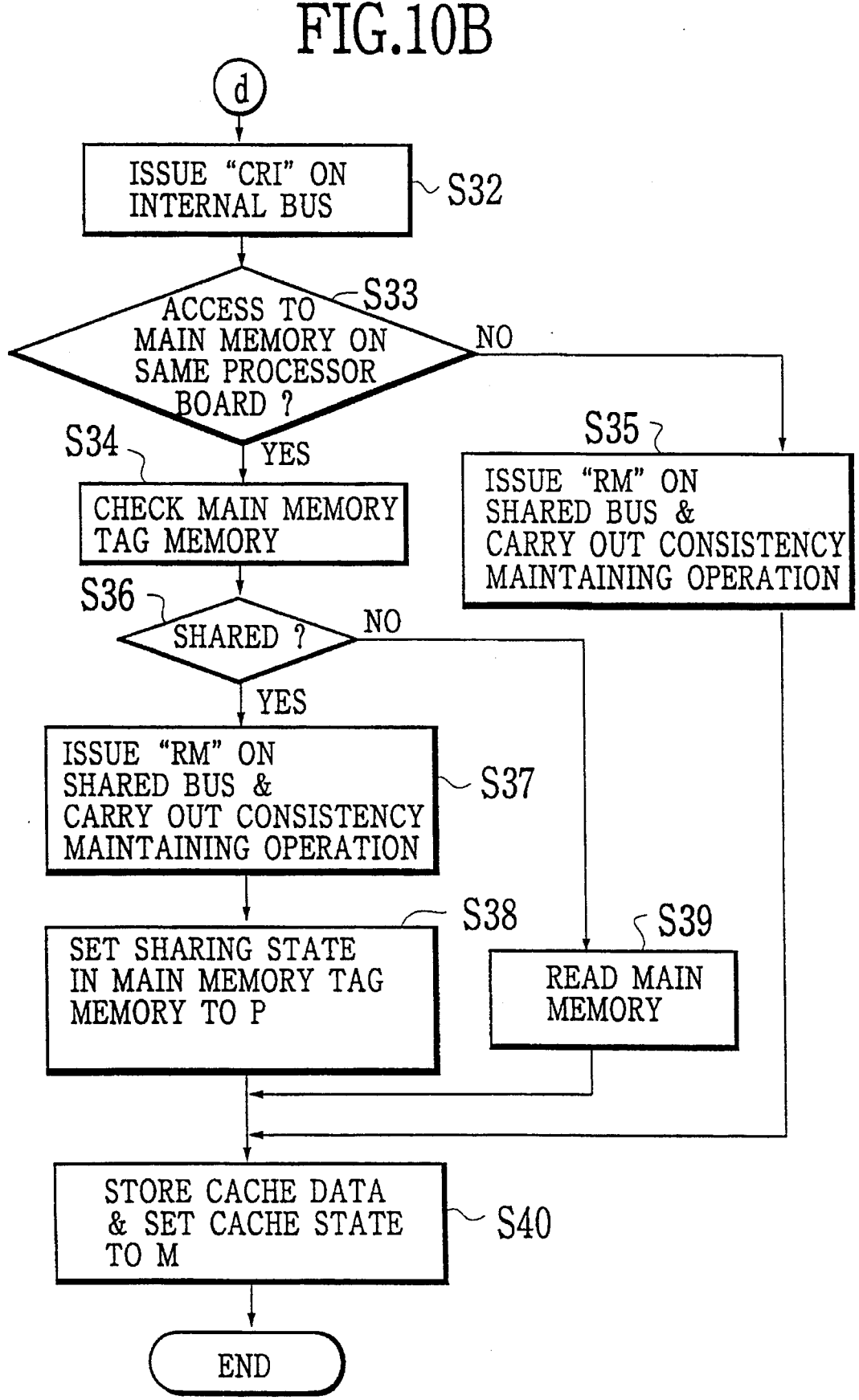

Next, the operation of the cache control unit 17 and the sharing management unit 4 in response to the write command is carried out according to the flow chart of FIG. 10, as follows.

In this case, when the CPU 1 has executed the store instruction requesting the write command, if it is an exclusive hit at the step S21, the process proceeds to the step 31 at which the write command can be completed by writing the data in the cache memory 2 on the same processor board, so that the cache state is set to the state M, and the process is terminated.

On the other hand, in a case it is a shared hit, i.e., the cache hit while the cache line is shared (cache state tag unit 12 is in the state S or O) at the step S21, there is a need to invalidate the copy of this cache line on the other processor board, so that the coherent invalidate (CI) command for the invalidation request is issued on the internal bus 5 at the step S22.

Then, at the step S23, the internal access control unit 22 of the sharing management unit 4 on the same processor board recognizes the memory access request on the internal bus 5 and determines whether the address to be accessed is of the main memory 3 on the same processor board or not.

In a case it is an access to the main memory 3 on the same processor board at the step S23, next at the step S26, the invalidate (INV) command for the invalidation request is issued on the shared bus from the external access control unit 28 of the sharing management unit 4 on the same processor board, to invalidate the cache entry in the cache memory 2 of the other processor board which shares this cache line. Then, at the step S27, the sharing state in the main memory tag memory 27 is set to the state P, and the process proceeds to the step S31 as described above.

On the other hand, in a case it is an access to the main memory 3 on the other processor board at the step S23, next at the step S28, the cache state in the cache state tag memory 24 is checked, and whether the cache state is one of the shared states (S or O) or not is determined at the step S29.

When the cache state is one of the shared states at the step S29, next at the step S30, the invalidate (INV) command for the invalidation request is issued on the shared bus from the external access control unit 28 of the sharing management unit 4 on the same processor board, to invalidate the cache entry in the cache memory 2 of the other processor board which shares this cache line, and then the process proceeds to the step 31 as described above. In this case, the cache entry in the same processor board remained uninvalidated, so that the sharing state in the main memory tag memory 27 of the sharing management unit 4 of the processor board with the main memory accessed in this execution is left as the state G, in order to indicate that the sharing is continuing.

When the cache state is not one of the shared states at the step S29, i.e., the cache state is the state E, the invalidation request on the internal bus 5 implies the cache hit at the cache memory 2 on the same processor board in accordance with the above described prevention of the errors by means of the activation of the sharing indication line, so that no command is transmitted to the shared bus 6.

In a case it is a cache miss at the step S21, next at the step S32, the coherent read and invalidate (CRI) command for the exclusive read is issued on the internal bus 5.

Then, at the step S33, the internal access control unit 29 of the sharing management unit 4 on the same processor board recognizes the memory access request on the internal bus 5 and determines whether the address to be accessed is of the main memory 3 on the same processor board or not.

In a case it is an access to the main memory 3 on the same processor board at the step S33, next at the step S34, the main memory 3 on the same processor board is accessed and the data are read out from the appropriate address, while the internal access control unit 22 of the sharing management unit 4 on the same processor board recognizes the memory access request on the internal bus 5 and checks the main memory tag memory 27, and Judges whether the cache line requested by the memory access request is shared with the cache memory 2 on the other processor board or not at the next step S36.

When the cache line to be accessed is shared at the step S36, the read modified (RM) command for the exclusive read is issued on the shared bus 6 from the external access control unit 28 of the sharing management unit 4, and the consistency maintaining operation is carried out at the step S37. Namely, if there is a newest value of the address to be accessed in the cache memory 2 on the other processor board which shares this address, the sharing management unit 4 on that other processor board intervenes the write operation with respect to the main memory 3 and supplies the newest value read out from the cache memory 2 on that other processor board. Otherwise, the main memory 3 is accessed to read the data from the appropriate address and the data read out from the main memory 3 is loaded into the cache memory 2 on the same processor board.

In this case, the cache entry of the cache memory 2 on that other processor board is invalidated, so that the cache memory 2 on the same processor board has the exclusive copy of this cache line. Consequently, the sharing state in the main memory tag memory 27 is set to the state P, and the process proceeds to the step 40 at which the data read out from the main memory 3 by the memory access request is loaded into the cache memory 2 on the same processor board and then updated by the write operation by the CPU 1, so that the cache state is set to the state M.

When the cache line to be accessed is not shared at the step S36, the main memory 3 is accessed to read the data from an appropriate address at the step S39, and the process proceeds to the step S40 as described above. Here, the operation of the sharing management unit 4 is terminated at the step S36 as the shared read on the internal bus can be completed by simply accessing the main memory 3 on the same processor board. This corresponds to a case of the access to the local variables allocated to the main memory on the same processor board, which predominates the accesses required in the execution of the program. Here, the access is made without using the shared bus, so that the traffic on the shared bus can be reduced. In addition, the shared bus 6 can be utilized for handling the memory access request from the other processors, so that the interference among the processors can be reduced as well.

In a case it is an access to the main memory 3 on the other processor board at the step S33, next at the step S35, the read modified (RM) command for the exclusive read is issued on the shared bus 6 from the external access control unit 28 of the sharing management unit 4, and the consistency maintaining operation similar to that described above is carried out. At this point, the sharing management unit 4 on that other processor board which has the main memory 3 to be accessed responds to this shared read, and sets the sharing state in the main memory tag memory 27 to the state G to indicate the start of the sharing. Then, the process proceeds to the step S40 as described above.

Next, the operation of the cache control unit 17 and the sharing management unit 4 in response to the read shared (RS) command on the shared bus 6 is carried out according to the flow chart of FIG. 11, as follows.

In this case, first at the step S41, the external access control unit 28 of the sharing management unit 4 recognizes this read shared command on the shared bus 6 and determines whether the address to be accessed is of the main memory 3 on the same processor board or not.

In a case it is an access to the main memory 3 on the same processor board at the step S41, next at the step S42, the coherent read (CR) command is issued on the internal bus 5, and the newest value is read out from the main memory 3 or the cache memory 2 on the same processor board at the step S43. Here, however, when the cache state in the cache memory tag unit 12 is in the state I or S, there is no need to read out the newest value or to make a state transition, so that the coherent read command need not be issued on the internal bus 5 and only the access to the main memory 3 can be made. On the other hand, when the cache state is in the state M or O, the intervention occurs.

It is to be noted here that when the write operation is carried out on the cache memory 2 in the state E, the cache state makes the transition to the state M without issuing any command on the internal bus 5, so that the sharing management unit 4 cannot recognize this transition to the state M. Consequently, even when the cache state in the cache state tag memory 24 is the state E, there is a possibility that the actual cache state is the state M, so that the command to be issued on the internal bus 5 must be the coherent read command for the shared read.

As a result of this coherent read command, the cache state in the cache state tag unit 12 makes the following transition under the control by the cache control unit 17 at the step S44.

State M or O → State O
State E or S → State S
State I → State I

In response, the cache state in the cache state tag memory 24 in the sharing management unit 4 makes the following transitions at the step S45.

State M, O or E with the intervention → State O
State S or E without the intervention → State S
State I → State I Also, the main memory tag memory 27 in the sharing management unit 4 is set to the state G at the step S46.

Then, at the step S47, the indication on the sharing indication line of the internal bus 5 is "unshared" when the cache state is the state I and "shared" otherwise, which is transferred to the sharing indication line of the shared bus 6, while the data read out from the main memory 3 or the cache memory 2 is outputted to the shared bus 6.

On the other hand, in a case it is an access to the main memory 3 on the same processor board at the step S41, next at the step S48, the cache state in the cache state tag memory 24 is checked, and whether the cache state is the state I, M or O, or S or E is determined at the step S49.

In a case the cache state is the state I, the valid copy is not present on the cache memory 2 on the same processor board, so that there is no need for the consistency maintaining operation and the activation of the sharing indication line, so that the process terminates.

In a case the cache state is the state M or O, the cache memory 2 of the same processor board has the newest value, so that the coherent read command is issued on the internal bus 5, the newest value is read out from the cache memory 2, and the intervention indication line of the shared bus 6 is activated, so as to supply the newest value to the other processor board with respect to which the intervention has been made, at the step S50.

Then, at the step S51, the cache state of the cache memory 2 on the same processor board is changed from the state M or O to the state O while the cache state in the cache state tag memory 24 of the sharing management unit 4 is changed from the state M or O to the state O.

Then, at the step S52, the sharing indication line is activated as the valid copy is present in the cache memory 2 of this processor board, so that the newest value is read out from the cache memory 2 as a result of issuing the shared read on the internal bus 5 and the intervention is made to the shared bus 6, such that the newest value is supplied instead of the main memory 3 of the other processor board.

In a case the cache state is the state S or E, the cache state in the cache state tag memory 24 of the sharing management unit 4 is changed from the state E to the state S, while it is unchanged in a case the cache state is the state S, at the step S53. In a case of the state E, the cache of the cache memory 2 has already been set to the state S by the above described prevention of the errors, so that there is no need to issue any command on the internal bus 5 in order to inform this state transition to the cache memory 2.

Then, at the step S54, the sharing indication line is activated as the valid copy is present in the cache memory 2 of the same processor board.

Figure 12:
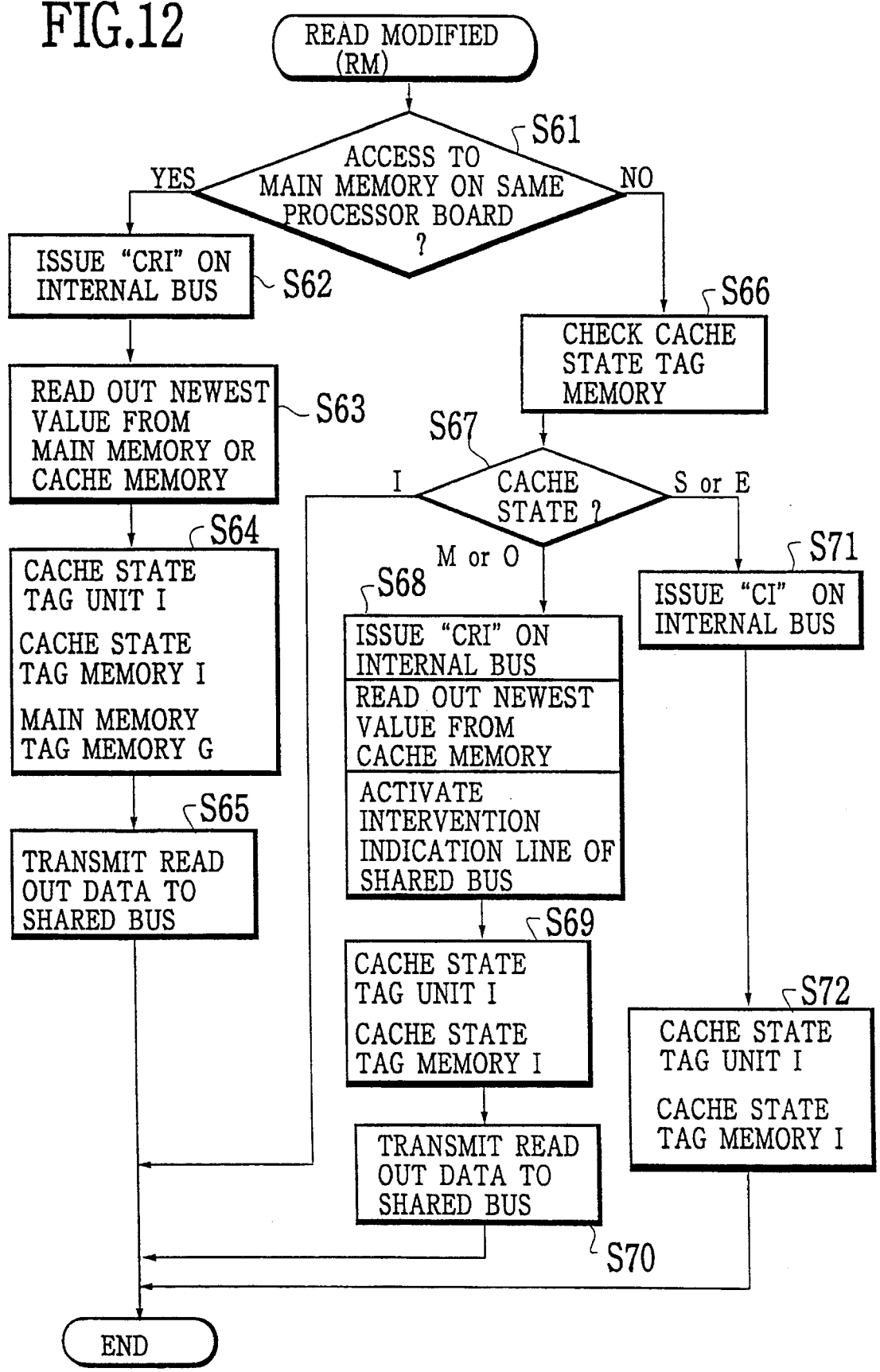
FIG. 12 a flow chart for the operation of the distributed shared-memory multiprocessor system of FIG.3 in response to the read modified (RM) command on the shared bus.

Next, the operation of the cache control unit 17 and the sharing management unit 4 in response to the read modified (RM) command on the shared bus 6 is carried out according to the flow chart of FIG. 12, as follows.

In this case, first at the step S61, the external access control unit 28 of the sharing management unit 4 recognizes this read shared command on the shared bus 6 and determines whether the address to be accessed is of the main memory 3 on the same processor board or not.

In a case it is an access to the main memory 3 on the same processor board at the step S61, next at the step S62, the coherent read and invalidate (CRI) command is issued on the internal bus 5, and the newest value is read out from the main memory 3 or the cache memory 2 on the same processor board at the step S62.

As a result of this coherent read and invalidate command, the cache state in the cache state tag unit 12 and the cache state in the cache state tag memory 24 are set to the state I, while the sharing state in the main memory tag memory 27 is set to the state G, at the step S64.

Then, at the step S65, the latest value of the data read out from the main memory 3 or the cache memory 2 is transmitted through the shared bus 6.

On the other hand, in a case it is not an access to the main memory 3 on the same processor board at the step S61, next at the step S66, the cache state in the cache state tag memory 24 is checked, and whether the cache state is the state I, M or O, or S or E is determined at the step S67.

In a case the cache state is the state I, the valid copy is not present on the cache memory 2 on the same processor board, so that there is no need for the consistency maintaining operation, so that the process terminates without issuing any command on the internal bus 5.

In a case the cache state is the state M or O, the cache memory 2 of the same processor board has the newest value, so that the coherent read and invalidate command is issued on the internal bus 5, the newest value is read out from the cache memory 2, and the intervention indication line of the shared bus 6 is activated, in order to supply the newest value to the other processor board with respect to which the intervention has been made, while this cache entry in the cache memory 2 is invalidated.

As a result, the cache state in the cache state tag unit 12 and the cache state in the cache state tag memory 24 are set to the state I at the step S69.

Then, at the step S70, the latest value of the data read out from the cache memory 2 is transmitted through the shared bus 6.

In a case the cache state is the state S or E, the coherent invalidate (CI) command is issued on the internal bus 5 at the step S71, and the cache state in the cache state tag unit 12 and the cache state in the cache state tag memory 24 are set to the state I at the step S72.

Figure 13:
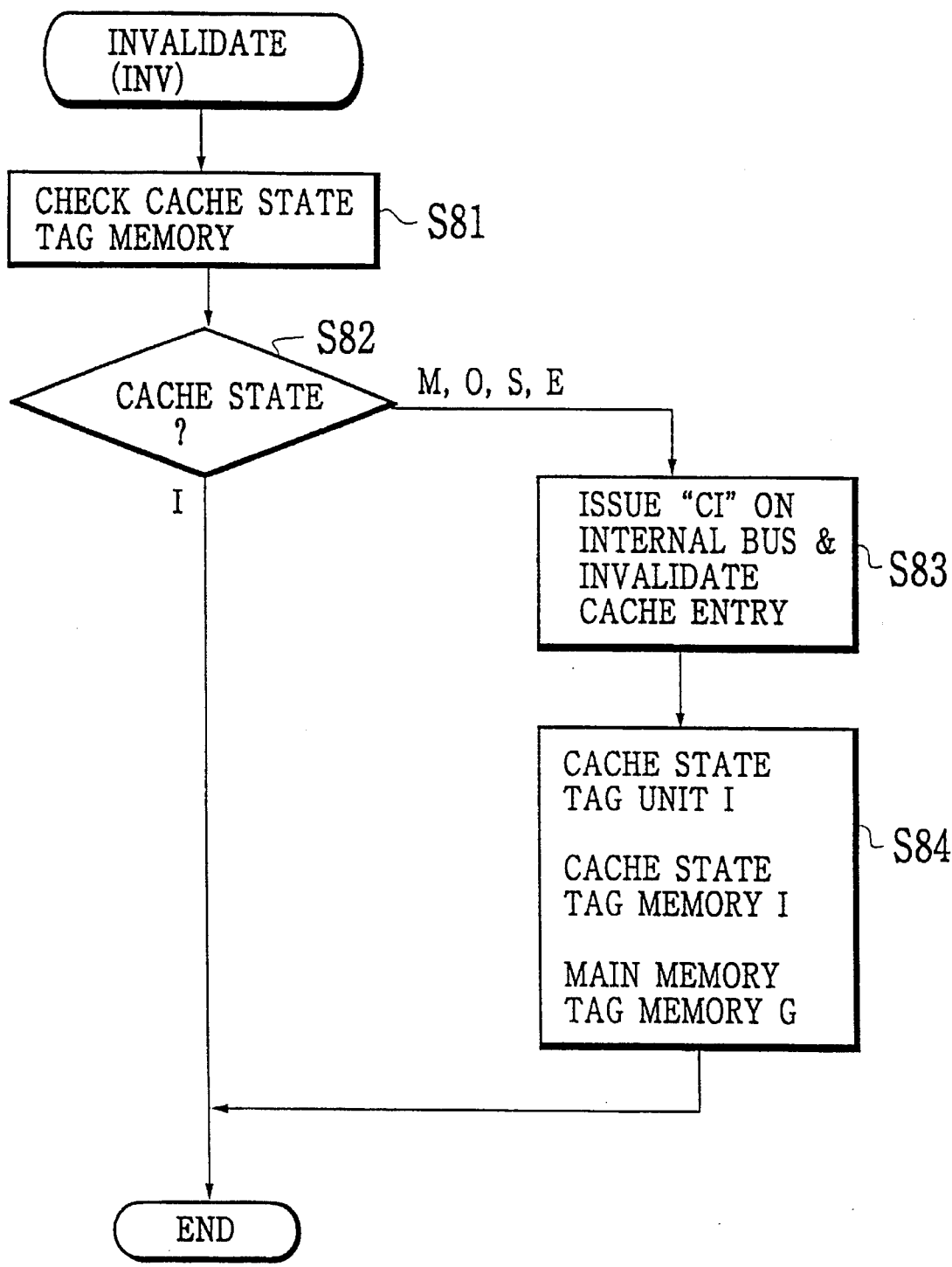
FIG. 13 is a flow chart for the operation of the distributed shared-memory multiprocessor system of FIG. 3 in response to the invalidate (INV) command on the shared bus.

Next, the operation of the cache control unit 17 and the sharing management unit 4 in response to the invalidate (INV) command on the shared bus 6 is carried out according to the flow chart of FIG. 13, as follows.

In this case, the cache state in the cache state tag memory 24 is checked at the step S81, and whether the cache state is the state I, or M, O, S or E is determined at the step S82.

In a case the cache state is the state I, the process terminates without issuing any command on the internal bus 5.

In a case the cache state is the state M, O, S or E, the coherent invalidate (CI) command is issued, on the internal bus 5 at the step S83, and the cache state in the cache state tag unit 12 and the cache state in the cache state tag memory 24 are set to tile state I, while the sharing state in the main memory tag memory 27 is set to the state G in a case it is the processor board with the main memory to which the requested address is allocated, at the step S84.

As far as the write back (WB) command on the shared bus 6 is concerned, only the processor board with the main memory 3 containing the address to which the write back is to be carried out responds to this write back command on the shared bus 6, so as to write back the value transmitted through the shared bus 6 and the internal bus 5 into the main memory 3, while the other processor boards ignore this write back command on the shared bus 6.

Referring now to FIG. 14 to FIG. 21, the various operations in the above described first embodiment of the distributed shared-memory multiprocessor system according to the present invention will be illustrated by using illustrative examples.

Figure 14:
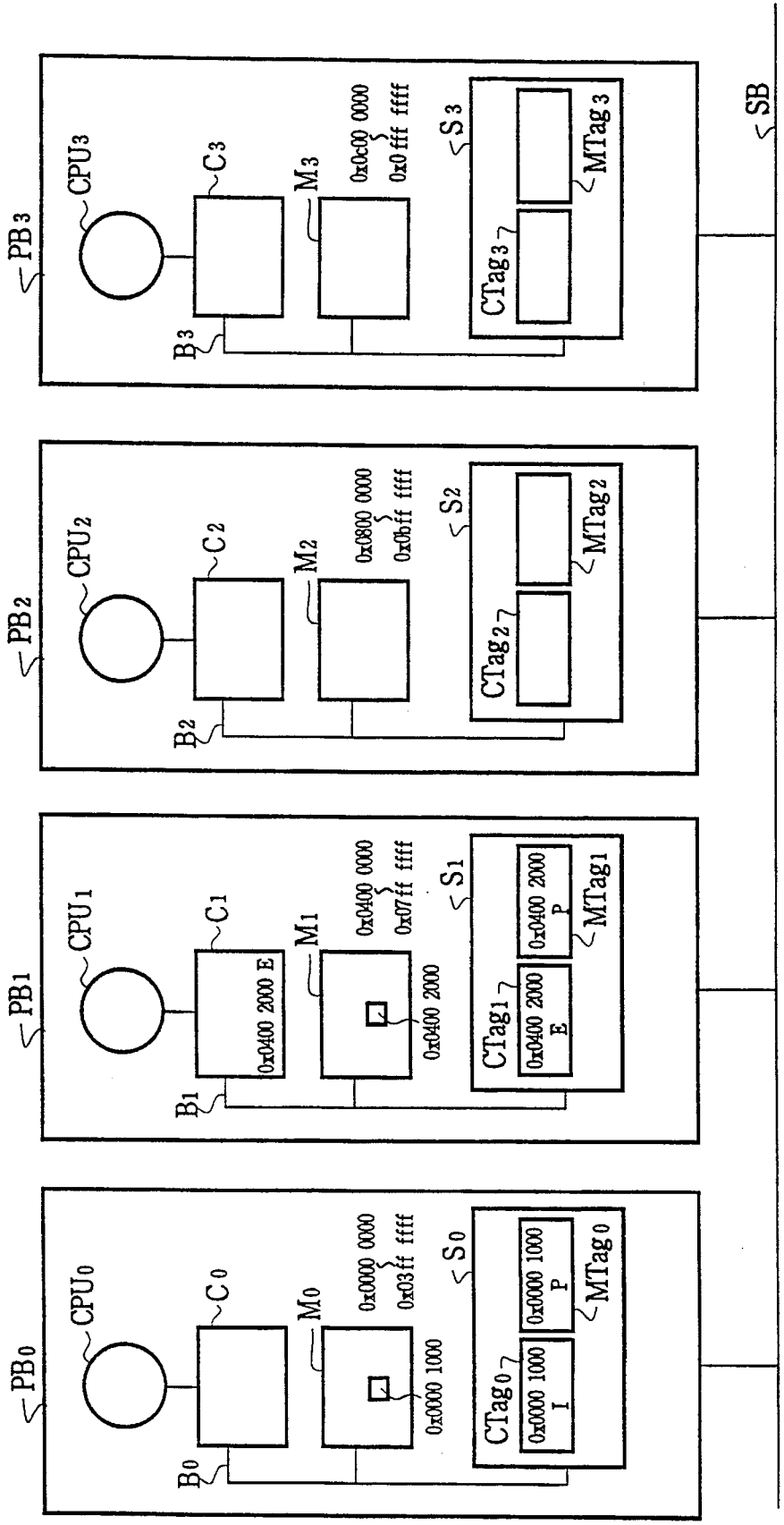
FIG. 14 is an illustrative diagram of an exemplary configuration of the distributed shared-memory multiprocessor system according to the present invention, for explaining the exemplary operations.

In the following, the system having an exemplary configuration as shown in FIG. 14 will be used. In this exemplary configuration of FIG. 14, an n-th (n=0, 1, 2, 3) processor board $PB_n$ is equipped with the CPU ($CPU_n$), the cache memory ($C_n$), the main memory ($M_n$), the sharing management unit ($S_n$) having the cache state tag memory ($CTag_n$) and the main memory tag memory ($MTag_n$), and the internal bus ($B_n$) and coupled with the other processor boards through the shared bus (SB). Here, the main memory $M_0$ of the zeroth processor board $PB_0$ is allocated with the addresses 0x0000 0000 to 0x03ff ffff, the main memory $M_1$ of the first processor board $PB_1$ is allocated with the addresses 0x0400 0000 to 0x07ff ffff, the main memory $M_2$ of the second processor board $PB_2$ is allocated with the addresses 0x0800 0000 to 0x0bff ffff, and the main memory $M_3$ of the third processor board $PB_3$ is allocated with the addresses 0x0c00 0000 to 0x0fff ffff, where "0x" attached at a top of each address indicates that each address is expressed by a hexadecimal number.

In the situation illustrated in FIG. 14, the cache line of the address 0x0000 1000 is present only in the main memory $M_0$ of the zeroth processor board $PB_0$, and not in any cache memory, so that on this zeroth processor board $PB_0$, the cache state in the cache state tag memory $CTag_0$ for this cache line is the state I while the sharing state in the main memory tag memory $MTag_0$ for this cache line is the state P.

On the other hand, the cache line of the address 0x0400 2000 is present not only in the main memory $M_1$ of the first processor board $PB_1$, but also in the cache memory $C_1$ on the same first processor board $PB_1$ in the state E, so that on this first processor board $PB_1$, the cache state in the cache state tag memory $CTag_1$ for this cache line is the state E while the sharing state in the main memory tag memory $MTag_1$ for this cache line is the state P.

Figure 15:
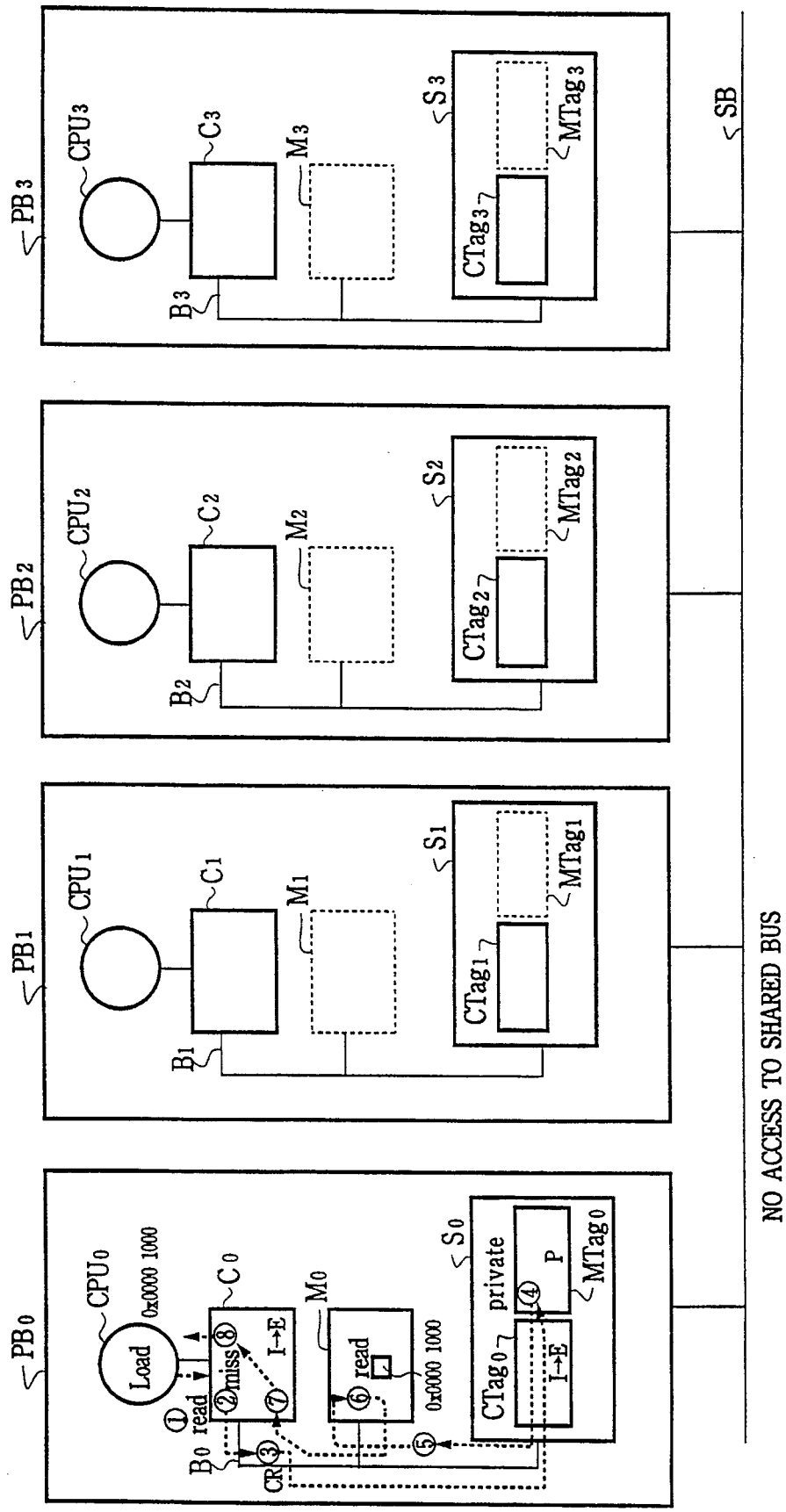
FIGS. 15 to 21 are illustrative diagrams of the exemplary configuration of FIG. 14, illustrating the operations of the first embodiment of the distributed shared-memory multiprocessor system according to the present invention, under various situation.

FIG. 15 illustrates the situation in which the $CPU_0$ on the zeroth processor board $PB_0$ executed the load instruction requesting the read operation (1) with respect to the address 0x0000 1000. In this case, the cache miss (2) occurs at the cache memory $C_0$ on this zeroth processor board $PB_0$, and the coherent read (CR) command (3) for the shared read is issued on the internal bus $B_0$ on this zeroth processor board $PB_0$. Since the sharing state in the main memory tag memory $MTag_0$ on this zeroth processor board $PB_0$ is the state P (4) indicating "private", the access (5) is made to the main memory $M_0$ on this zeroth processor board $PB_0$ without making any access to the shared bus SB, and the data stored at this address 0x0000 1000 in the main memory $M_0$ is read out (6) and cached (7) into the cache memory $C_0$ on the same zeroth processor board $PB_0$, from which the cached data is loaded (8) to the $CPU_0$.

Accordingly, on this zeroth processor board $PB_0$, the cache state in the cache state tag unit of the cache memory $C_0$ as well as the cache state in the cache state tag memory $CTag_0$ for this cache line make the state transition from the state I to the state E.

Hereafter, the subsequent accesses from the $CPU_0$ to the cache line of this address 0x0000 1000 can be made by the cache hit at the cache memory $C_0$, without issuing any command on the internal bus $B_0$, on this zeroth processor board $PB_0$.

Figure 16:
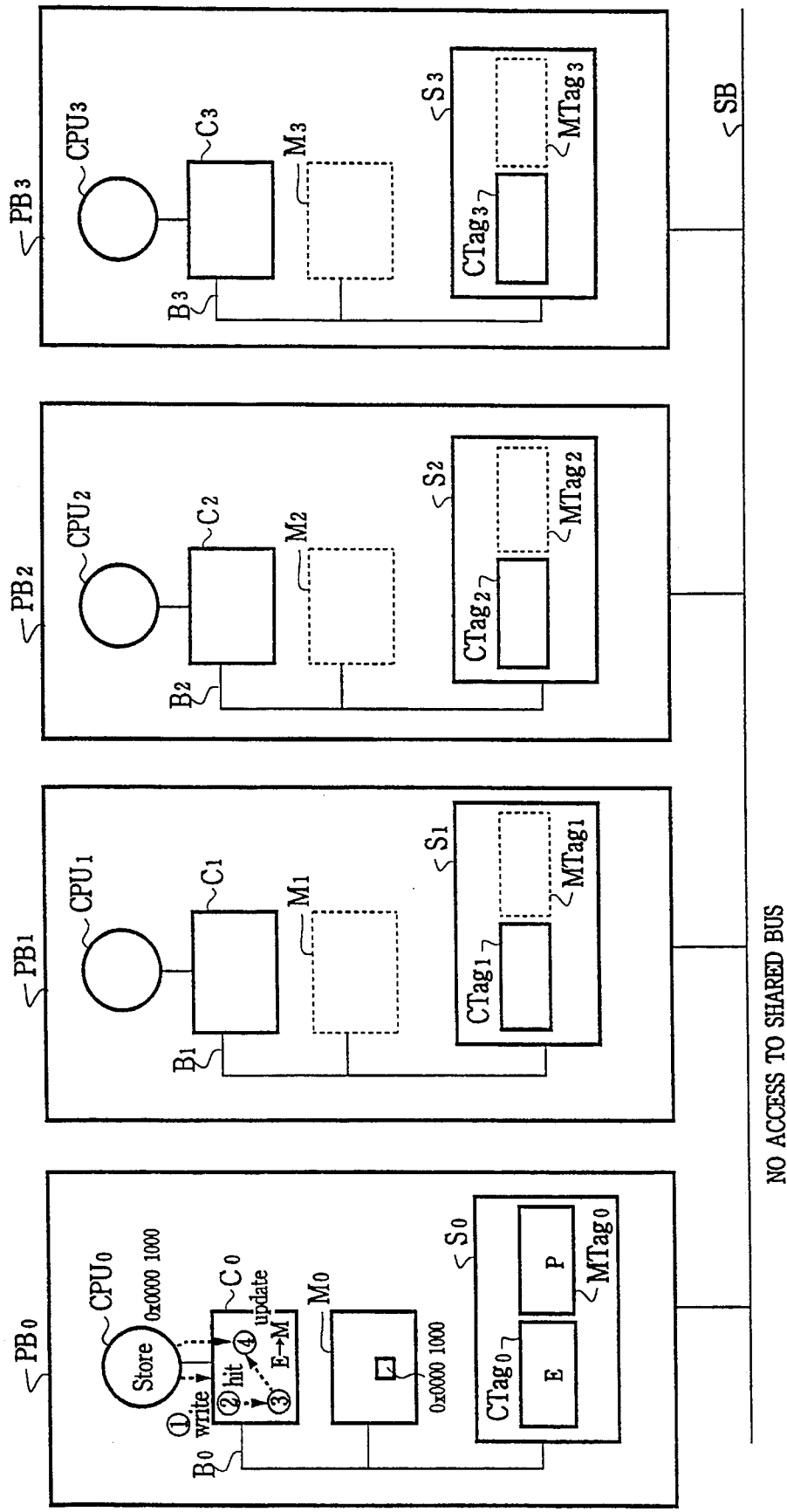

FIG. 16 illustrates the situation in which the $CPU_0$ on the zeroth processor board $PB_0$ executed the store instruction requesting the write operation (1) with respect to the address 0x0000 1000 from the state resulting from the execution of the load instruction in FIG. 15. In this case, the cache hit (2) occurs at the cache memory $C_0$ on this zeroth processor board $PB_0$, so that the cache state in the cache state tag unit of the cache memory $C_0$ makes the state transition (3) from the state E to the state M, and the data of this address 0x0000 1000 is updated (4) in the cache memory $C_0$, without issuing any command on the internal bus $B_0$.

Hereafter, the subsequent accesses (for either the read or the write) from the $CPU_0$ to the cache line of this address 0x0000 1000 can be made by the cache hit at the cache memory $C_0$, without issuing any command on the internal bus $B_0$, on this zeroth processor board $PB_0$.

Thus, the accesses to the local variables to be used by the CPU which are stored in the main memory on the same processor board can be made, without making any access to the shared bus SB.

Here, the cache state in the cache state tag memory $CTag_0$ for this cache line is left as the state E, but the shared read is carried out by making an access to the main memory $M_0$, so that the discrepancy of the cache states in the cache memory $C_0$ and the sharing management unit $S_0$ does not raise any problem. Moreover, when the shared read is made from the other processor board through the shared bus SB, this discrepancy will be resolved.

Figure 17:
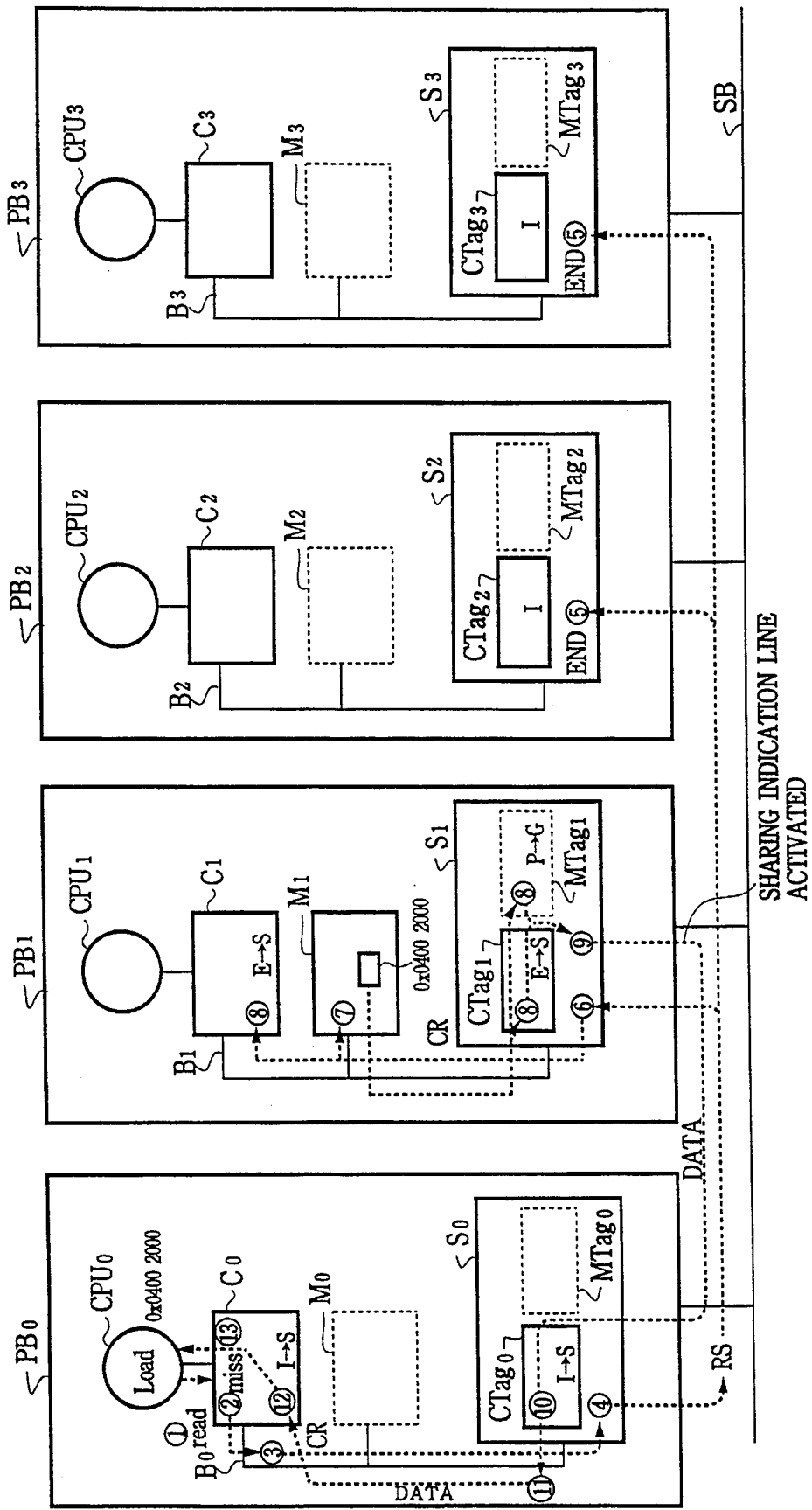

FIG. 17 illustrates the situation in which the $CPU_0$ on the zeroth processor board $PB_0$ executed the lead instruction requesting the read operation (1) with respect to the address 0x0400 2000. In this case, the cache miss (2) occurs at the cache memory $C_0$ on this zeroth processor board $PB_0$, and the coherent read (CR) command (3) for the shared read is issued on the internal bus $B_0$ on this zeroth processor board $PB_0$. Since this address is not allocated to the main memory $M_0$ on this zeroth processor board $PB_0$, the read shared (RS) command (4) is then issued on the shared bus SB from the sharing management unit $S_0$ on this zeroth processor board $PB_0$.

The other processor boards $PB_1$, $PB_2$, and $PB_3$ monitor this read shared (RS) command on the shared bus SB, but the operation is ended (5) at the second and third processor boards $PB_2$ and $PB_3$ as their cache state tag memories $CTag_2$ and $CTag_3$ have the cache state for this cache line in the state I. On the other hand, the first processor board $PB_1$ has the main memory $M_1$ to which this address 0x0400 2000 is allocated, and the cache state tag memory $CTag_1$ on this first processor board $PB_1$ has the cache state for this cache line in the state E, so that the sharing management unit $S_1$ issues the coherent read (CR) command (6) for the shared read on the internal bus $B_1$ on this first processor board $PB_1$.

In response, the data of this cache line is read out (7) from the main memory $M_1$. At this point, the cache memory $C_1$ recognizes the start of the sharing of this cache line, so that the cache state in the cache state tag unit of this cache memory $C_1$ makes the state transition (8) from the state E to the state S, and the cache state in the cache state tag memory $CTag_1$ also makes the state transition (8) from the state E to the state S, while the sharing state in the main memory tag memory $MTag_1$ makes the state transition (8) from the state P to the state G.

Then, the data for this cache line read out From the main memory $M_1$ is transmitted (9) through the shared bus SB to the zeroth processor board $PB_0$ which requested the access to this cache line. At this point, the sharing indication line of the shared bus SB is activated.

Next, on the zeroth processor board $PB_0$, the cache state in the cache state tag memory $CTag_0$ makes the state transition (10) from the state I to the state S, and the data transmitted through the shared bus SB is cached (11) into the cache memory $C_0$ while indicating "shared" on the sharing indication line of the internal bus $B_0$.

In response, the cache state in the cache state tag unit of the cache memory $C_0$ makes the state transition (12) from the state I to the state S, and the cached data is loaded (13) to the $CPU_0$.

Figure 18:
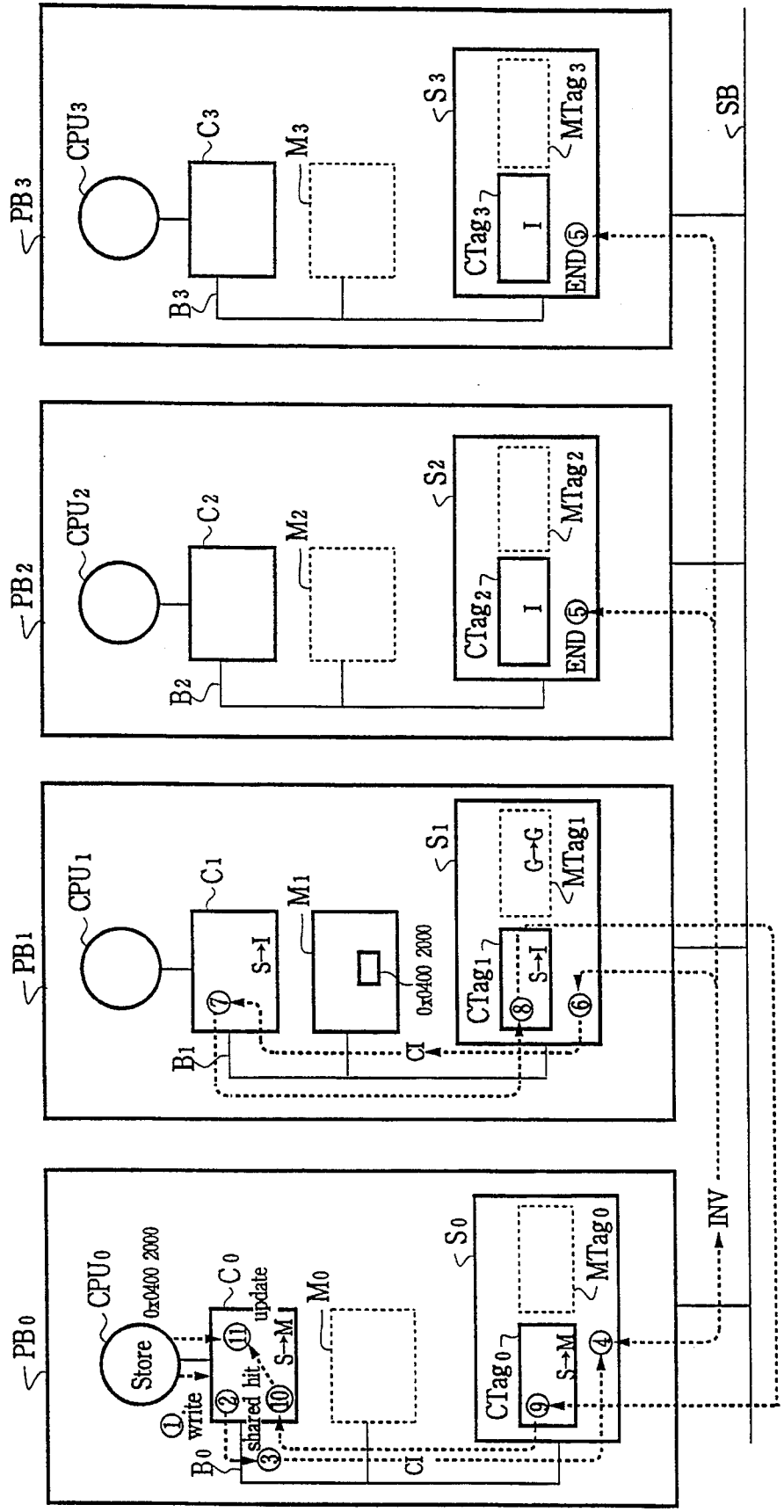

FIG. 18 illustrates the situation in which the $CPU_0$ on the zeroth processor board $PB_0$ executed the store instruction requesting the write operation (1) with respect to the address 0x0400 2000 from the state resulting from the execution of the load instruction in FIG. 17. In this case, the shared hit (2) occurs at the cache memory $C_0$ on this zeroth processor board $PB_0$, so that the coherent invalidate (CI) command for invalidation request (3) is issued on the internal bus $B_0$. Since this address is not allocated to the main memory $M_0$ on this zeroth processor board $PB_0$, the invalidate (INV) command (4) is then issued on the shared bus SB from the sharing management unit $S_0$ on this zeroth processor board $PB_0$.

The other processor boards $PB_1$, $PB_2$, and $PB_3$ monitor this invalidate (INV) command on the shared bus SB, but the operation is ended (5) at the second and third processor boards $PB_2$ and $PB_3$ as their cache state tag memories $CTag_2$ and $CTag_3$ have the cache state for this cache line in the state I. On the other hand, the first processor board $PB_1$ has the main memory $M_1$ to which this address 0x0400 2000 is allocated, and the cache state tag memory $CTag_1$ on this first processor board $PB_1$ has the cache state for this cache line in the state S, so that the sharing management unit $S_1$ issues the coherent invalidate (CI) command (6) for the invalidation request on the internal bus $B_1$ on this first processor board $PB_1$.

In response, the cache state in the cache state tag unit of the cache memory $C_1$ makes the state transition (7) from the state S to the state I, so as to invalidate the cache entry for this cache line. Then, the cache state in the cache state tag memory $CTag_1$ also makes the state transition (8) from the state S to the state I, while the sharing state in the main memory tag memory $MTag_1$ is left as the state G.

When this invalidation at the first processor board $PB_1$ is completed, next on the zeroth processor board $PB_0$, the cache state in the cache state tag memory $CTag_0$ makes the state transition (9) from the state S to the state M, while the cache state in the cache state tag unit in the cache memory $C_0$ also makes the state transition (10) from the state S to the state M, and the data of this address 0x0400 2000 is updated (11) in the cache memory $C_0$.

Figure 19:
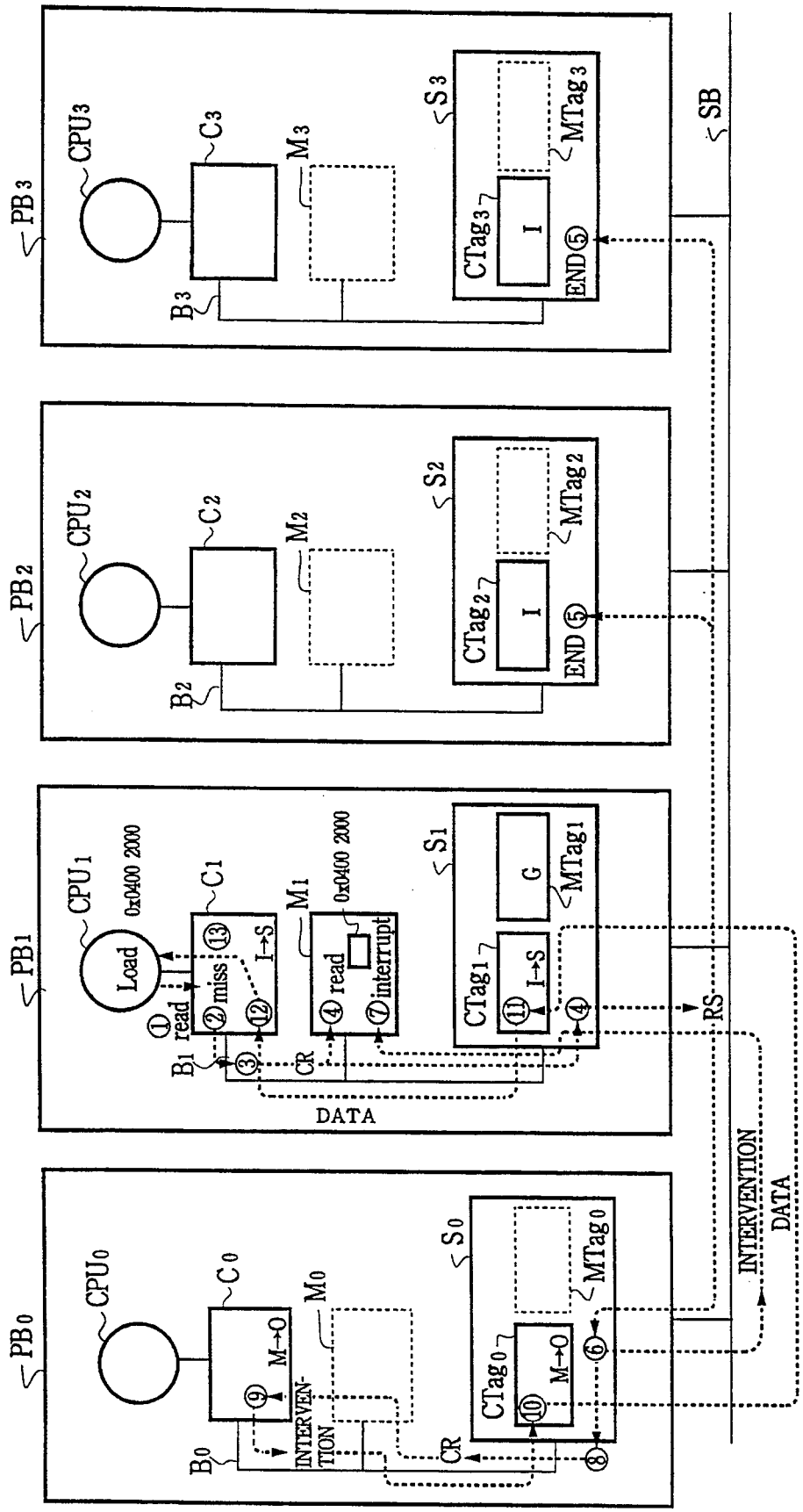

FIG. 19 illustrates the situation in which the $CPU_1$ on the first processor board $PB_1$ executed the load instruction requesting the read operation (1) with respect to this address 0x0400 2000, from the state resulting from the execution of the store instruction in FIG. 18. In this case, the cache miss (2) occurs at the cache memory $C_1$ on this first processor board $PB_1$, and the coherent read (CR) command (3) for the shared read is issued on the internal bus $B_1$ on this first processor board $PB_1$. Although this address is allocated to the main memory $M_1$ on this first processor board $PB_1$, the sharing state in the main memory tag memory $MTag_1$ on this first processor board $PB_0$ is the state G, so that the sharing management unit $S_1$ on this first processor board $PB_1$ issues the read shared (RS) command (4) on the shared bus SB, while making an access to the main memory $M_1$ on this first processor board $PB_1$.

The other processor boards $PB_0$, $PB_2$, and $PB_3$ monitor this read shared (RS) command on the shared bus SB, but the operation is ended (5) at the second and third processor boards $PB_2$ and $PB_3$ as their cache state tag memories $CTag_2$ and $CTag_3$ have the cache state for this cache line in the state I. On the other hand, the zeroth processor board $PB_0$ has the cache state tag memory $CTag_0$ indicating the cache state for this cache line in the state M, so that the sharing management unit $S_0$ on this zeroth processor board $PB_0$ activates (6) the intervention indication line of the shared bus SB in order to intervene with this memory access request, and in response, the sharing management unit $S_1$ on the first processor board $PB_1$ interrupts (7) the memory access at the main memory $M_1$ on the first processor board $PB_1$.

On the other hand, the sharing management unit $S_0$ on the zeroth processor board $PB_0$ issues the coherent read (CR) command (8) for the shared read on the internal bus $B_0$ on this zeroth processor beard $PB_0$, so as to read out the newest value for this cache line from the cache memory $C_0$ on this zeroth processor beard $PB_0$. At this point, the cache state in the cache state tag unit of this cache memory $C_0$ makes the state transition (9) from the state M to the state O, and the cache state in the cache state tag memory $CTag_0$ also makes the state transition (10) from the state M to the state O, while the newest value read out from this cache memory $C_0$ is transmitted through the shared bus SB to the first processor board $PB_1$ which requested the access to this cache line.

Next, on the first processor board $PB_1$, the cache state in the cache state tag memory $CTag_1$ makes the state transition (11) from the state I to the state S, and the data transmitted through the shared bus SB is cached (12) into the cache memory $C_1$ while the cache state in the cache state tag unit of the cache memory $C_1$ makes the state transition (12) from the state I to the state S. Then, the cached data is loaded (13) to the $CPU_1$.

In this manner, the data read out by the $CPU_1$ can be the newest value of the requested cache line, reflecting the updating at the zeroth processor board $PB_0$, rather than the old value in the main memory $M_1$, so that the consistency among the cache memories can be maintained.

Figure 20:
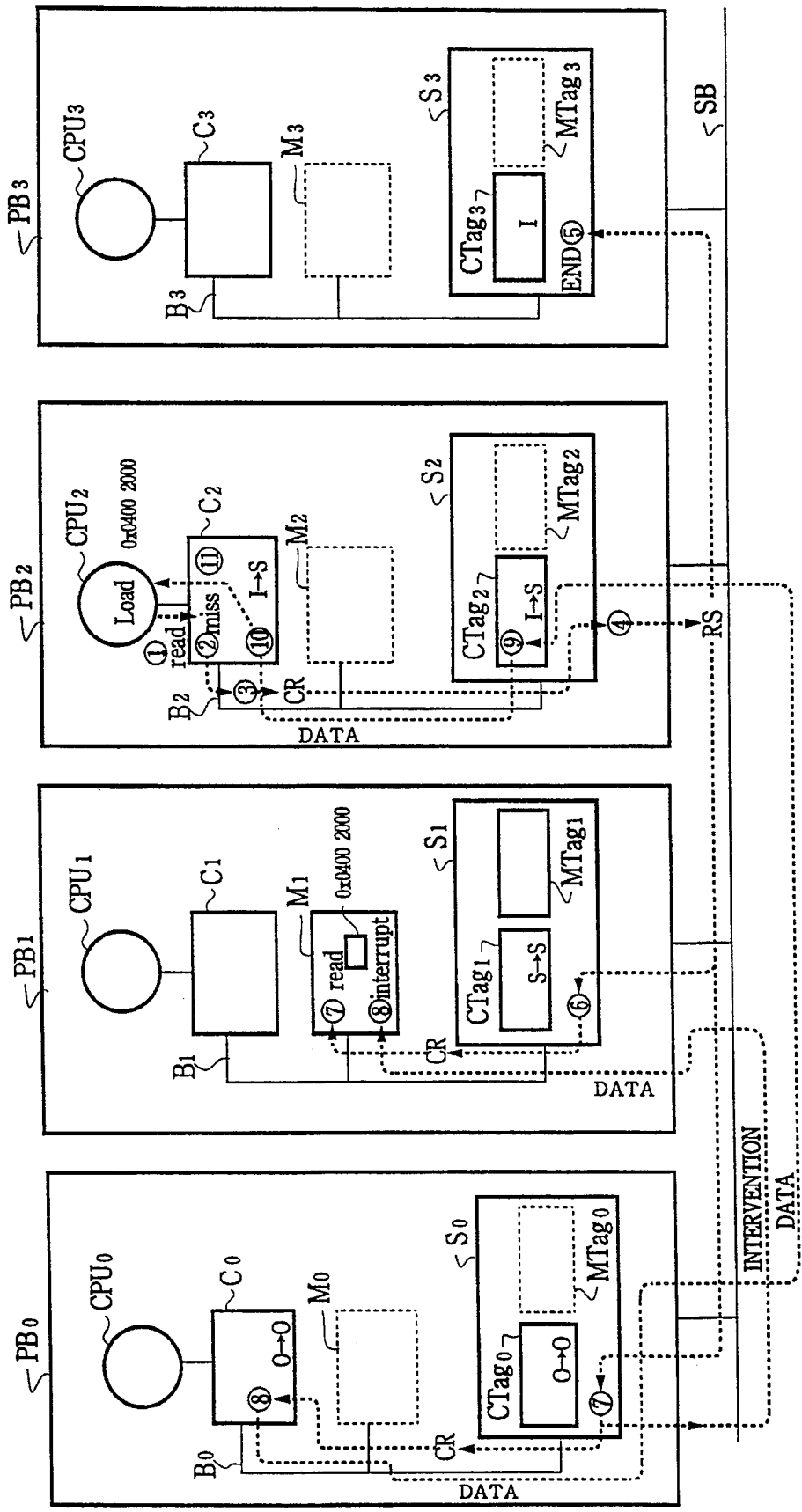

FIG. 20 illustrates the situation in which the $CPU_2$ on the second processor board $PB_2$ executed the load instruction requesting the read operation (1) with respect to this address 0x0400 2000, from the state resulting from the execution of the load instruction in FIG. 19. In this case, the cache miss (2) occurs at the cache memory $C_2$ on this second processor board $PB_2$, and the coherent read (CR) command (3) for the shared read is issued on the internal bus $B_2$ on this second processor board $PB_2$. Since this address is not allocated to the main memory $M_2$ on this second processor board $PB_2$, the sharing management unit $S_2$ on this second processor board $PB_2$ issues the read shared (RS) command (4) on the shared bus SB.

The other processor boards $PB_0$, $PB_1$, and $PB_3$ monitor this read shared (RS) command on the shared bus SB, but the operation is ended (5) at the third processor board $PB_3$ as its cache state tag memory $CTag_3$ has the cache state for this cache line in the state I. On the other hand, the first processor board $PB_1$ has the main memory $M_1$ to which this address is allocated, so that the sharing management unit $S_1$ on this first processor board $PB_1$ issues the coherent read (CR) command (6) on the internal bus $B_1$ on this first processor board $PB_1$, such that the access is made (7) to this main memory $M_1$. Meanwhile, the zeroth processor board $PB_0$ has the cache state tag memory $CTag_0$ indicating the cache state for this cache line in the state O, so that the sharing management unit $S_0$ on this zeroth processor board $PB_0$ activates (7) the intervention indication line of the shared bus SB in order to intervene with this memory access request, and in response, the sharing management unit $S_1$ on the first processor board $PB_1$ interrupts (8) the memory access at the main memory $M_1$ on the first processor board $PB_1$.

On the other hand, the sharing management unit $S_0$ on the zeroth processor board $PB_0$ issues the coherent read (CR) command (7) for the shared read on the internal bus $B_0$ on this zeroth processor board $PB_0$, so as to read out (8) the newest value for this cache line from the cache memory $C_0$ on this zeroth processor board $PB_0$. Then, the newest value read out from this cache memory $C_0$ is transmitted through the shared bus SB to the second processor board $PB_2$ which requested the access to this cache line.

Next, on the second processor board $PB_2$, the cache state in the cache state tag memory $CTag_2$ in the sharing management unit $S_2$ on the second processor board $PB_2$ makes the state transition (9) from the state I to the state S, while the cache state in the cache state tag memory $CTag_0$ in the sharing management unit $S_0$ on the zeroth processor board $PB_0$ remains in the state O and the cache state in the cache state tag memory $CTag_1$ in the sharing management unit $S_1$ on the first processor board $PB_0$ remains in the state S.

Then, the data transmitted through the shared bus SB is cached (10) into the cache memory $C_2$ while the cache state in the cache state tag unit of the cache memory $C_2$ makes the state transition (10) from the state I to the state S. Then, the cached data is loaded (11) to the $CPU_2$.

In this manner, the data read out by the $CPU_2$ can be the newest value of the requested cache line, reflecting the updating at the zeroth processor board $PB_0$, rather than the old value in the main memory $M_1$, so that the consistency among the cache memories can be maintained.

Figure 21:
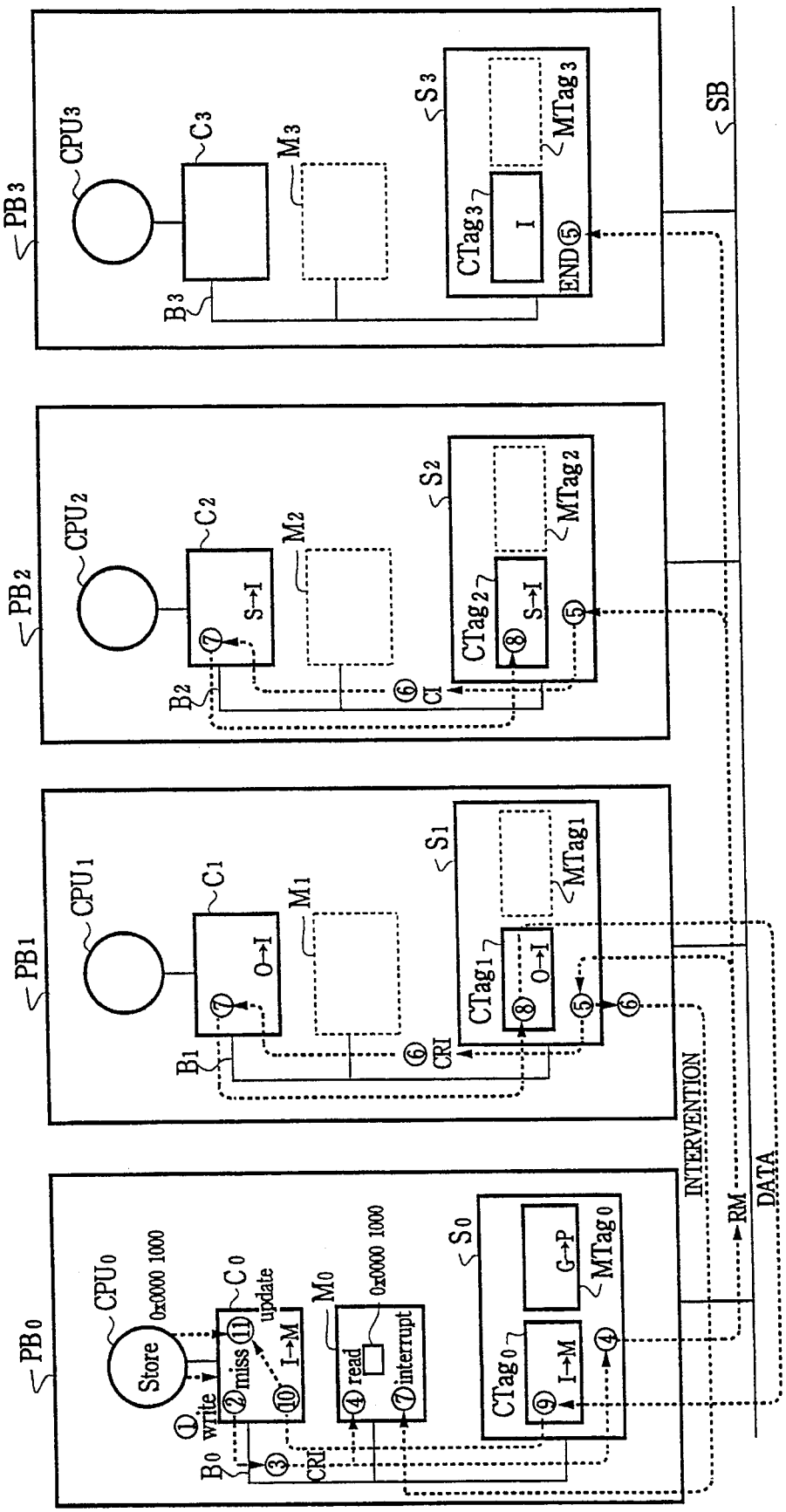

FIG. 21 illustrates the situation in which the $CPU_0$ on the zeroth processor board $PB_0$ executed the store instruction requesting the write operation (1) with respect to the address 0x0000 1000 from the state in which the cache memory $C_2$ on the first processor board $PB_1$ has the cache entry for this cache line in the state O, and the the cache memory $C_1$ on the second processor board $PB_2$ has the cache entry for this cache line in the state S, while the main memory tag memory $MTag_0$ on the zeroth processor board $PB_0$ has the sharing state for this cache line in the state G.

In this case, the cache miss (2) occurs at the cache memory $C_0$ on this zeroth processor board $PB_0$, so that the coherent read and invalidate (CRI) command (3) for exclusive read is issued on the internal bus $B_0$. Although this address is allocated to the main memory $M_0$ on this zeroth processor board $PB_0$, the sharing state in the main memory tag memory $MTag_0$ on this zeroth processor board $PB_0$ is the state G, so that the sharing management unit $S_0$ on this zeroth processor board $PB_0$ issues the read modified (RM) command (4) on the shared bus SB, while making an access (4) to the main memory $M_0$ on this zeroth processor board $PB_0$.

The other processor boards $PB_1$, $PB_2$, and $PB_3$ monitor this read modified (RM) command on the shared bus SB, but the operation is ended (5) at the third processor board PB3 as its cache state tag memory $CTag_3$ has the cache state for this cache line in the state I. On the other hand, the first processor board $PB_1$ has the cache state tag memory $CTag_1$ indicating the cache state for this cache line in the state O, so that the sharing management unit $S_1$ on this first processor board $PB_1$ issues the coherent read and invalidate (CRI) command (6) for the exclusive read on the internal bus $B_1$ on this first processor board $PB_1$, while at the same time activating (6) the intervention indication line of the shared bus SB in order to intervene with this memory access request, and in response, the sharing management unit $S_0$ on the zeroth processor board $PB_0$ interrupts (7) the memory access at the main memory $M_0$ on the zeroth processor board $PB_0$ while the newest value for this cache line is read out (7) from the cache memory $C_1$ on the first processor board $PB_1$.

Meanwhile, the second processor board $PB_2$ has the cache state tag memory $CTag_2$ indicating the cache state for this cache line in the state S, so that the sharing management unit $S_2$ on this second processor board $PB_2$ issues the coherent and invalidate (CI) command (6) for the invalidation request on the internal bus $B_2$ on this second processor board $PB_2$.

In response, the cache state in the cache state tag unit of the cache memory $C_1$ makes the state transition (7) From the state O to the state I, so as to invalidate the cache entry for this cache line on the first processor board $PB_1$, while the cache state in the cache state tag unit of the cache memory $C_2$ makes the state transition (7) from the state S to the state I, so as to invalidate the cache entry For this cache line on the second processor board $PB_2$. Then, the cache state in the cache state tag memory $CTag_1$ also makes the state transition (8) from the state O to the state I on the first processor board $PB_1$, while the cache state in the cache state tag memory $CTag_2$ also makes the state transition (8) from the state S to the state I on the second processor board $PB_2$. Then, the newest value read out from the cache memory $C_1$ is transmitted through the shared bus SB to the zeroth processor board $PB_0$.

When these invalidations at the first and second processor boards $PB_1$ and $PB_2$ are completed, next on the zeroth processor board $PB_0$, the cache state in the cache state tag memory $CTag_0$ makes the state transition (9) from the state I to the state M and the sharing state in the main memory tag memory $MTag_0$ makes the state transition from the state G to the state P, while the newest value transmitted from the shared bus SB is cached (10) into the cache memory $C_0$ and the cache state in the cache state tag unit in the cache memory $C_0$ also makes the state transition (10) from the state I to the state M. The newest value of this address 0x0000 1000 is then updated (11) in the cache memory $C_0$ on this zeroth processor board $PB_0$, Next, a second embodiment of a distributed shared-memory multiprocessor system according to the present invention will be described in detail.

This second embodiment concerns with a modification of the first embodiment described above regarding the transfer of the ownership among the cache memories on different processor boards. Here, the ownership indicates the duty to write back the newest value from the cache memory to the main memory.

To this end, in this second embodiment, the shared bus 6 is further equipped with a request source identification line for identifying the processor board from which the memory access request on the shared bus 6 originated.

Now, when the CPU 1 of a certain processor board executes the load instruction requesting the read operation with respect to the address allocated to the main memory on the same processor board and the cache miss occurs, if there is another processor board which has the cache memory 2 with a newest value for the cache entry of the requested address, this another processor board is going to make the intervention as described above for the first embodiment.

In the first embodiment, however, the ownership remains on this another processor board which made the intervention, even after the intervention was made. Consequently, when the write back command is generated later on, this another processor board must carry out the write back operation with respect to the main memory on that certain processor board through the shared bus 6.

In contrast, in this second embodiment, the ownership is also transferred from this another processor board to that certain processor board at a time the intervention occurred, along with the newest value for the cache entry, such that the subsequent write back operation can be carried out within that certain processor board, without using the shared bus 6.

In order to realize such a transfer of the ownership, in this second embodiment, the transmission of the memory access request through the shared bus 6 is accompanied by an information identifying the processor board from which this memory access request has originated on the request source identification line. Such an information on the request source identification line can be provided by a processor board identification number used in the usual bus. In practice, it is sufficient for this information on the request source identification line to be able to indicate whether the processor board from which the memory access request has originated is the processor board with the main memory to which the requested address has been allocated or not, so that this information on the request source identification line may be provided as a one bit signal indicating whether the request source is the processor board with the main memory to which the requested address has been allocated or not.

In this second embodiment, in the request source which is the processor board with the main memory to which the requested address has been allocated and which received the intervention from the other processor board, the cache memory 2 receives the newest value for the cache entry of the requested address as well as the ownership through the shared bus 6, so that the cache state of this cache memory 2 on the request source is changed to the state O, while the cache state of that other processor board which made the intervention is changed to the state S.

Accordingly, the state transitions for the cache state tag unit 12 in the cache memory 2 can be summarized as shown in the tables of FIGS. 22A and 22B instead of the tables of FIGS. 6A and 6B for the first embodiment, while the state transitions for the cache state tag memory 24 in the sharing management unit 4 can be summarized as shown in the tables of FIGS. 28A and 28B for the access to the main memory on the same processor board instead of the tables of FIGS. 7A and 7B for the first embodiment, and as shown in the tables of FIGS. 24A and 24B for the access to the main memory on the other processor board instead of the tables of FIGS. 8A and 8B.

Figure 25B:
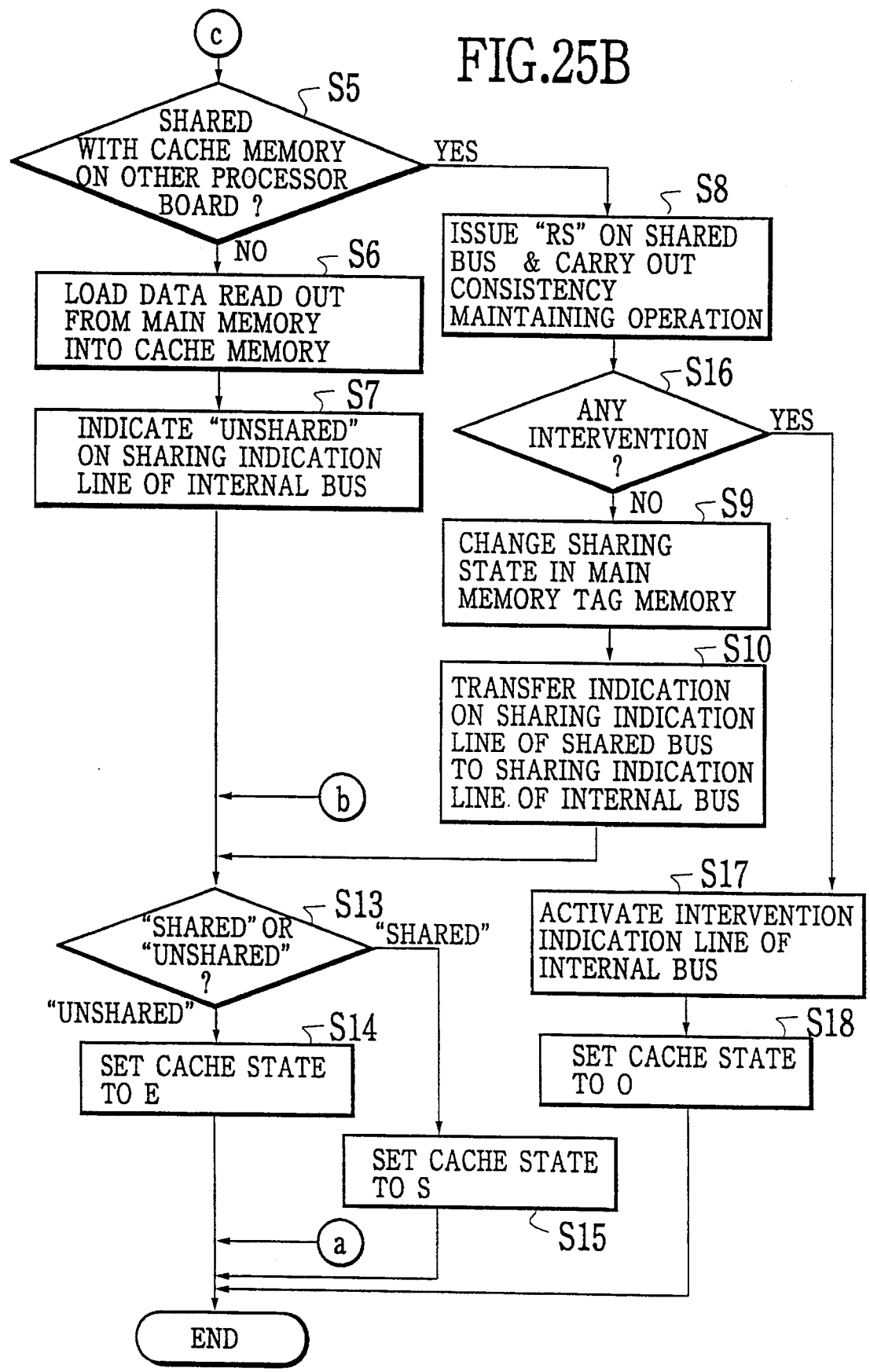

Also, in this second embodiment, the flow chart of FIG. 9 for the operation of the cache control unit 17 and the sharing management unit 4 in response to the read command must be modified as shown in FIG. 25, as follows.

Namely, after the consistency maintaining operation at the step S8, whether there has been any intervention in the consistency maintaining operation or not is determined at the step S16. In a case it is determined that there has not been the intervention at the step S16, the process proceeds to the step S9 as in the case of FIG. 9 for the first embodiment described above. On the other hand, in a case it is determined that there has been the intervention at the step S16, the intervention indication line of the internal bus 5 is activated at the step S17, and the cache state of this cache entry is set to the state O at the step S18, and then the process terminates.

Figure 9B:
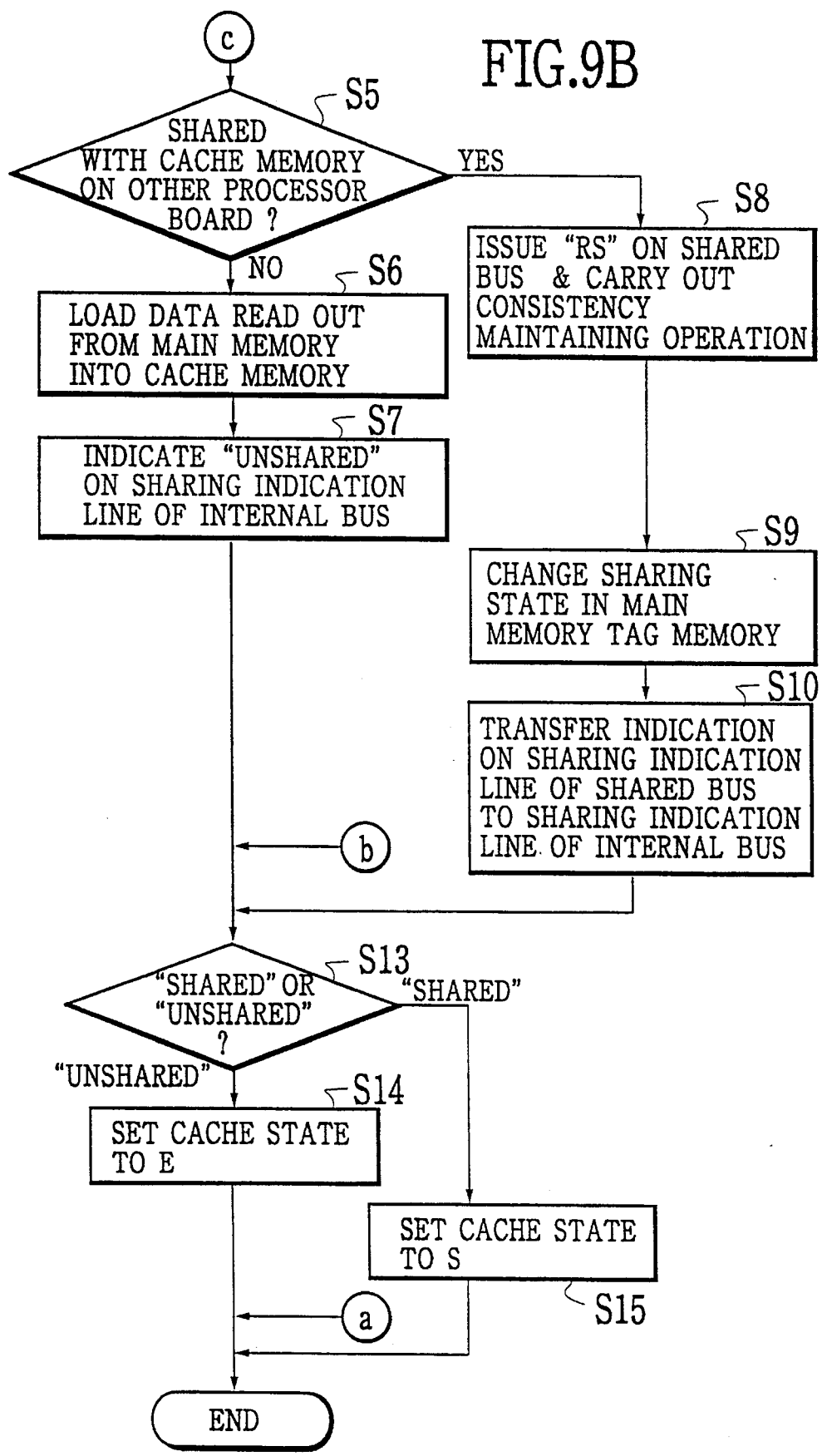

The remaining steps of the flow chart of FIG. 25 are identical to those in the flow chart of FIG. 9.

Figure 26B:
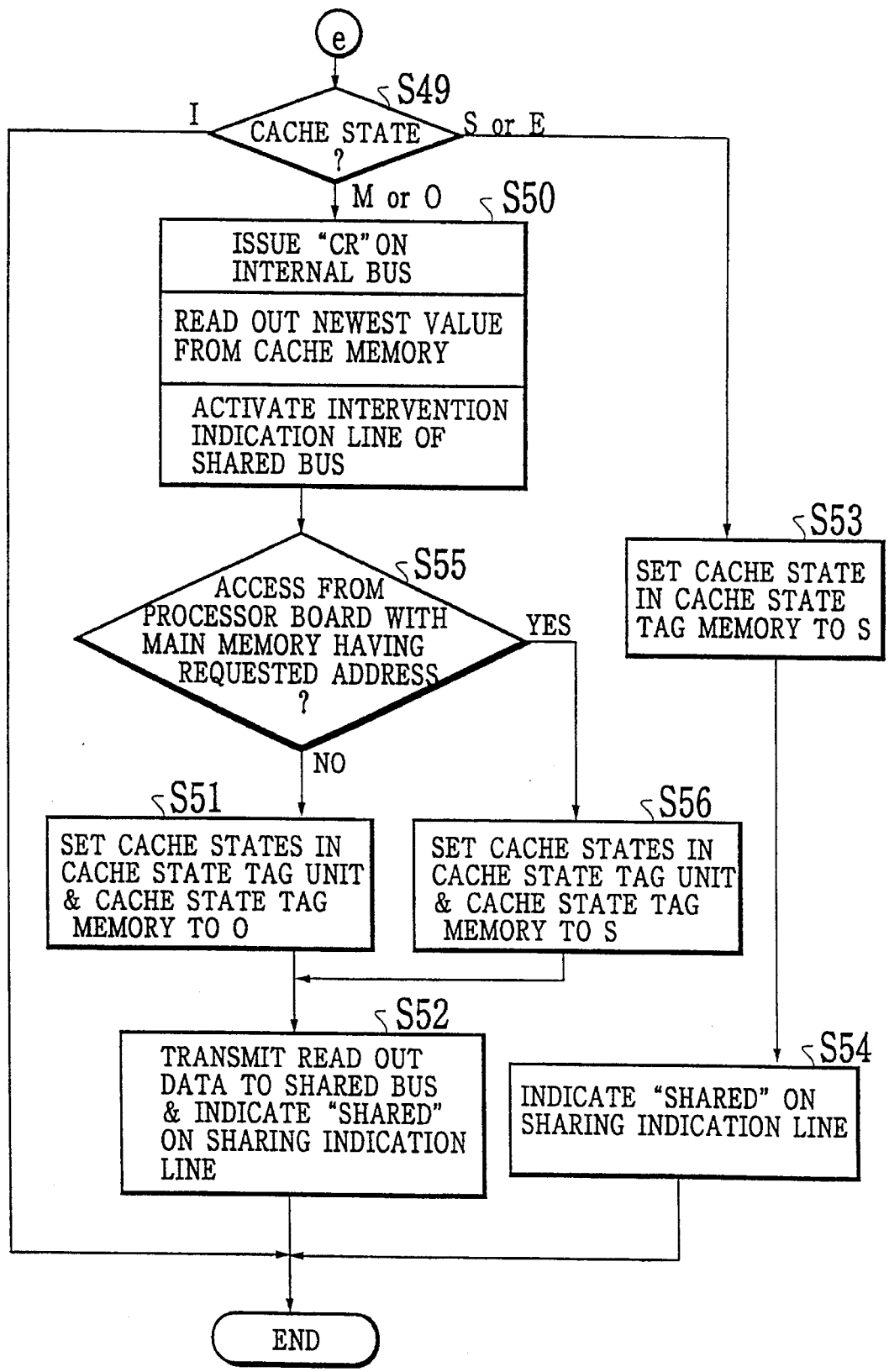

In addition, in this second embodiment, the flow chart of FIG. 11 for the operation of the cache control unit 17 and the sharing management unit 4 in response to the read shared (RS) command on the shared bus 6 must be modified as shown in FIG. 26, as follows.

Namely, after the step S50, whether it is an access from the processor board with the main memory allocated with the requested address or not is determined at the step S55. In a case it is not an access from the processor board with the main memory allocated with the requested address, the process proceeds to the step S51 in which the cache state of the cache memory 2 on the same processor board is changed from the state M or O to the state O while the cache state in the cache state tag memory 24 of the sharing management unit 4 is changed from the state M or O to the state O and the process then proceeds to the step S52. On the other hand, in a case it is an access from the processor board with the main memory allocated with the requested address, the process proceeds to the step S56 in which the cache state of the cache memory 2 on the same processor board is changed from the state M or O to the state S while the cache state in the cache state tag memory 24 of the sharing management unit 4 is changed from the state M or O to the state S and the process then proceeds to the step S52.

Figure 11B:
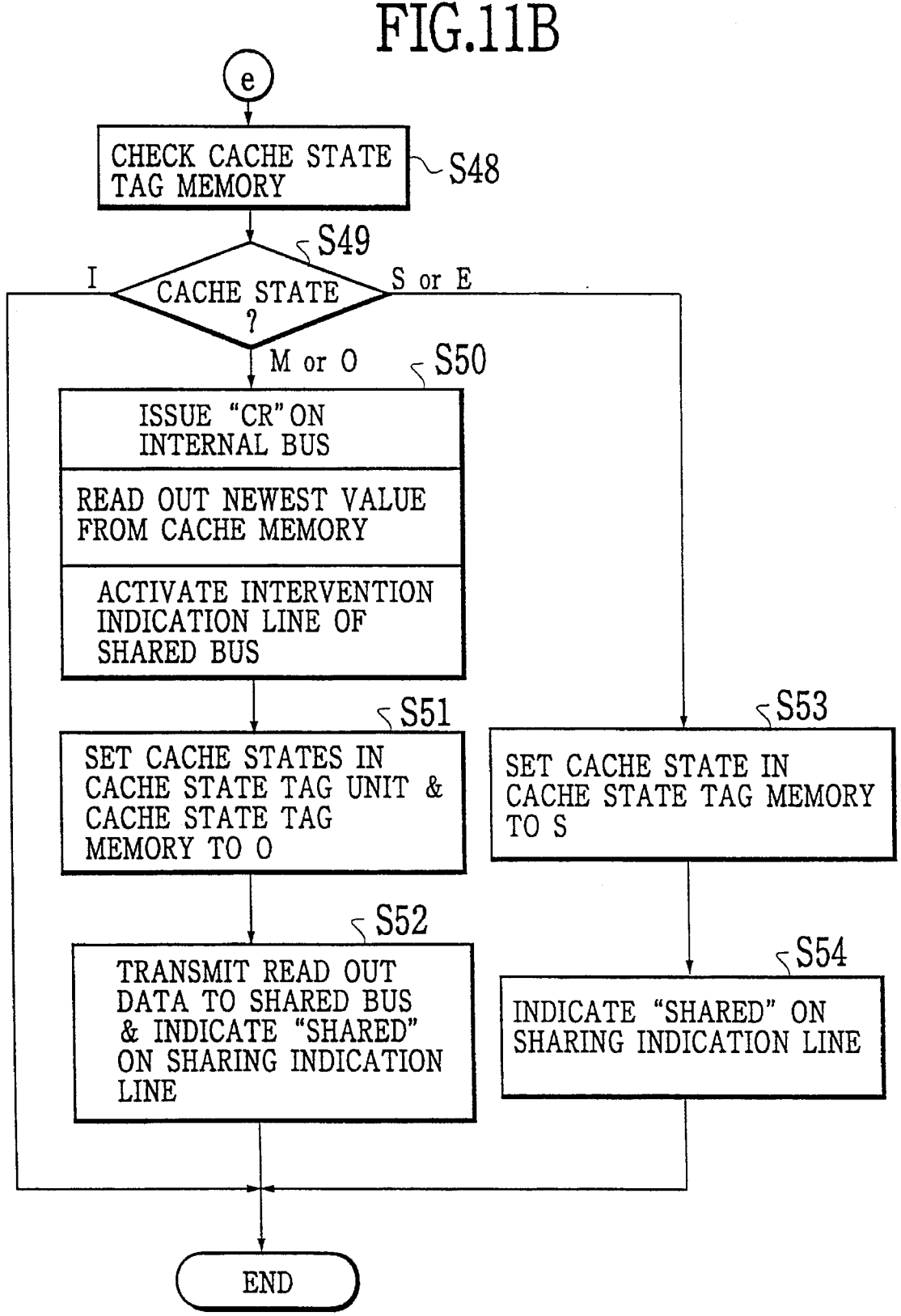

The remaining steps of the flow chart of FIG. 26 are identical to those in the flow chart of FIG. 11.

Figure 27:
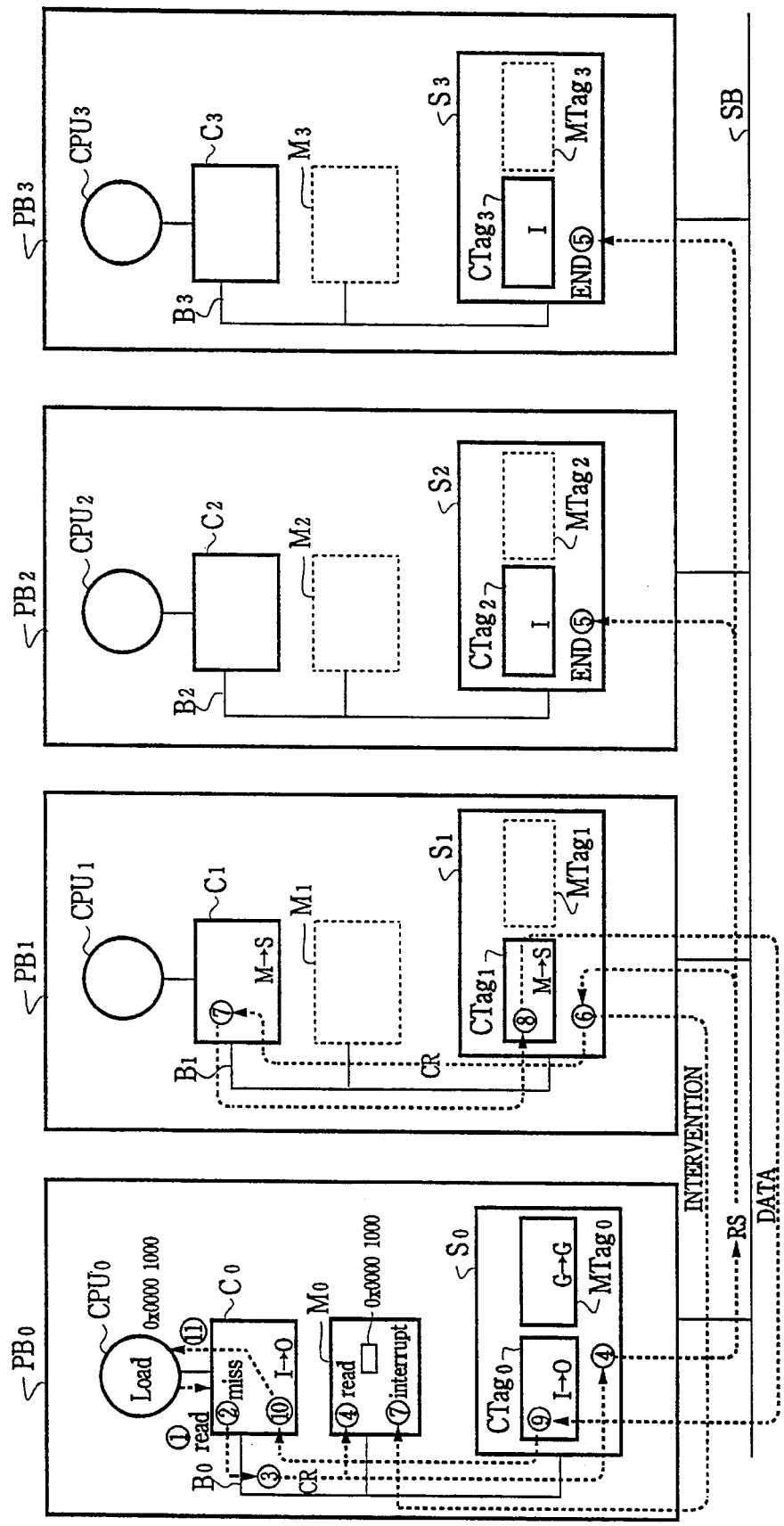
FIG. 27 is illustrative diagram of the exemplary configuration of FIG. 14, illustrating the operation of the second embodiment of the distributed shared-memory multiprocessor system according to the present invention.

FIG. 27 illustrates the situation in which the $CPU_0$ on the zeroth processor board $PB_0$ executed the load instruction requesting the read operation (1) with respect to the address 0x0000 1000, which has been updated in the cache memory $C_1$ on the first processor board $PB_1$. In this case, the cache miss (2) occurs at the cache memory $C_0$ on this zeroth processor board $PB_0$, so that the coherent read (CR) command (3) for shared read is issued on the internal bus $B_0$ on this processor board $PB_0$. Although this address is allocated to the main memory $M_0$ on this zeroth processor board $PB_0$, the sharing state in the main memory tag memory $MTag_0$ on this zeroth processor board $PB_0$ is the state G, so that the sharing management unit $S_0$ on this zeroth processor board $PB_0$ issues the read shared (RS) command (4) on the shared bus SB, while making an access (4) to the main memory $M_0$ on this zeroth processor board $PB_0$.

The other processor boards $PB_1$, $PB_2$, and $PB_3$ monitor this read shared (RS) command on the shared bus SB, but the operation is ended (5) at the second and third processor boards $PB_2$ and $PB_3$ as their cache state tag memory $CTag_2$ and $CTag_3$ have the cache state for this cache line in the state I. On the other hand, the first processor board $PB_1$ has the cache state tag memory $CTag_1$ indicating the cache state for this cache line in the state M, so that the sharing management unit $S_1$ on this first processor board $PB_0$ issues the coherent read (CR) command (6) for the shared read on the internal bus $B_1$ on this first processor board $PB_1$, while at the same time activating (6) the intervention indication line of the shared bus SB in order to intervene with this memory access request, and in response, the sharing management unit $S_0$ on the zeroth processor board $PB_0$ interrupts (7) the memory access at the main memory $M_0$ on the zeroth processor board $PB_0$ while the newest value for this cache line is read out (7) from the cache memory $C_1$ on the first processor board $PB_1$.

At this point, the cache state in the cache state tag unit of the cache memory $C_1$ makes the state transition (7) from the state M to the state S, and the cache state in the cache state tag memory $CTag_1$ also makes the state transition (8) from the state M to the state S on the first processor board $PB_1$. The newest value read out from the cache memory $C_1$ is then transmitted (8) through the shared bus SB to the zeroth processor board $PB_0$.

Next, on the zeroth processor board $PB_0$, the cache state in the cache state tag memory $CTag_0$ makes the state transition (9) from the state I to the state O in order to indicate the transfer of the ownership to this processor board $PB_0$, while the sharing state in the main memory tag memory $MTag_0$ remains in the state G. Then, the newest value transmitted from the shared bus SB is cached (10) into the cache memory $C_0$ while the cache state in the cache state tag unit in the cache memory $C_0$ also makes the state transition (10) from the state I to the state O in order to indicate the transfer of the ownership to this processor board $PB_0$. Then, the cached newest value is loaded (11) to the $CPU_0$ from this cache memory $C_0$.

Next, a third embodiment of a distributed shared-memory multiprocessor system according to the present invention will be described in detail.

This third embodiment concerns with a modification of the first embodiment described above regarding the reduction of the number of cache states in the cache state tag unit 12 in the cache memory 2 and the cache state tag memory 24 in the sharing management unit 4 to only four states including the M, E, S and I states and omitting the state O.

This reduction of the cache states to only four states is advantageous from a point of view of actual implementation of the cache state tag unit 12 and the cache state tag memory 24 because the cache states are actually expressed in terms of the binary bits in the actual circuit, so that it is convenient to make the number of the cache states to be the power of two.

As the cache coherency protocol using only four cache states, two schemes including the Berkeley scheme and the Illinois scheme are known. (See the reference of J. Archibald and J. L. Baer referred above for further details of these scheme.) In the Following, a ease of using the Illinois scheme will be described, although it is similarly possible to use the Berkeley scheme.

In the Illinois scheme, the main memory 3 is equipped with the reflective function in which, when the intervention occurs at a time of the shared read of the main memory 3, instead of interrupting the read operation on the main memory, the data transferred by the intervention to the internal bus is written into the main memory 3. As a result, the cache memory 2 on the other processor board which made the intervention can fulfill the duty to write back at a time of the intervention, so that there is no need of the state O for indicating the presence of the ownership.

Accordingly, the state transitions For the cache state tag memory 24 in the sharing management unit 4 can be summarized as shown in the tables of FIGS. 28A and 28B for the access to the main memory on the same processor board instead of the tables of FIGS. 7A and 7B for the First embodiment, and as shown in the tables of FIGS. 29A and 29B for the access to the main memory on the other processor board instead of the tables of FIGS. 8A and 8B.

Figure 30:
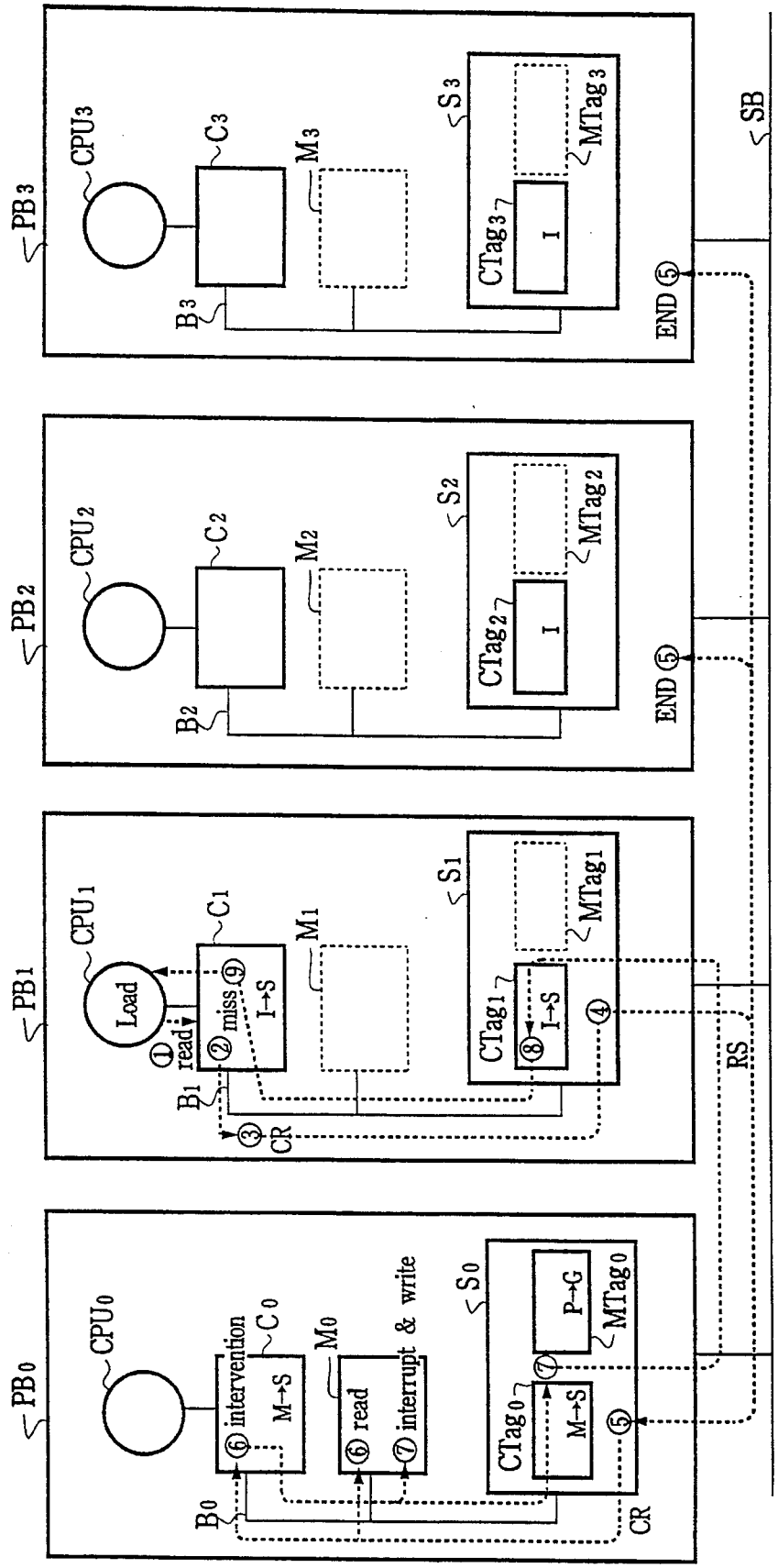
FIGS. 30 to 32 are illustrative diagrams of the exemplary configuration of FIG. 14, illustrating the operations of the third embodiment of the distributed shared-memory multiprocessor system according to the present invention, under various situations.

FIG. 30 illustrates the situation in which the $CPU_1$ on the first processor board $PB_1$ executed the load instruction requesting the read operation (1) with respect to the address 0x0000 1000, which has been updated in the cache memory $C_0$ on the zeroth processor board $PB_0$. In this case, the cache miss (2) occurs at the cache memory $C_1$ on this first processor board $PB_1$, and the coherent read (CR) command (3) for the shared read is issued on the internal bus $B_1$ on this first processor board $PB_1$. Since this address is not allocated to the main memory $M_1$ on this first processor board $PB_1$, the sharing management unit $S_1$ on this first processor board $PB_1$ issues the read shared (RS) command (4) on the shared bus SB.

The other processor boards $PB_0$, $PB_2$, and $PB_3$ monitor this read shared (RS) command on the shared bus SB, but the operation is ended (5) at the second and third processor boards $PB_2$ and $PB_3$ as their cache state tag memories $CTag_2$ and $CTag_3$ have the cache state for this cache line in the state I. On the other hand, the zeroth processor board $PB_0$ has the cache state tag memory $CTag_0$ indicating the cache state for this cache line in the state M, so that the sharing management unit $S_0$ on this zeroth processor board $PB_0$ issues the coherent read (CR) command (5) for the shared read on the internal bus $B_0$ on this zeroth processor board $PB_0$, so as to read out (6) the data of this cache line from the main memory $M_0$ on this zeroth processor board $PB_0$, while at the same time the cache memory $C_0$ on this zeroth processor board $PB_0$ activates (6) the intervention indication line of the internal bus $B_0$ in order to intervene with this memory access, and the cache state of the cache state tag unit in this cache memory $C_0$ makes the state transition from the state M to the state S.

Then, in response, the memory access at the main memory $M_0$ on the zeroth processor board $PB_0$ is interrupted (7) and the newest value for this cache line in the cache memory $C_0$ is written into the main memory $M_0$ so as to fulfill the duty to write back, and the newest value is then transmitted through the shared bus SB to the first processor board $PB_1$. At this point, the cache state in the cache state tag memory $CTag_0$ makes the state transition (7) from the state M to the state S, while the sharing state in the main memory tag memory $MTag_0$ makes the state transition (7) from the state P to the state G.

Next, on the first processor board $PB_1$, the cache state in the cache state tag memory $CTag_1$ makes the state transition (8) from the state I to the state S, and the data transmitted through the shared bus SB is cached (9) into the cache memory $C_1$ while the cache state in the cache state tag unit of the cache memory $C_1$ makes the state transition (9) from the state I to the state S. Then, the cached data is loaded to the $CPU_1$.

Figure 31:
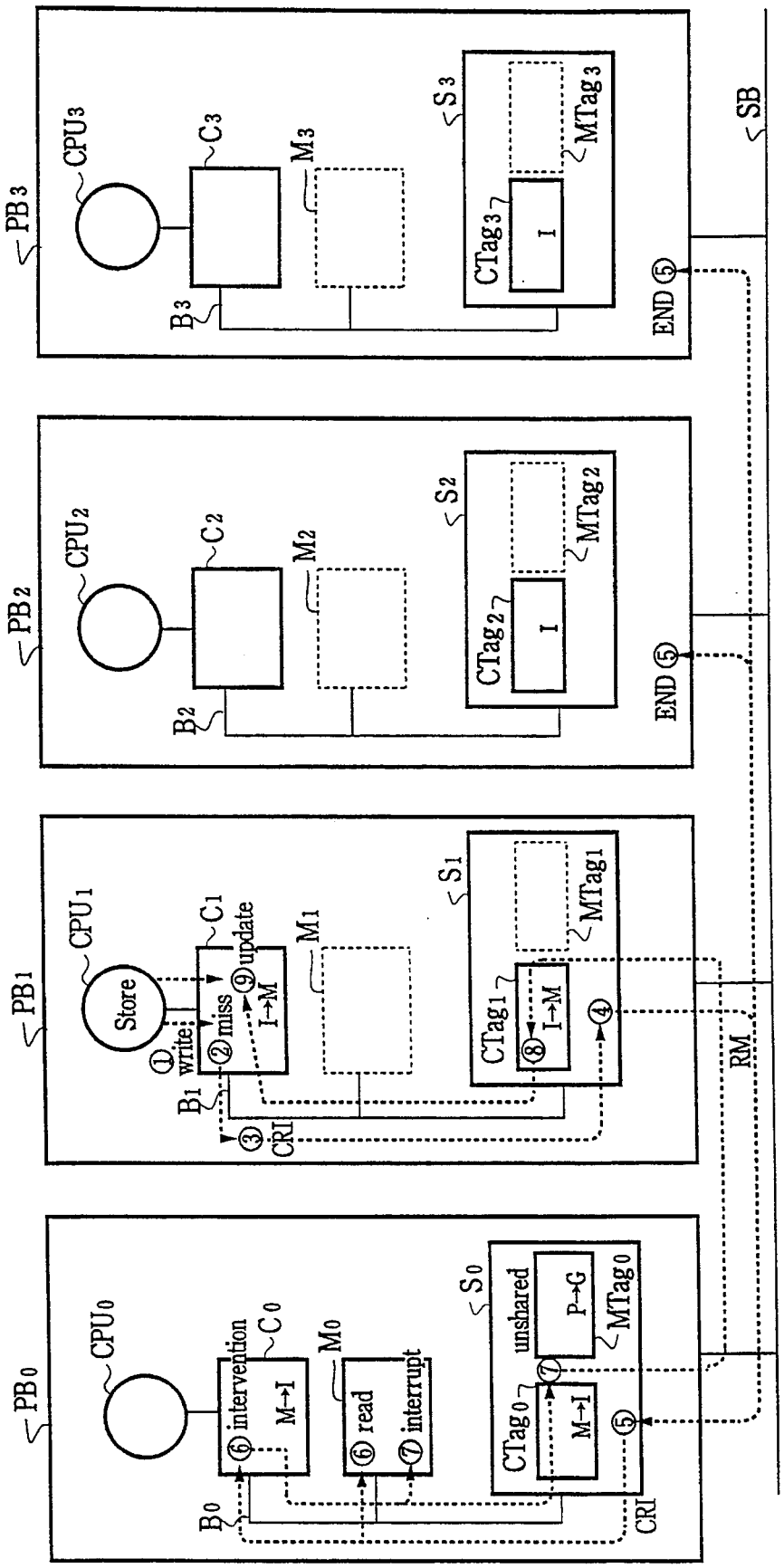

FIG. 31 illustrates the situation in which the $CPU_1$ on the first processor board $PB_1$ executed the store instruction requesting the write operation (1) with respect to the address 0x0000 1000, which has been updated in the cache memory $C_0$ on the zeroth processor board $PB_0$. In this case, the cache miss (2) occurs at the cache memory $C_1$ on this first processor board $PB_1$, and the coherent read and invalidate (CRI) command (3) for the exclusive read is issued on the internal bus $B_1$ on this first processor board $PB_1$. Since this address is not allocated to the main memory $M_1$ on this first processor board $PB_1$, the sharing management unit $S_1$ on this first processor board $PB_1$ issues the read modified (RM) command (4) for the exclusive read on the shared bus SB.

The other processor boards $PB_0$, $PB_2$, and $PB_3$ monitor this read modified (RM) command on the shared bus SB, but the operation is ended (5) at the second and third processor boards $PB_2$ and $PB_3$ as their cache state tag memories $CTag_2$ and $CTag_3$ have the cache state for this cache line in the state I. On the other hand, the zeroth processor board $PB_0$ has the cache state tag memory $CTag_0$ indicating the cache state for this cache line in the state M, so that the sharing management unit $S_0$ on this zeroth processor board $PB_0$ issues the coherent read and invalidate (CRI) command (5) for the exclusive read on the internal bus $B_0$ on this zeroth processor board $PB_0$, so as to read out (6) the data of this cache line from the main memory $M_0$ on this zeroth processor board $PB_0$, while at the same time the cache memory $C_0$ on this zeroth processor board $PB_0$ activates (6) the intervention indication line of the internal bus $B_0$ in order to intervene with this memory access, and the cache state of the cache state tag unit in this cache memory $C_0$ makes the state transition from the state M to the state I.

Then, in response, the memory access at the main memory $M_0$ on the zeroth processor board $PB_0$ is interrupted (7) and the newest value is transmitted through the shared bus SB to the first processor board $PB_1$. Here, there is no need to write the newest value into the main memory $M_0$ because this newest value is going to be updated on the first processor board $PB_1$ anyway. At this point, the cache state in the cache state tag memory $CTag_0$ makes the state transition (7) from the state M to the state I, while the sharing state in the main memory tag memory $MTag_0$ makes the state transition (7) from the state P to the state G.

Next, on the first processor board $PB_1$, the cache state in the cache state tag memory $CTag_1$ makes the state transition (8) from the state I to the state M, and the data transmitted through the shared bus SB is cached (9) into the cache memory $C_1$ while the cache state in the cache state tag unit of the cache memory $C_1$ makes the state transition from the state I to the state M. Then, the cached data is updated at this cache memory $C_1$.

Figure 32:
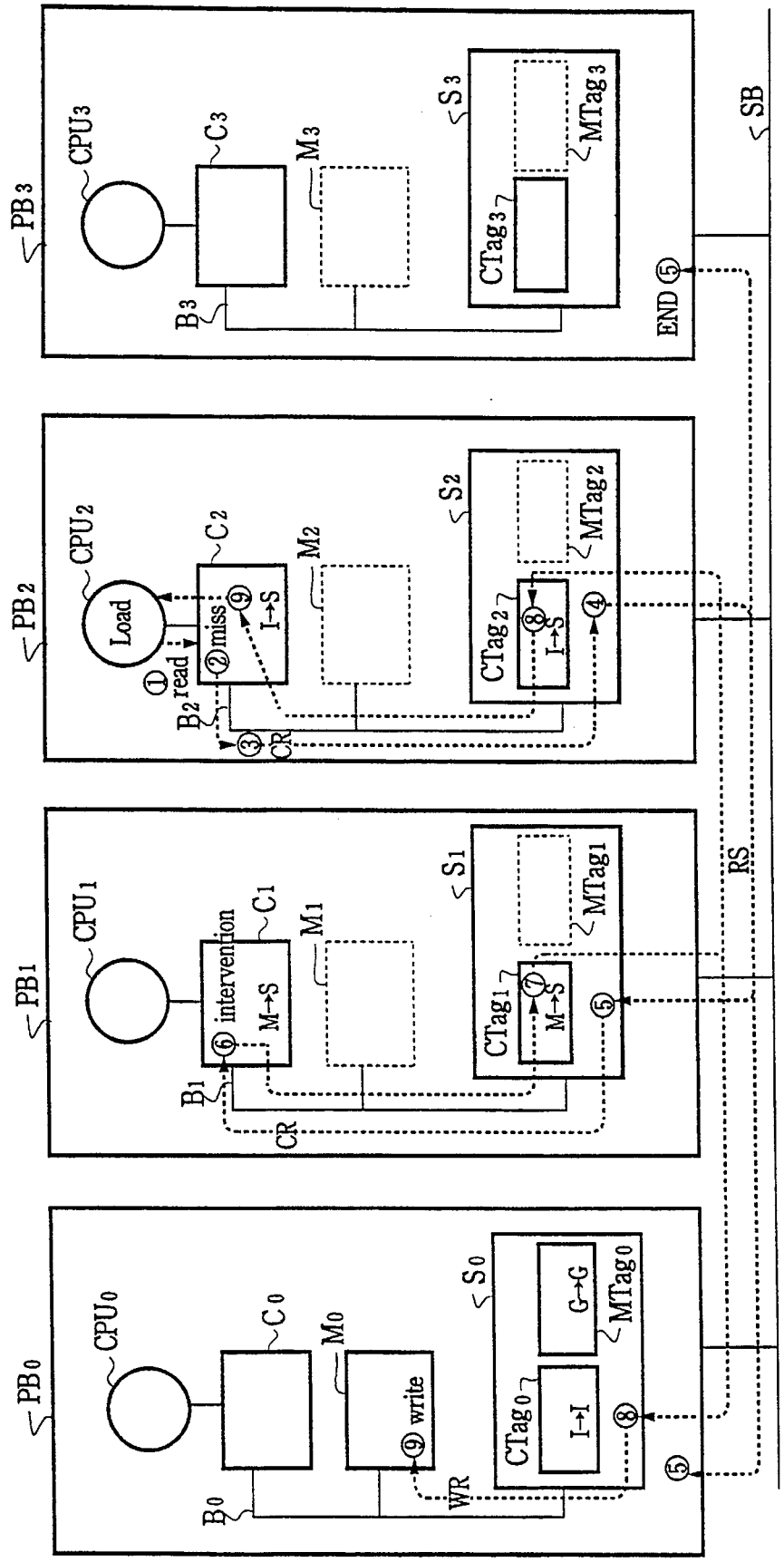

FIG. 32 illustrates the situation in which the $CPU_2$ on the second processor board $PB_2$ executed the load instruction requesting the read operation (1) with respect to the address 0x0000 1000, which has been updated in the cache memory $C_1$ on the first processor board $PB_1$. In this case, the cache miss (2) occurs at the cache memory $C_2$ on this second processor board $PB_2$, and the coherent read (CR) command (3) for the shared read is issued on the internal bus $B_2$ on this second processor board $PB_2$. Since this address is not allocated to the main memory $M_2$ on this second processor board $PB_2$, the sharing management unit $S_2$ on this second processor board $PB_2$ issues the read shared (RS) command (4) on the shared bus SB.

The other processor boards $PB_0$, $PB_1$, and $PB_3$ monitor this read shared (RS) command on the shared bus SB, but the operation is ended (5) at the third processor board $PB_3$ as this third processor board $PB_3$ has no copy of this cache line in both the cache memory $C_3$ and the main memory $M_3$.

On the other hand, the first processor board $PB_1$ has the cache state tag memory $CTag_1$ indicating the cache state for this cache line in the state M, so that the sharing management unit $S_1$ on this first processor board $PB_1$ issues the coherent read (CR) command (5) on the internal bus $B_1$ on this first processor board $PB_1$, and the access is made (6) to this cache memory $C_1$, so as to read out the newest value for this cache line from the cache memory $C_1$ on this first processor board $PB_1$ while activating the intervention indication line on the internal bus $B_1$. At this point, the cache state in the cache state tag unit in the cache memory $C_1$ on the first processor board $PB_1$ makes the state transition (6) from the state M to the state S, and then the cache state in the cache state tag memory $CTag_1$ in the sharing management unit $S_1$ on the first processor board $PB_1$ also makes the state transition (7) from the state M to the state S. Then, the newest value read out from this cache memory $C_1$ is transmitted through the shared bus SB to the second processor board $PB_2$ which requested the access to this cache line, along with the indication of the intervention on the intervention indication line of the shared bus SB. As for the zeroth processor board $PB_0$, its cache state tag memory $CTag_0$ has the cache state for this cache line in the state I, so that this zeroth processor board $PB_0$ does not responds to this read shared (RS) command on the shared bus SB.

Next, on the second processor board $PB_2$, the cache state in the cache state tag memory $CTag_2$ in the sharing management unit $S_2$ on the second processor board $PB_2$ makes the state transition (8) from the state I to the state S, while the cache state in the cache state tag memory $CTag_0$ in the sharing management unit $S_0$ on the zeroth processor board $PB_0$ remains in the state I.

Then, the data transmitted through the shared bus SB is cached (9) into the cache memory $C_2$ while the cache state in the cache state tag unit of the cache memory $C_2$ makes the state transition (9) from the state I to the state S. Then, the cached data is loaded to the $CPU_2$.

Meanwhile, on the zeroth processor board $PB_0$, in response to the indication of the intervention on the intervention indication line of the shared bus SB, the sharing management unit $S_0$ issues the normal write (WR) command (8) on the internal bus $B_0$, and the newest value of this cache line transmitted through the shared bus SB is written (9) into the main memory $M_0$ on this zeroth processor board $PB_0$, so as to fulfill the duty to write back.

Next, a fourth embodiment of a distributed shared-memory multiprocessor system according to the present invention will be described in detail.

This fourth embodiment concerns with a modification of the first embodiment described above regarding the enhancement of the sharing states in the main memory tag memory 27 in the sharing management unit 4 to incorporate the information indicative of whether each cache line has been updated in the cache memory 2 on the other processor board or not (i.e., the presence of the ownership on the other processor board or not), in addition to the information indicative of whether each cache line has been accessed from the cache memory 2 on the other processor board or not already used in the first embodiment.

This additional information in the sharing state is useful because it can notify the occurrence of the intervention at a time of the read operation with respect to the main memory 3 in advance, since this additional information in effect implies the absence of the ownership on its own processor board.

A bit expressing this additional information is activated when the read modified (RM) command or the invalidate (INV) command is issued on the shared bus 6, and released when the write back (WB) command is issued on the shared bus 6, so as to reflect the presence of the ownership accurately.

Thus, in this fourth embodiment, the main memory tag memory 27 can take the following three states P, G, and A.

[P (Private)]: No copy of this cache line is present on the cache memory 2 of the other processor board.

[G (Global)]: A copy of this cache line may be present on the cache memory 2 on the other processor board, but the ownership is on its own processor board.

[A (Away)]: The ownership for this cache line is present on the cache memory 2 on the other processor board.

Here, the presence of the ownership implies the presence of the copy in the cache memory 2 on that processor board, so that these three states suffice to cover all the possible situations.

In this fourth embodiment, each processor board can know the occurrence of the intervention at a time of the read operation with respect to the main memory 3 in advance from the sharing state in the main memory tag memory 27 in the sharing management unit 4, so that the traffic on the shared bus 6 can be reduced as the processor board with the main memory allocated with the requested address carries out the operation according to the sharing state as follows.

[P]: Both read and write operations can be carried out by using only the internal bus 5.

[G]: The read operation can be carried out by using only the internal bus 5. In a case of the write operation, the invalidate (INV) command is issued on the shared bus 6.

[A]: In a case of the read operation, the access to the main memory is interrupted and the intervention from the shared bus 6 is awaited. In a case of the write operation, the invalidate (INV) command is issued on the shared bus 6.

Also, in this fourth embodiment, when the sharing state is the state P at a time of the refilling of the cache memory 2, it implies that there is no copy on the other processor board, so that the cache state can be set to the state E. Note here that all of the read, write, and replace operations can be carried out by using only the internal bus 5 when the cache state is the state E, so that the effect of the reduction of the traffic on the shared bus 6 can be enhanced in this fourth embodiment.

Also, even when there is a memory access request with respect to a cache line allocated to the main memory 3 on its own processor board, if the sharing state in the main memory tag memory 27 for this cache line is the state A, the memory access to the main memory 3 will be intervened by the other processor board anyway, so that it is unnecessary to carry out this memory access to the main memory 3, and the traffic on the internal bus 5 of this processor board can be reduced.

Accordingly, the state transitions for the cache state tag memory 24 in the sharing management unit 4 can be summarized as shown in the tables of FIGS. 33A and 33B for the access to the main memory on the same processor board instead of the tables of FIGS. 7A and 7B for the first embodiment, and as shown in the tables of FIGS. 34A and 34B for the access to the main memory on the other processor board instead of the tables of FIGS. 8A and 8B.

Figure 35:
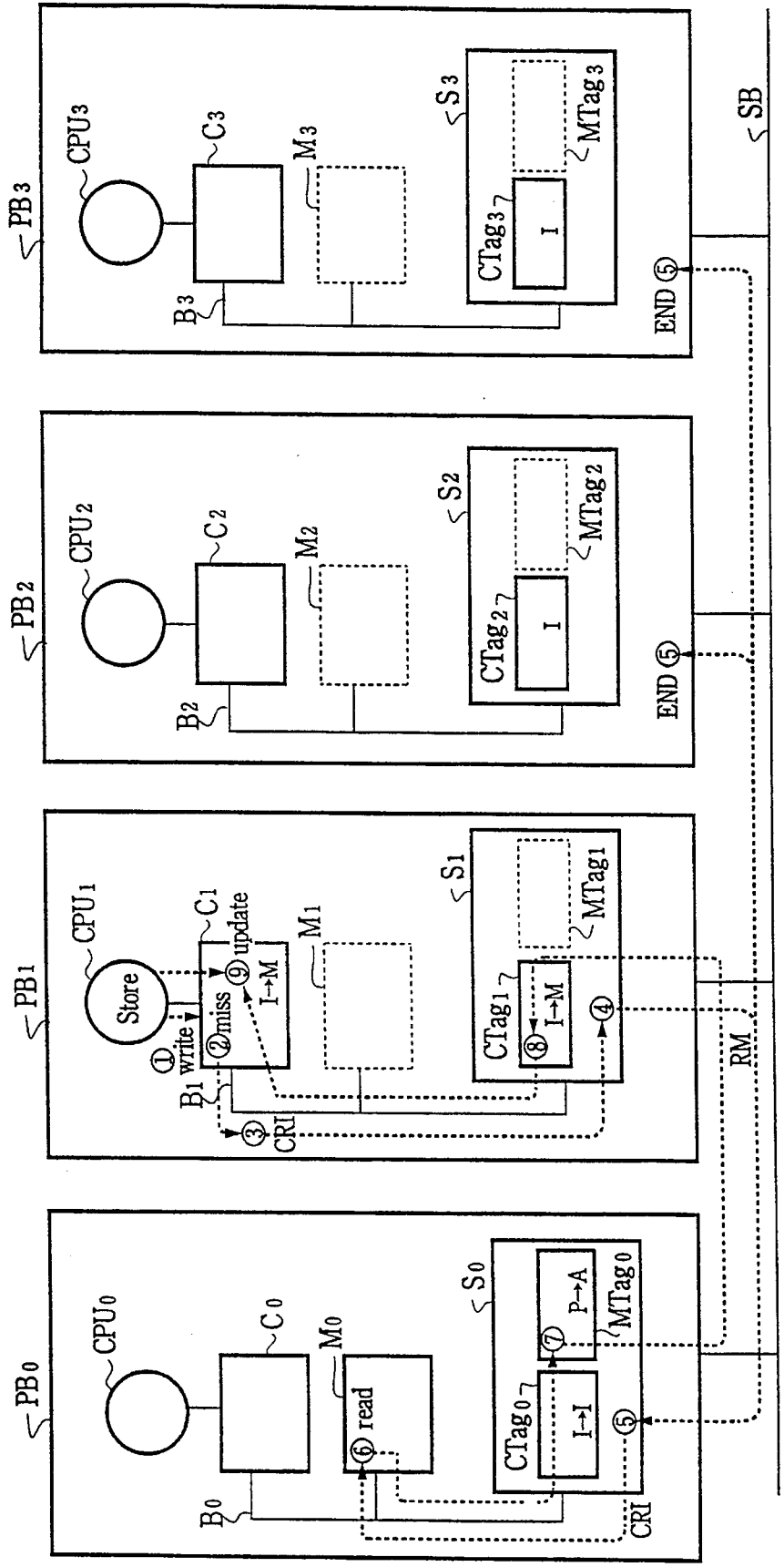
FIGS. 35 to 38 are illustrative diagrams of the exemplary configuration of FIG. 14, illustrating the operations of the fourth embodiment of the distributed shared-memory multiprocessor system according to the present invention, under various situations.

FIG. 35 illustrates the situation in which the $CPU_1$ on the first processor board $PB_1$ executed the store instruction requesting the write operation (1) with respect to the address 0x0000 1000, which is stored in the main memory $M_0$ on the zeroth processor board $PB_0$. In this case, the cache miss (2) occurs at the cache memory $C_1$ on this first processor board $PB_1$, and the coherent read and invalidate (CRI) command (3) for the exclusive read is issued on the internal bus $B_1$ on this first processor board $PB_1$. Since this address is not allocated to the main memory $M_1$ on this first processor board $PB_1$, the sharing management unit $S_1$ on this first processor board $PB_1$ issues the read modified (RM) command (4) for the exclusive read on the shared bus SB.

The other processor boards $PB_0$, $PB_2$, and $PB_3$ monitor this read modified (RM) command on the shared bus SB, but the operation is ended (5) at the second and third processor boards $PB_2$ and $PB_3$ as they have no copy of this cache line in both the cache memories $C_2$ and $C_3$ and the main memories $M_2$ and $M_3$. On the other hand, the zeroth processor board $PB_0$ has the main memory $M_0$ to which this address is allocated, so that the sharing management unit $S_0$ on this zeroth processor board $PB_0$ issues the coherent read and invalidate (CRI) command (5) for the exclusive read on the internal bus $B_0$ on this zeroth processor board $PB_0$, so as to read out (6) the data of this cache line from the main memory $M_0$ on this zeroth processor board $PB_0$.

Then, the data read out from this main memory $M_0$ is transmitted through the shared bus SB to the first processor board $PB_1$. At this point, the sharing state in the main memory tag memory $MTag_0$ makes the state transition (7) from the state P to the state A to indicate the transfer of the ownership to the other processor board, while the cache state in the cache state tag memory $CTag_0$ remains in the state I.

Next, on the first processor board $PB_1$, the cache state in the cache state tag memory $CTag_1$ makes the state transition (8) from the state I to the state M, and the data transmitted through the shared bus SB is cached (9) into the cache memory $C_1$ while the cache state in the cache state tag unit of the cache memory $C_0$ makes the state transition (9) from the state I to the state M. Then, the cached data is updated at this cache memory $C_1$.

Figure 36:
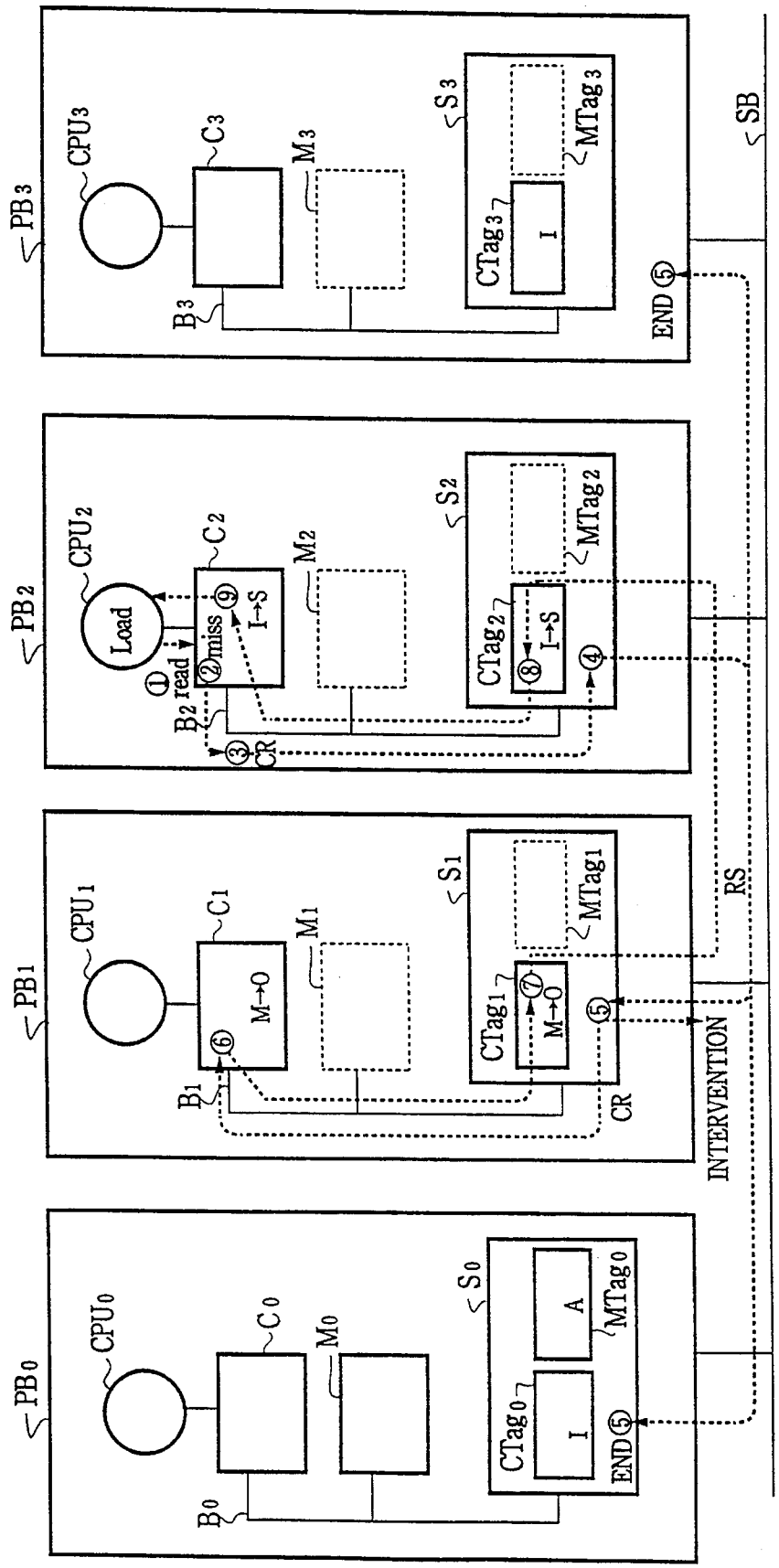

FIG. 36 illustrates the situation in which the $CPU_2$ on the second processor board $PB_2$ executed the load instruction requesting the read operation (1) with respect to the address 0x0000 1000, which has been updated in the cache memory $C_1$ on the first processor board $PB_1$ and whose ownership has been transferred from the zeroth processor board $PB_0$ to the first processor board $PB_1$. In this case, the cache miss (2) occurs at the cache memory $C_2$ on this second processor board $PB_2$, and the coherent read (CR) command (3) for the shared read is issued on the internal bus $B_2$ on this second processor board $PB_2$. Since this address is not allocated to the main memory $M_2$ on this second processor board $PB_2$, the sharing management unit $S_2$ on this second processor board $PB_2$ issues the read shared (RS) command (4) on the shared bus SB.

The other processor boards $PB_0$, $PB_1$, and $PB_3$ monitor this read shared (RS) command on the shared bus SB, but the operation is ended (5) at the zeroth and third processor boards $PB_0$ and $PB_3$ as their cache state tag memories $CTag_0$ and $CTag_3$ have the cache state for this cache line in the state I. In particular, the zeroth processor board $PB_0$ remains totally inactive such that no command is issued on the internal bus $B_0$, because the main memory tag memory $MTag_0$ indicates the sharing state in the state A, indicating the absence of the ownership for this cache line, even though this address is allocated to the main memory $M_0$ on this zeroth processor board $PB_0$.

On the other hand, the first processor board $PB_1$ has the cache state tag memory $CTag_1$ indicating the cache state for this cache line in the state M, so that the sharing management unit $S_1$ on this first processor board $PB_1$ issues the coherent read (CR) command (5) on the internal bus $B_1$ on this first processor board $PB_1$, and the access is made (6) to this cache memory $C_1$, so as to read out the newest value for this cache line from the cache memory $C_1$ on this first processor board $PB_1$. At this point, the cache state in the cache state tag unit in the cache memory $C_1$ on the first processor board $PB_1$ makes the state transition (6) from the state M to the state O, and then the cache state in the cache state tag memory $CTag_1$ in the sharing management unit $S_1$ on the first processor board $PB_1$ also makes the state transition (7) from the state M to the state O. Then, the newest value read out from this cache memory $C_1$ is transmitted through the shared bus SB to the second processor board $PB_2$ which requested the access to this cache line.

Next, on the second processor board $PB_2$, the cache state in the cache state tag memory $CTag_2$ in the sharing management unit $S_2$ on the second processor board $PB_2$ makes the state transition (8) from the state I to the state S.

Then, the data transmitted through the shared bus SB is cached (9) into the cache memory $C_2$ while the cache state in the cache state tag unit of the cache memory $C_2$ makes the state transition (9) from the state I to the state S. Then, the cached data is loaded to the $CPU_2$.

Figure 37:
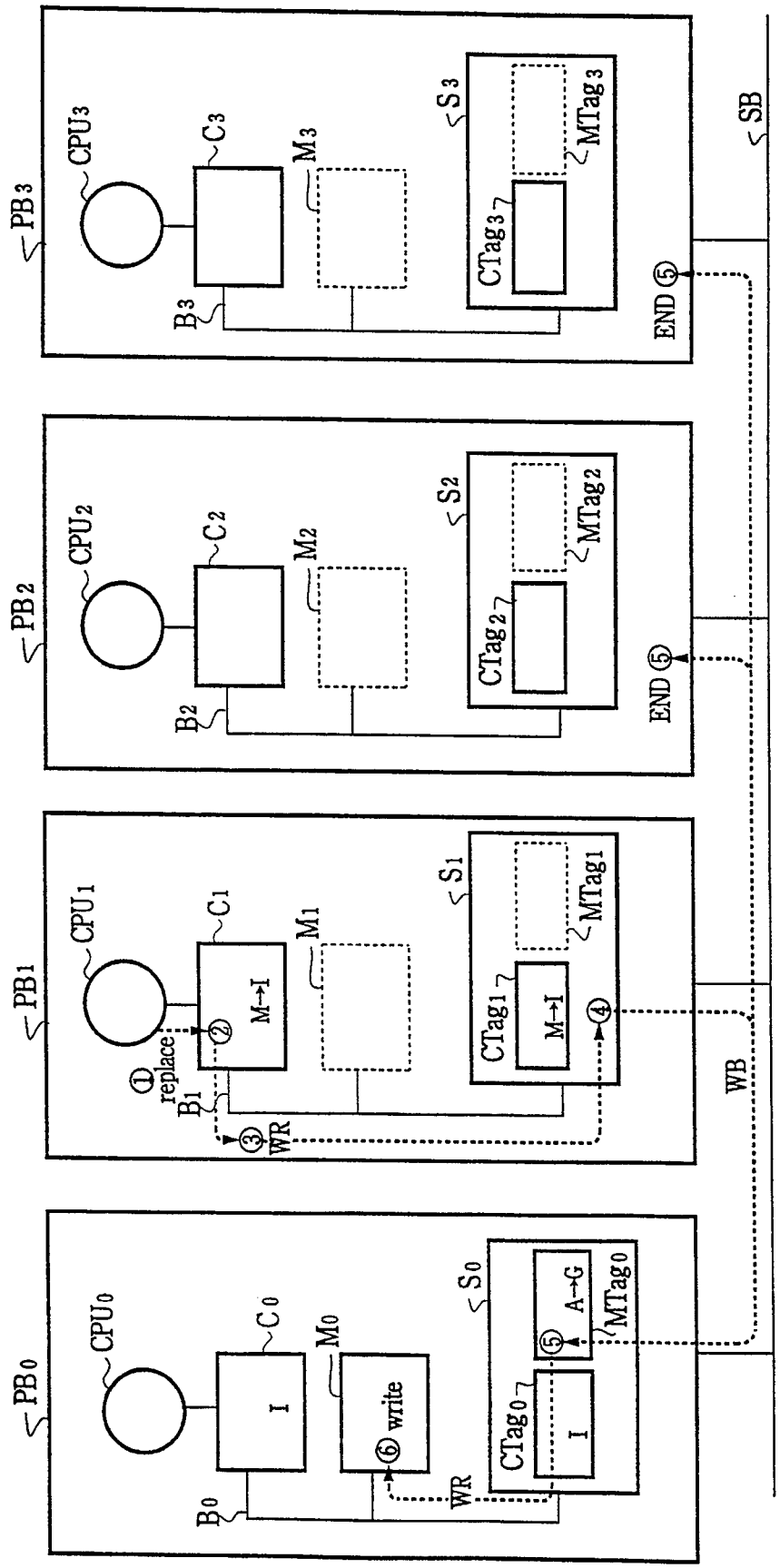

FIG. 37 illustrates the situation in which the $CPU_1$ on the first processor board $PB_1$ executed the write back (replace) operation (1), due to the cache entry conflict or the cache flash instruction, with respect to the address 0x0000 1000, which has been updated in the cache memory $C_1$ on the first processor board $PB_1$ and whose ownership has been transferred from the zeroth processor board $PB_0$ to the first processor board $PB_1$. In this case, the cache memory $C_1$ reads out (2) the newest value for this cache line, while the cache state in the cache state tag unit in the cache memory $C_1$ makes the state transition (2) from the state M to the state I, and the normal write (WR) command (3) for the write back is issued on the internal bus $B_1$ on this first processor board $PB_1$. Since this address is not allocated to the main memory $M_1$ on this first processor board $PB_1$, the sharing management unit $S_1$ on this first processor board $PB_1$ issues the write back (WB) command (4) on the shared bus SB and transmits the newest value for this cache line read out from the cache memory $C_1$, while the cache state in the cache state tag memory $CTag_1$ in the sharing management unit $S_1$ makes the state transition (4) from the state M to the state I.

The other processor boards $PB_0$, $PB_2$, and $PB_3$ monitor this write back (WB) command on the shared bus SB, but the operation is ended (5) at the second and third processor boards $PB_2$ and $PB_3$ as they have no location in the main memories $M_2$ and $M_3$. On the other hand, the zeroth processor board $PB_0$ has the main memory $M_0$ to which this address is allocated, so that the sharing management unit $S_0$ on this zeroth processor board $PB_0$ issues the normal write (WR) command (5) for the write back on the internal bus $B_0$ on this zeroth processor board $PB_0$, while the sharing state in the main memory tag memory $MTag_0$ makes the state transition from the state A to the state G, indicating the return of the ownership for this cache line. Then, the newest value for this cache line transmitted through the shared bus SB is written (6) into the main memory $M_0$ on this zeroth processor board $PB_0$.

Figure 38:
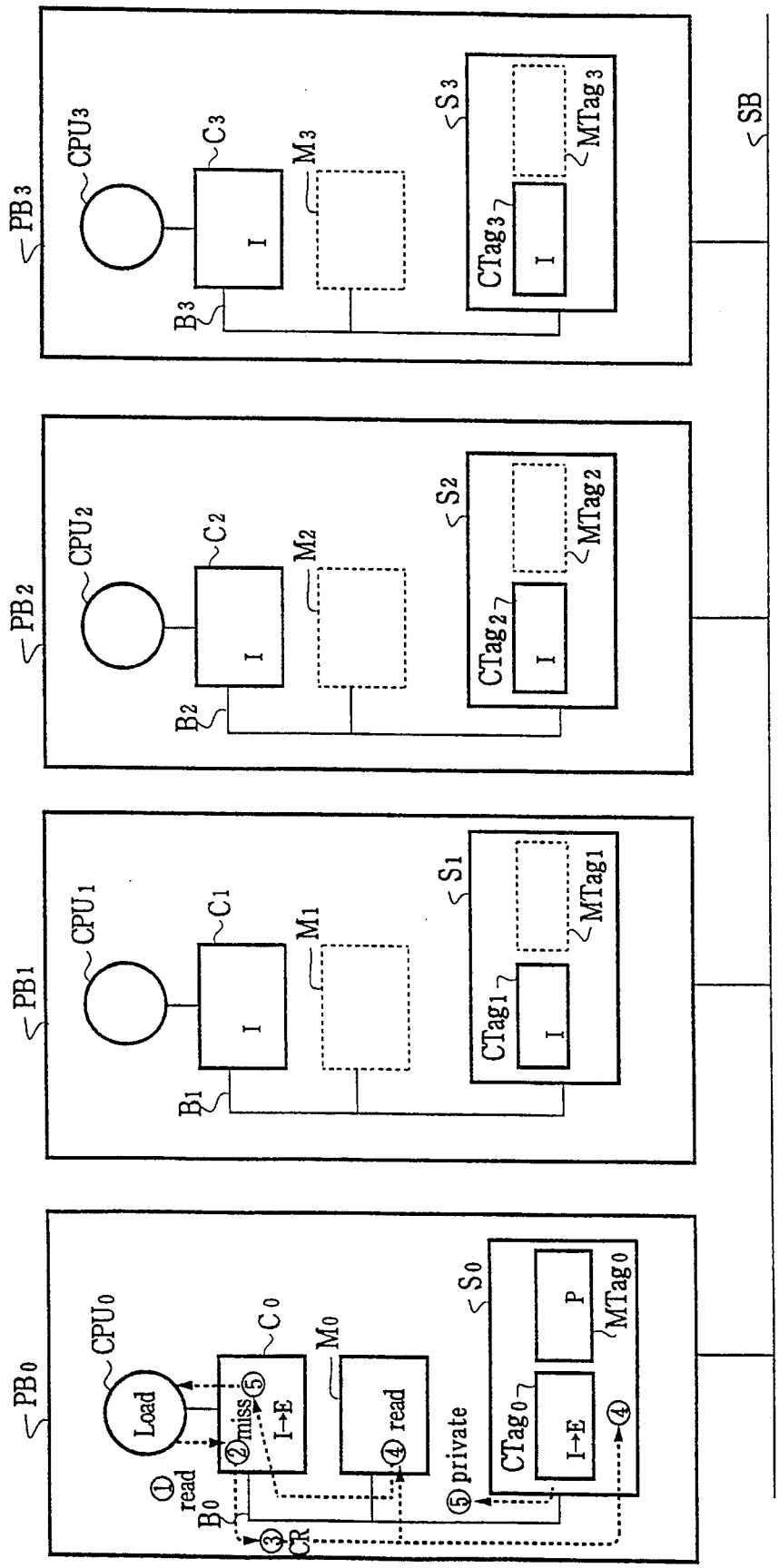

FIG. 38 illustrates the situation in which the $CPU_0$ on the zeroth processor board $PB_0$ executed the load instruction requesting the read operation (1) with respect to the address 0x0000 1000. In this case, the cache miss (2) occurs at the cache memory $C_0$ on this zeroth processor board $PB_0$, and the coherent read (CR) command (8) for the shared read is issued on the internal bus $B_0$ on this zeroth processor board $PB_0$. Since the sharing state in the main memory tag memory $MTag_0$ on this zeroth processor board $PB_0$ is the state P (4) indicating the totally exclusive "private" state, the access is made to the main memory $M_0$ on this zeroth processor board $PB_0$ without making any access to the shared bus SB, and the data stored at this address 0x0000 1000 in the main memory Mm is read out (4) and cached (5) into the cache memory $C_0$ on the same zeroth processor board $PB_0$, from which the cached data is loaded to the $CPU_0$.

Accordingly, on this zeroth processor board $PB_0$, the cache state in the cache state tag unit of the cache memory $C_0$ as well as the cache state in the cache state tag memory $CTag_0$ for this cache line make the state transition (5) from the state I to the state E.

Hereafter, the subsequent accesses from the $CPU_0$ to the cache line of this address 0x0000 1000 can be made by the cache hit at the cache memory $C_0$, without issuing any command on the internal bus $B_0$, on this zeroth processor board $PB_0$, Next, a fifth embodiment of a distributed shared-memory multiprocessor system according to the present invention will be described in detail.

This fifth embodiment concerns with a further modification of the first embodiment described above beyond the fourth embodiment, regarding the change of the meaning of the sharing states in the main memory tag memory 27 in the sharing management unit 4 to only two states indicative of whether each cache line has been updated in the cache memory 2 on the other processor board or not (i.e., the presence of the ownership on the other processor board or not).

It is to be noted here that the reduction of the number of the sharing states to just two states is effective for the reduction of the cost of the entire system. Namely, in a case of providing the sharing state per each cache line of 64 bytes for the main memory 3 of 64 Mbytes as in this example, when the number of the sharing states is only two, the sharing state can be expressed by only one bit, whereas when the number of the sharing states is three as in the fourth embodiment described above, two bits are required for expressing the sharing states, and this requirement amounts to the increase of 2 Mbytes of the memory capacity for the maim memory tag memory 27. This 2 Mbytes is nearly equivalent to the capacity of a one chip SRAM realizable by the present day technology, so that it is certainly possible to actually implement it, but it is less advantageous in terms of the overall cost.

More specifically, in this fifth embodiment, the main memory tag memory 27 can take the following two states H and A.

[H (Home)]: A copy of this cache line may be present on the cache memory 2 on the other processor board, but the ownership is on its own processor board.

[A (Away)]: The ownership for this cache line is present on the other processor board.

Here, as mentioned above, the presence of the ownership implies the presence of the newest copy in the cache memory 2 or the main memory 3 on that processor board.

In this fifth embodiment, each processor board can know the presence or absence of the ownership in advance from the sharing state in the main memory tag memory 27 in the sharing management unit 4, so that the traffic on the shared bus 6 can be reduced as the processor board with the main memory allocated with the requested address carries out the operation according to the sharing state as follows.

[H]: The read operation can be carried out by using only the internal bus 5. In a case of the write operation, the invalidate (INV) command is issued on the shared bus 6.

[A]: In a case of the read operation, the access to the main memory is interrupted and the intervention from the shared bus 6 is awaited. In a case of the write operation, the invalidate (INV) command is issued on the shared bus 6.

Here, however, in a case of the state H, the read operation is carried out by using only the internal bus 5, so that there is no way of knowing whether a copy of this cache line is really present on the cache memory 2 on the other processor board or not. For this reason, whenever the refilling of the cache memory 2 occurs, the refilled cache data must be supplied to the cache memory by activating the sharing indication line on the shared bus 6 to indicate its cache state as the shared state.

Also, even when there is a memory access request on the shared bus 6 with respect to a cache line allocated to the main memory 3 on its own processor board, if the sharing state in the main memory tag memory 27 for this cache line is the state A, the memory access to the main memory 3 will be intervened by the other processor board anyway, so that it is unnecessary to carry out this memory access to the main memory 3, and the traffic on the internal bus 5 of this processor board can be reduced.

Accordingly, the state transitions for the cache state tag memory 24 in the sharing management unit 4 can be summarized as shown in the tables of FIGS. 39A and 39B for the access to the main memory on the same processor board instead of the tables of FIGS. 7A and 7B for the first embodiment, and as shown in the tables of FIGS. 40A and 40B for the access to the main memory on the other processor board instead of the tables of FIGS. 8A and 8B.

Figure 41:
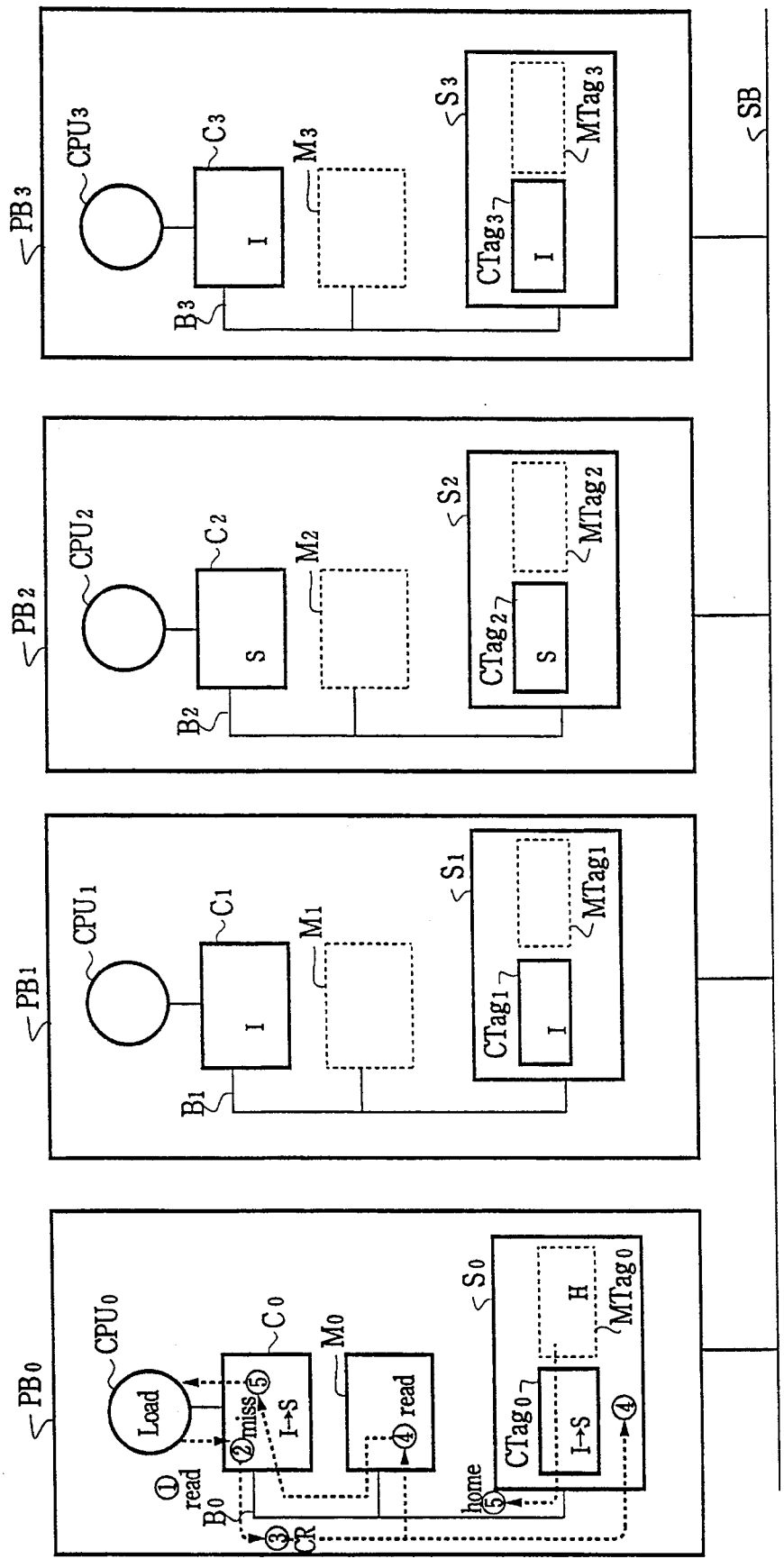
FIGS. 41 to 44 are illustrative diagrams of the exemplary configuration of FIG. 14, illustrating the operations of the fifth embodiment of the distributed shared-memory multiprocessor system according to the present invention, under various situations.

FIG. 41 illustrates the situation in which the $CPU_0$ on the zeroth processor board $PB_0$ executed the load instruction requesting the read operation (1) with respect to the address 0x0000 1000. In this ease, the cache miss (2) occurs at the cache memory $C_0$ on this zeroth processor board $PB_0$, and the coherent read (CR) command (3) for the shared read is issued on the internal bus $B_0$ on this zeroth processor board $PB_0$, so as to make an access (4) to the main memory $M_0$ on this zeroth processor board $PB_0$. Here, since the sharing state in the main memory tag memory $MTag_0$ on this zeroth processor board $PB_0$ is the state H (4) indicating "home", implying the absence of the ownership of this cache line on the other processor board (5), the access is made to the main memory $M_0$ on this zeroth processor board $PB_0$ without making any access to the shared bus SB, and the data stored at this address 0x0000 1000 in the main memory $M_0$ is read out (4) and cached (5) into the cache memory $C_0$ on the same zeroth processor board $PB_0$, from which the cached data is loaded to the $CPU_0$.

Accordingly, on this zeroth processor board $PB_0$, the cache state in the cache state tag unit of the cache memory $C_0$ as well as the cache state in the cache state tag memory $CTag_0$ for this cache line make the state transition (5) from the state I to the state S.

Figure 42:
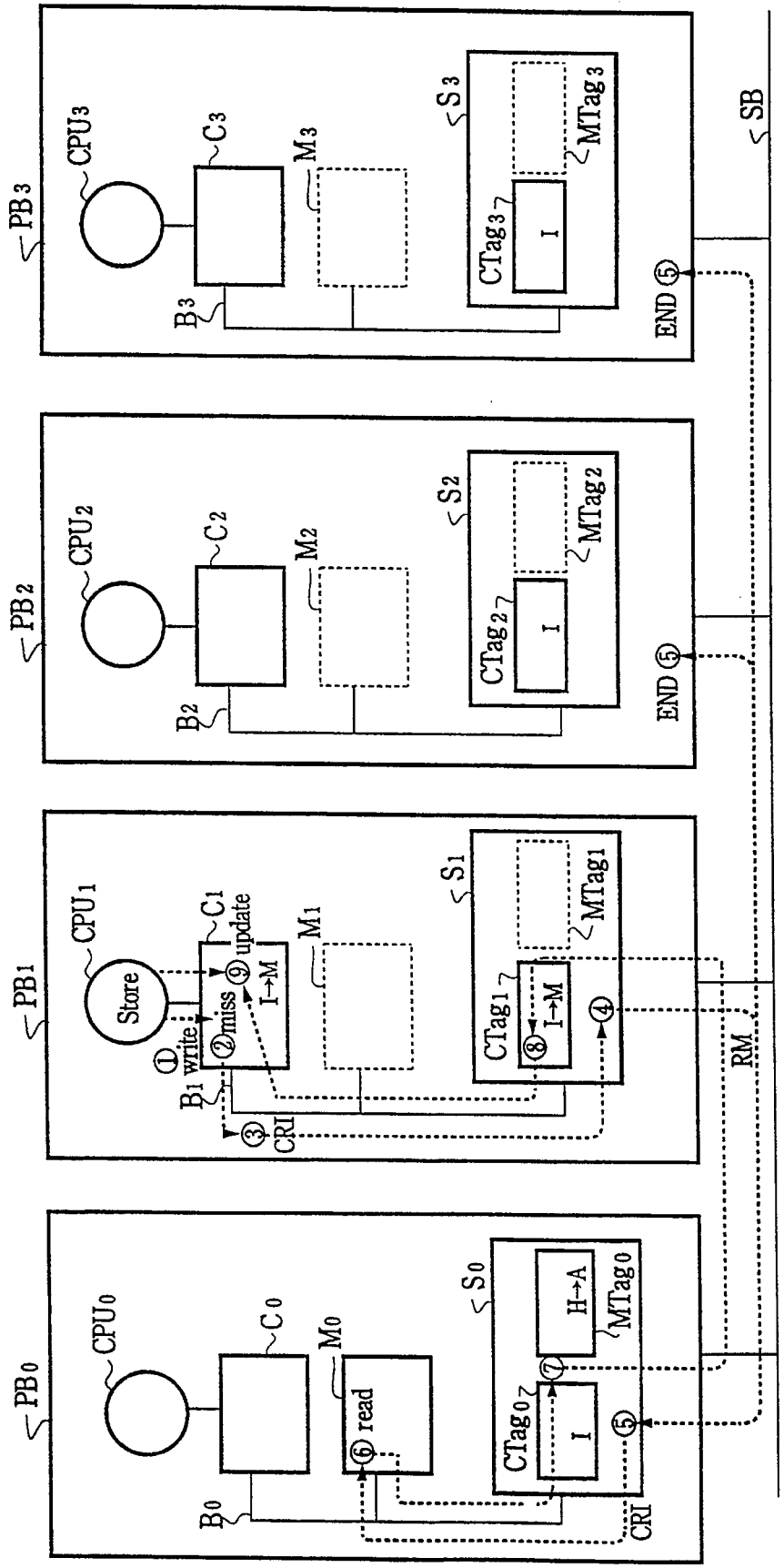

Hereafter, the subsequent accesses from the $CPU_0$ to the cache line of this address 0x0000 1000 can be made by the cache hit at the cache memory $C_0$, without issuing any command on the internal bus $B_0$, on this zeroth processor board $PB_0$, FIG. 42 illustrates the situation in which the $CPU_1$ on the first processor board $PB_1$ executed the store instruction requesting the write operation (1) with respect to the address 0x0000 1000, which is stored in the main memory $M_0$ on the zeroth processor board $PB_0$. In this case, the cache miss (2) occurs at the cache memory $C_1$ on this first processor board $PB_1$, and the coherent read and invalidate (CRI) command (3) for the exclusive read is issued on the internal bus $B_1$ on this first processor board $PB_1$. Since this address is not allocated to the main memory $M_1$ on this first processor board $PB_1$, the sharing management unit $S_1$ on this first processor board $PB_1$ issues the read modified (RM) command (4) for the exclusive read on the shared bus SB.

The other processor boards $PB_0$, $PB_2$, and $PB_3$ monitor this read modified (RM) command on the shared bus SB, but the operation is ended (5) at the second and third processor boards $PB_2$ and $PB_3$ as they have no copy of this cache line in both the cache memories $C_2$ and $C_3$ and the main memories $M_2$ and $M_3$. On the other hand, the zeroth processor board $PB_0$ has the main memory $M_0$ to which this address is allocated, so that the sharing management unit $S_0$ on this zeroth processor board $PB_0$ issues the coherent read and invalidate (CRI) command (5) for the exclusive read on the internal bus $B_0$ on this zeroth processor board $PB_0$, so as to read out (6) the data of this cache line from the main memory $M_0$ on this zeroth processor board $PB_0$.

Then, the data read out from this main memory $M_0$ is transmitted through the shared bus SB to the first processor board $PB_1$. At this point, the cache state in the main memory tag memory $MTag_0$ makes the state transition (7) from the state H to the state A to indicate the transfer of the ownership to the other processor board, while the cache state in the cache state tag memory $CTag_0$ remains in the state I.

Next, on the first processor board $PB_1$, the cache state in the cache state tag memory $CTag_1$ makes the state transition (8) from the state I to the state M, and the data transmitted through the shared bus SB is cached (9) into the cache memory $C_1$ while the cache state in the cache state tag unit of the cache memory $C_1$ makes the state transition (9) from the state I to the state M. Then, the cached data is updated at this cache memory $C_1$.

Figure 43:
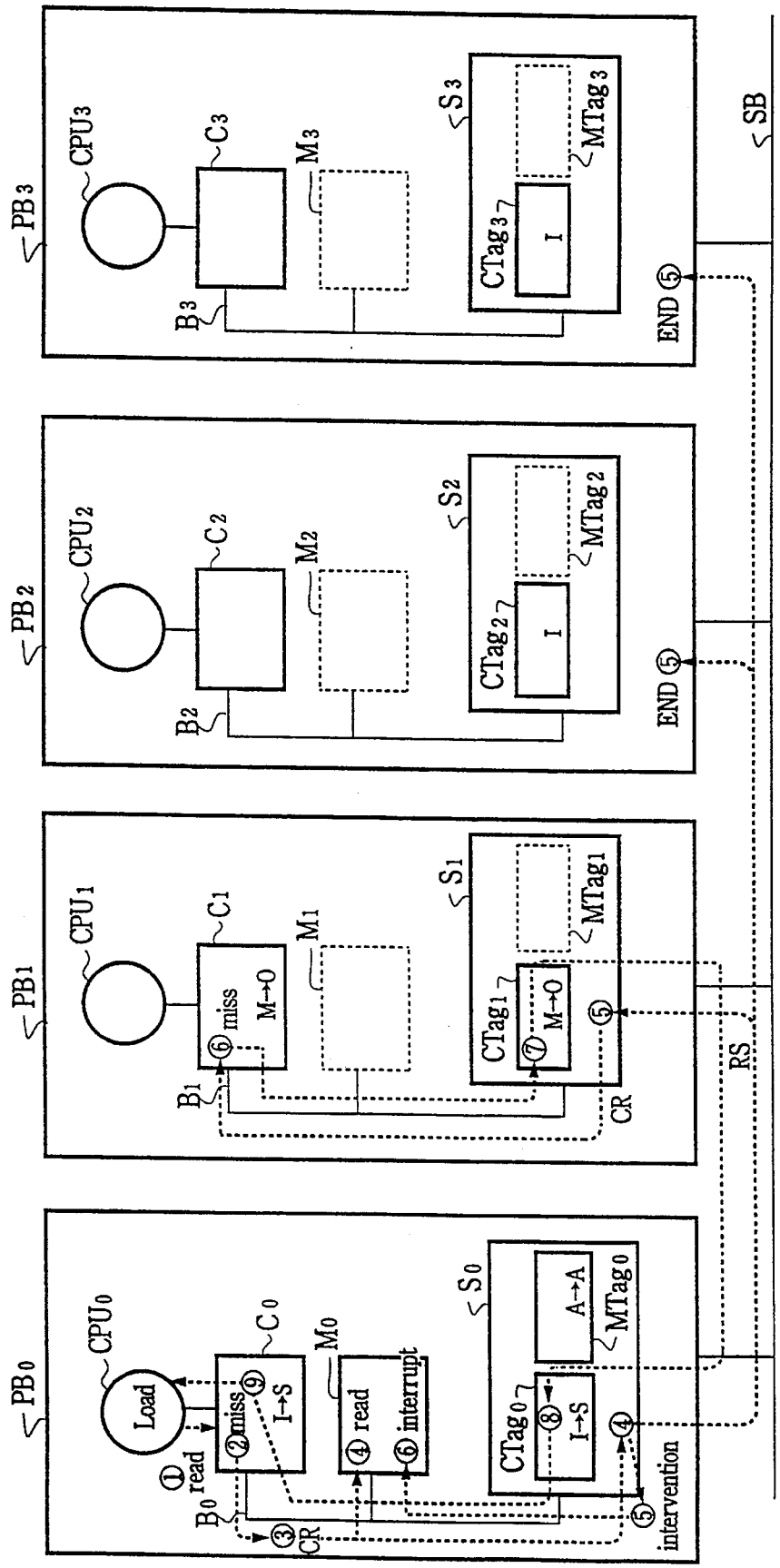

FIG. 43 illustrates the situation in which the $CPU_0$ on the zeroth processor board $PB_0$ executed the load instruction requesting the read operation (1) with respect to the address 0x0000 1000, which has been updated in the cache memory $C_1$ on the first processor board $PB_1$, and whose ownership has been transferred from the zeroth processor board $PB_0$ to the first processor board $PB_1$. In this case, the cache miss (2) occurs at the cache memory $C_0$ on this zeroth processor board $PB_0$, and the coherent read (CR) command (3) for the shared read is issued on the internal bus $B_0$ on this zeroth processor board $PB_0$, so as to make an access (4) to the main memory $M_0$ on this zeroth processor board $PB_0$.

Here, however, since the sharing state in the main memory tag memory $MTag_0$ on this zeroth processor board $PB_0$ is the state A (4) indicating the absence of the ownership for this cache line on this zeroth processor board $PB_0$ (5), the sharing management unit $S_0$ on this zeroth processor board $PB_0$ intervenes (5) with this access to the main memory $M_0$ on this zeroth processor board $PB_0$, so as to interrupt (6) this access, without checking the intervention indication line of the shared bus SB, while issuing the read shared (RS) command (4) on the shared bus SB.

The other processor boards $PB_1$, $PB_2$, and $PB_3$ monitor this read shared (RS) command on the shared bus SB, but the operation is ended (5) at the second and third processor boards $PB_2$ and $PB_3$ as they have no copy of this cache line in both the cache memories $C_2$ and $C_3$ and the main memories $M_2$ and $M_3$. On the other hand, the first processor board $PB_1$ has the cache state tag memory $CTag_1$ indicating the cache state for this cache line in the state M, so that the sharing management unit $S_1$ on this first processor board $PB_1$ issues the coherent read (CR) command (5) on the internal bus $B_1$ on this first processor board $PB_1$, and the access is made (6) to this cache memory $C_1$, so as to read out the newest value for this cache line from the cache memory $C_1$ on this first processor board $PB_1$. At this point, the cache state in the cache state tag unit in the cache memory $C_1$ on the first processor board $PB_1$ makes the state transition (6) from the state M to the state O, and then the cache state in the cache state tag memory $CTag_1$ in the sharing management unit $S_1$ on the first processor board $PB_1$ also makes the state transition (7) from the state M to the state O. Then, the newest value read out from this cache memory $C_1$ is transmitted through the shared bus SB to the zeroth processor board $PB_0$ which requested the access to this cache line.

Next, on the zeroth processor board $PB_0$, the cache state in the cache state tag memory $CTag_0$ in the sharing management unit $S_0$ makes the state transition (8) from the state I to the state S, while the sharing state in the main memory tag memory $MTag_0$ in the sharing management unit $S_0$ remains in the state A, indicating the absence of the ownership for this cache line on this zeroth processor board $PB_0$.

Then, the data transmitted through the shared bus SB is cached (9) into the cache memory $C_0$ while the cache state in the cache state tag unit of the cache memory $C_0$ makes the state transition (9) from the state I to the state S. Then, the cached data is loaded to the $CPU_0$.

Figure 44:
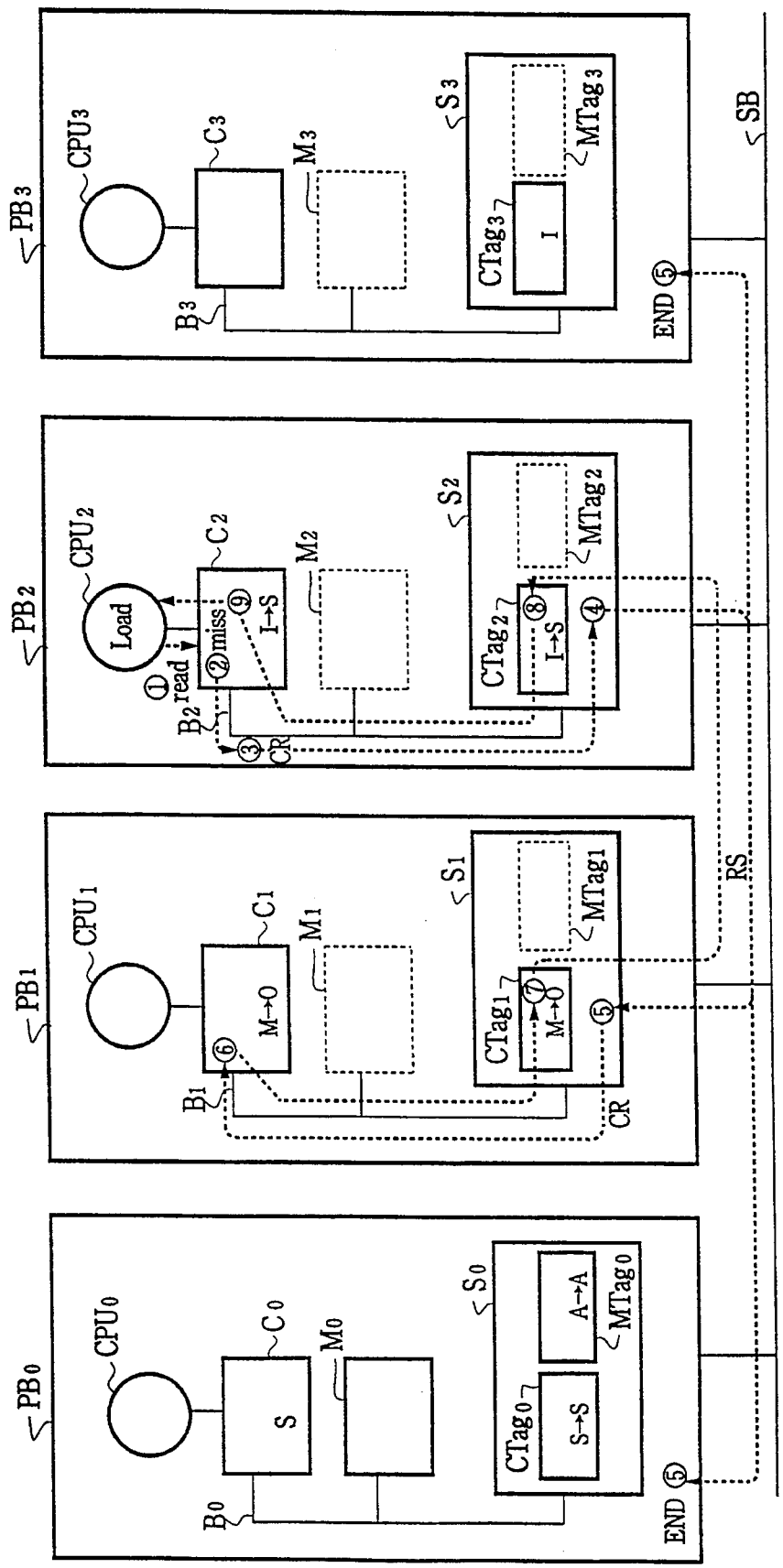

FIG. 44 illustrates the situation in which the $CPU_2$ on the second processor board $PB_2$ executed the load instruction requesting the read operation (1) with respect to the address 0x0000 1000, which has been updated in the cache memory $C_1$ on the first processor board $PB_1$ and whose ownership has been transferred from the zeroth processor board $PB_0$ to the first processor board $PB_0$. In this case, the cache miss (2) occurs at the cache memory $C_2$ on this second processor board $PB_2$, and the coherent read (CR) command (3) for the shared read is issued on the internal bus $B_2$ on this second processor board $PB_2$. Since this address is not allocated to the main memory $M_2$ on this second processor board $PB_2$, the sharing management unit $S_2$ on this second processor board $PB_2$ issues the read shared (RS) command (4) on the shared bus SB.

The other processor boards $PB_0$, $PB_1$, and $PB_3$ monitor this read shared (RS) command on the shared bus SB, but the operation is ended (5) at the zeroth and third processor boards $PB_0$ and $PB_3$, because the third processor board $PB_3$ has no copy of this cache line in both the cache memory $C_3$ and the main memory $M_3$, and because the main memory tag memory $MTag_0$ of the zeroth processor board $PB_0$ has the sharing state for this cache line in the state A. Here, the zeroth processor board $PB_0$ remains totally inactive such that no command is issued on the internal bus $B_0$, because the main memory tag memory $MTag_0$ indicates the sharing state in the state A, indicating the absence of the ownership for this cache line, even though this address is allocated to the main memory $M_0$ on this zeroth processor board $PB_0$.

On the other hand, the first processor board $PB_1$ has the cache state tag memory $CTag_1$ indicating the cache state for this cache line in the state M, so that the sharing management unit $S_1$ on this first processor board $PB_1$ issues the coherent read (CR) command (5) on the internal bus $B_1$ on this first processor board $PB_1$, and the access is made (6) to this cache memory $C_1$, so as to read out the newest value for this cache line from the cache memory $C_1$ on this first processor board $PB_1$. At this point, the cache state in the cache state tag unit in the cache memory $C_1$ on the first processor board $PB_1$ makes the state transition (6) from the state M to the state O, and then the cache state in the cache state tag memory $CTag_1$ in the sharing management unit $S_1$ on the first processor board $PB_1$ also makes the state transition (7) from the state M to the state O. Then, the newest value read out from this cache memory $C_1$ is transmitted through the shared bus SB to the second processor board $PB_2$ which requested the access to this cache line.

Next, on the second processor board $PB_2$, the cache state in the cache state tag memory $CTag_2$ in the sharing management unit $S_2$ on the second processor board $PB_2$ makes the state transition (8) from the state I to the state S.

Then, the data transmitted through the shared bus SB is cached (9) into the cache memory $C_2$ while the cache state in the cache state tag unit of the cache memory $C_2$ makes the state transition (9) from the state I to the state S. Then, the cached data is loaded to the $CPU_2$.

It is to be note here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A distributed shared-memory multiprocessor system formed by a plurality of processor units coupled through a shared bus, each processor unit comprising:

central processing unit (CPU);

a main memory connected with the CPU through an internal bus, for storing a distributed part of data entries of a shared-memory of the system;

a cache memory associated with the CPU and connected with the main memory through the internal bus, for caching selected data entries of the shared-memory; and a sharing management unit connected with the main memory and the cache memory through the internal bus, for interfacing the internal bus and the shared bus, including:

cache state tag means for storing a cache state of each data entry of the cache memory indicative of whether said each data entry of the cache memory has been updated in the cache memory of said each processor unit and not written back to the shared-memory;

intervention means for intervening during an access to a certain data entry in a main memory of a different processor unit, in response to a read command received from said different processor unit through the shared bus, when cache state of said certain data entry in the cache state tag means indicates that said certain data entry has been updated in the cache memory of said each processor unit and not written back to the shared memory; and control means for controlling a cache state for said certain data entry in the cache state tag means to make a state transition from one cache state with an ownership for said certain data entry indicating presence of a duty to write back a newest value of said certain data entry from the cache memory to the main memory to another cache state without an ownership for said certain data entry indicating an absence of a duty to write back a newest value of said certain data entry from the cache memory to the main memory, when the intervention means intervenes during the access to said certain data entry in said main memory of said different processor unit, and a cache state for a particular data entry other than said certain data entry in the cache state tag means to make a state transition from one cache state without an ownership for said particular data entry indicating an absence of a duty to write back a newest value of said particular data entry from the cache memory to the main memory to another cache state with an ownership for said particular data entry indicating a presence of a duty to write back a newest value of said particular data entry from the cache memory to the main memory, when an access to said particular data entry from said each processor unit is intervened by an intervention means of another processor unit.

2. A shared-memory multiprocessor system formed by first and second processor units coupled through a shared bus, each processor unit comprising:

a central processing unit (CPU);

a main memory connected with the CPU through an internal bus, for storing a distributed part of data entries of shared-memory of the system;

a cache memory associated with the CPU and connected with the main memory through the internal bus, for caching data entries of the shared-memory; and a sharing management unit, including a cache state tag means, connected with the main memory and the cache memory through the internal bus, for interfacing with the internal bus and the shared bus, wherein, during a read access by the second processor unit to a memory location in the main memory of the second processing unit but corresponding to a cache line that the cache state tag means in the first processing unit indicates that the first processor unit owns, the sharing management unit of the first processor unit revokes the ownership of the cache line from the first processor unit by making a state transition from one cache state with an ownership for said cache line indicating a presence of a duty to write back a newest value of said cache line from the cache memory of the fine first processor unit to the main memory of the first processor unit to another cache state without an ownership for said cache line indicating an absence of a duty to write back a newest value of said cache line from the cache memory of the first processor unit to the main memory of the first processor unit, and the sharing management unit of the second processor unit changes the second cache state tag means to indicate that the second processor unit owns the cache line by making a state transition from one cache state without an ownership for said cache line indicating an absence of a duty to write back a newest value of said cache line from the cache memory of the second processor unit to the main memory of the second processor unit to another cache state with an ownership for said cache line indicating a presence of a duty to write back a newest value of said cache line from the cache memory of the second processor unit to the main memory of the second processor unit.

* * * * *